United States Patent [19]

Bailey

[11] Patent Number: 6,048,209
[45] Date of Patent: Apr. 11, 2000

[54] DOLL SIMULATING ADAPTIVE INFANT BEHAVIOR

[76] Inventor: William V. Bailey, 25 Gilson Rd., West Lebanon, N.H. 03784

[21] Appl. No.: 09/084,664

[22] Filed: May 26, 1998

[51] Int. Cl.[7] .................................................. G09B 23/28
[52] U.S. Cl. ........................... 434/267; 446/297; 434/238
[58] Field of Search .................................. 446/297, 302, 446/175; 434/238, 267

[56] References Cited

U.S. PATENT DOCUMENTS

| | | |
|---|---|---|
| 4,231,184 | 11/1980 | Corris et al. . |
| 4,249,338 | 2/1981 | Wexler . |
| 4,451,911 | 5/1984 | Klose et al. . |
| 4,575,351 | 3/1986 | Gonzalez . |
| 4,696,653 | 9/1987 | McKeefery . |
| 4,717,363 | 1/1988 | Refabert . |
| 4,840,602 | 6/1989 | Rose . |
| 4,923,428 | 5/1990 | Curran ..................................... 446/175 |
| 5,011,449 | 4/1991 | Handy et al. . |
| 5,083,965 | 1/1992 | Mayem . |
| 5,092,811 | 3/1992 | Bergenguer ............................. 446/301 |
| 5,096,424 | 3/1992 | Carlberg . |
| 5,281,180 | 1/1994 | Lam et al. ............................... 446/175 |
| 5,314,336 | 5/1994 | Diamond et al. ....................... 434/169 |
| 5,443,388 | 8/1995 | Jurmain et al. ......................... 434/238 |
| 5,458,524 | 10/1995 | Lucas ...................................... 446/297 |
| 5,695,381 | 12/1997 | Truchess ................................. 446/297 |

OTHER PUBLICATIONS

"High Tech Toy", *Valley News*, May 16, 1999.
"Furby Autopsy", *www.phobe.com*, 1998.
A.C. Duhaime, et al., "The Shaken Baby Syndrome, A Clinical, Pathological, and Biomechanical Study", *J. Neurosurg.*, vol. 66, Mar. 1987, pp. 409–415.
Alexander et al., "Incidence of Impact Trauma with Cranial Injuries Ascribed to Shaking," *AJDC*, vol. 144, Jun. 1990, pp. 724–726.
Beardsley, "Here's Looking at You, A Disarming Robot Starts to Act Up", *Scientific American*, Jan. 1999, pp. 39–40.

Ready or Not Tot Instruction Manual, Nasco International, Jul. 1997.
Talking Wrinkles, electronic Speech Systems, 1981.
Baby Think It Over Program Instructor's Handbook, 1997.
Baby Think It Over Program Operating Instructions (Generation 4), 1996.

(List continued on next page.)

*Primary Examiner*—Valencia Martin-Wallace
*Assistant Examiner*—David Aaron Fleming
*Attorney, Agent, or Firm*—Testa, Hurwitz & Thibeault, LLP

[57] ABSTRACT

A doll simulating infant behavior includes sensors that detect care given to the doll, such as feeding, rocking, and neglect or abuse, and provide inputs to a microcontroller which operates on a behavioral state machine to produce infant behaviors that are expected of a human infant in response to similar care. The doll includes a head portion having an opening for a mouth having sensors in communication with a programmable microcontroller. The sensors include a feed-switch, motion sensors, and an impact sensor. LED eyes, a speaker, and a bi-colored blinking LED provide the doll's heartbeat and overall health. The microcontroller is programmed to receive inputs from the plurality of sensors and the feed-switch, and causes the doll to undergo a plurality of behavioral cycles such as sleeping, hunger, feeding, crying, wailing, colic and burping. During each behavioral cycle, the microcontroller transitions through a plurality of states and updates a plurality of timers to count preset time limits as well as adaptive time limits that are responsive to care given to the doll during previous cycles. The timers control the length of time in each state, the transition between cycles, and provide inputs to the indicators such as the speaker and the LEDs, thereby simulating the behavior of an infant during each cycle and providing the caretaker with behavior that corresponds, in part, to care administered to the doll.

25 Claims, 25 Drawing Sheets

OTHER PUBLICATIONS

Baby Think It Over Website, http://www.btio.com/btio-prov.htm.

"A Revolutionary Tool for Teen Pregnancy Prevention", *Health Edco Catalog*, p. 57.

"Baby Reality Check", *Health Edco Catalog*.

Croal et al., "Bury It", *Newsweek*, Mar. 3, 1997.

"Shaken Baby Syndrome", Product Brochure from The New Hampshire Coalition.

Kantrowitz et al., "A New Pet Rock for the Digital Generataion", *Newsweek*, Jun. 9, 1997.

"Fuzzy Logic", *Newsweek*, Sep. 28, 1998.

Hayden, "Fun! Fearless! Furby!", *Newsweek*, Oct. 19, 1998.

FIG. 11C STATE MACHINE 3z: z-AXIS MOTION

FIG. 11B STATE MACHINE 3y: y-AXIS MOTION

FIG. 11A STATE MACHINE 3x: x-AXIS MOTION

WEIGHT = green blinks (0-15)

CRYING FOR MORE THAN 10 MINUTES or
INADEQUATE STIMULATION (MOTION) = yellow blinks (0-256)

ROUGH TREATMENT = red blinks (0 TO 256)

A TYPICAL CODE WALK-THROUGH, ONE "MAIN_LOOP1" CYCLE

```
main_loop1  cli                      ;enable the interrupts. This is a redundant instruction for reliability purposes.
            lda   input_raw          ;get input bits from port A
            coma                     ;invert them so switch closure = logic 1
            sta   input              ;save in variable "input"
            jsr   m3x                ;do state machine m3x m3x         ldx   m3x.next_state     ;get number of m3x state to be executed = 1
            jsr   m3x.jmp_table,x    ;indexed jump into m3x jump table
            jmp   m3x.s.1            ;jump to state 1 = m3x.s.1 m3x.s.1     brclr 2,input,m3x1_1     ;test switch x, if clear branch to m3x_1
m3x1_1      lda   #msec_1500         ;bit is clear so load 1.5 seconds
            sta   #m3.timer0         ;save 1.5 seconds in m3.timer0
            lda   #m3x.0             ;load the new m3x state m3x.0 =0
            rts                      ;return
            sta   m3x.next_state     ;save the new m3x state
            rts                      ;return to MAIN
```

| FIG. 16B-1 |
| FIG. 16B-2 |
| FIG. 16B-3 |

FROM FIG. 16A-3

```
        ;do state machine m1, behavioral
m1      ldx    m1.next_state            ;get m1 state to be executed = 6
        jsr    m1.jmp_table,x           ; indexed jump into jump table
        jmp    m1.s.wail                ;jump to state #6 = m1.s.wail m1.s.wail  lda  #m1out_wail             ;load #m1out_wail = 11101100
           sta  m1.output               ;save it in m1.output
           tst  m1.timer1               ;test for timeout
           beq  m1wail.hngry            ;branch if timeout to m1wail_hngry
           tst  m4.timer0               ;not timeout so test for food
           beq  m1wail_wa               ;test for food; food!!
           lda  #m1.feedawake1          ;get number of new state feedawake1
           rts                          ;return to m1 state machine
m1wail_wa  sta  m1.next_state           ;save number of new m1 state
           rts                          ;return to MAIN
```

FROM FIG. 16B-2

```
jsr   out_supervisor    ;assemble heartbeat blinks, turn off speaker
out_supervisor   brclr 0, m2.next_state,outsprvsr_br2   ;test to see if blink = on.  Blink is on , test fails:
                 lda   m1.cntr.fat                       ;how fat is baby? 91 counts = 01011011 binary (see TABLE xx5):
                 lsra                                    ;logical shift right = 00101101 binary
                 lsra                                    ;logical shift right = 00010110 binary
                 lsra                                    ;logical shift right = 00001011 binary
                 lsra                                    ;logical shift right = 00000101 binary
                 and   00001110Q                         ;mask off least significant bit = 00000100Q
                 brclr 1,m2.next_state                   ;is m2 in "#2 blink" state 2? Yes, bit 1 = 1, test fails.
                 ora   #00000001Q                        ;or in the "#2 blink" bit so number = 00000101
                 tax                                     ;send number to index register
                 lda   heartbeat_table,x                 ;get color from heartbeat table (entry 5 = yellow)
                 bra   outsprvsr_br1                     ;an unconditional program branch
outsprvsrbr1     sta   output                            ;send color (yellow) to the output port: both red and green leds on
                 lda   m1.cntr.fat                       ;is baby in danger of starving? Get fat count = 91.
                 cmp   #16                               ;is 91>16? Yes, baby is no danger of starving.
                 blo   outsprvsr_br3                     ;test fails, continue on...
                 lda   #msec_930                         ;normal off time for blink
                 bra   outsprvsr_br4                     ;an unconditional program branch
outsprvsrbr 4    sta   heartbeat_off                     ;save this 930 millisecond off time in heartbeat_off
                 lda   m1.output                         ;prepare to exit.  Get m1.output =#m1out_wail = 11101100
                 coma                                    ;invert the bits: 00010011
                 and   #10000000Q                        ;discard all but most significant bit, "eyes" bit = 0 0000000
                 sta   porta                             ;send to the output port 00000000.  If bit 7 = 0, eyes on.
                 rts                                     ;return to MAIN.

jmp main_loop1   ;the loop is done, return program up to beginning of loop.
```

Back to main_loop

FIG. 16B-3

DOLL SIMULATING ADAPTIVE INFANT BEHAVIOR

FIELD OF THE INVENTION

The present invention relates to a doll that simulates infant behavior, particularly, a doll that adaptively simulates the emotional and physiological characteristics of an infant.

BACKGROUND OF THE INVENTION

In recent years, emphasis has been placed on educating high school students as to the responsibilities of parenthood, with the belief that increased awareness will result in a decrease in the number of unwanted teen pregnancies and infant abuse (e.g., neglect and head injuries), and an improvement in infant care. In providing such education, a teen is typically given a prop such as a five pound sack of flour or a raw egg. For a few days or a week, the student must carry the prop wherever he or she goes, or otherwise must provide a baby sitter for the prop. Such a regimen forces the student to assume the responsibility that a parent must assume when caring for an infant.

An infant simulation system appeared on the market to replace these props. Currently, the system is sold commercially as "Baby Think It Over." The "Baby Think It Over" system has been advertised in the Sex Education section of the Health Edco catalog (Waco, Texas) at a price of $250 each. The baby doll in the system is described in U.S. Pat. No. 5,443,388 to Jurmain et al. (hereinafter the "Jurmain doll"). The Jurmain doll is equipped with an electronic control inside the doll's trunk which comprises integrated circuits and a speaker to create a realistic cry similar to that of a human infant. This cry is turned on by a random interval timer that the student can deactivate by fitting a key into an electronic control mechanism. To discourage the student from loaning the key to another person, the key is typically secured to the student by a bracelet which must be cut for removal thereof.

Although the Jurmain doll is an improvement over the use of flour sacks and eggs in the simulation of infant behavior, it is expensive to manufacture due to the use of a controller that includes a large number of random-logic integrated circuits. At a price of $250 per doll, providing a doll to each student in a class of twenty students would cost upwards of $5000.

Another deficiency associated with the Jurmain doll is the inability of the doll to simulate a variety of different infant behaviors. The Jurmain doll includes a random-logic controller having only a limited number of electronic states. Another deficiency is the inability to adapt the doll to stuffed animals or other creatures, due to the hard-wired implementation.

Additionally, the Jurmain doll includes a crying interval timer for randomly starting crying sounds within a selected time range, and a crying duration timer for randomly setting a crying duration within a selected time range. These "random" durations and intervals are not associated with the doll's prior treatment or its present simulated discomfort.

A doll capable of simulating infant behavior that uses prior treatment by a caretaker to govern its future behavior would provide a more realistic experience of the responsibilities of caring for an infant. Additionally, a doll capable of simulating infant behavior that is available at a lower cost would allow a greater number of schools and community centers to expose teenagers and future parents or caregivers to the realities of infant care.

SUMMARY OF THE INVENTION

A doll simulating infant behavior includes in one embodiment, a housing comprising a head portion defining an opening for a mouth and a plurality of openings for eyes. Disposed within the head portion is a programmable microcontroller, a plurality of motion sensors in electrical communication with the microcontroller and disposed in a plurality of different axes, a switch in electrical communication with the microcontroller and disposed in alignment with the mouth opening, a speaker in electrical communication with the microcontroller and emitting an audible sound, light emitting diodes (LEDs) in electrical communication with the microcontroller and disposed within the head portion in alignment with the eye openings, and a bi-colored blinking LED in electrical communication with the microcontroller providing the doll's heartbeat. The microcontroller is programmed to receive inputs from the plurality of sensors and the switch, and causes the doll to undergo a plurality of behavioral cycles such as sleeping, hunger, feeding, crying, wailing, colic and burping. During each behavioral cycle, the microcontroller transitions through a plurality of states and updates a plurality of timers to count preset time limits as well as adaptive time limits that are responsive to care given to the doll during previous cycles. The timers control the length of time in each state, the transition between cycles, and provide inputs to the indicators such as the speaker and the LEDs, thereby simulating the behavior of an infant during each cycle and providing the caretaker with behavior that corresponds, in part, to care administered to the doll.

In one embodiment of the invention, the microcontroller transitions between states in a behavioral state machine each representing one of the above-described behavioral cycles, by setting a timer representing the length of the time in a state in the behavioral cycle, decrementing the timer, determining whether or not an input has been received from a sensor or switch, transitioning to another state in the cycle in response to an input or the timer representing the metabolism of the doll and depending in part on the time spent in the behavioral cycle, and recalculating the length of time of the next behavioral cycle from the count in the metabolism counter.

The present invention provides a doll whose behavior is modified by its prior treatment, consistent with a human infant whose feeding and sleeping cycles lengthen when the infant is well-cared for and shorten with the infant is neglected. In one embodiment, the doll's feeding and sleeping cycle will lengthen over an 84 hour period, from minutes to 4 hours when treated with care. Additionally, maturation of the doll over predetermined timer periods is simulated by modifying the duration of irritable crying/colic and other variables in accordance with a plurality of stored look-up tables. Weight gain is further simulated in the present invention, consistent with a human infant that is fed regularly.

The doll of the present invention provides an interactive experience for the caretaker as the doll demands feeding, picking up, and rocking. The doll communicates its needs by LED eyes that are lit when it is awake, a cry that is provided by the speaker and includes differing sounds, a burp that occurs after feeding, and a blinking LED that represents the doll's heartbeat. The LED changes color from red/red through red/yellow, yellow, yellow, yellow/green, to green/green as the doll gains weight. The frequency of the blink doubles when the doll is sick from starvation, abuse or other neglect. In another embodiment, the LED cycles through different colors which represent different health conditions of the doll. In one such embodiment, the number of green blinks indicates the doll's weight, the number of yellow blinks indicates the incidents of neglect, and the number of red blinks indicates the number of impacts exceeding a 10-G limit.

The present invention is not restricted to infant-simulation dolls, but rather can be used with stuffed animal pets such as teddy-bears, kittens, and puppies, to provide a user with a mixture of realistic and imaginary behaviors.

These and other features of the invention will be made apparent from the description below and the claims.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE INVENTION

Figure 1:
FIG. 1 is a perspective view of the doll of the present invention.

Referring to FIG. 1, shown is a perspective view of the infant simulator doll 1 according to one embodiment of the invention. As shown, the doll 1 is sized to assume the fragility of an infant. The head 2 comprises an outer housing 3 that includes the facial features of an infant.

Figure 2B:
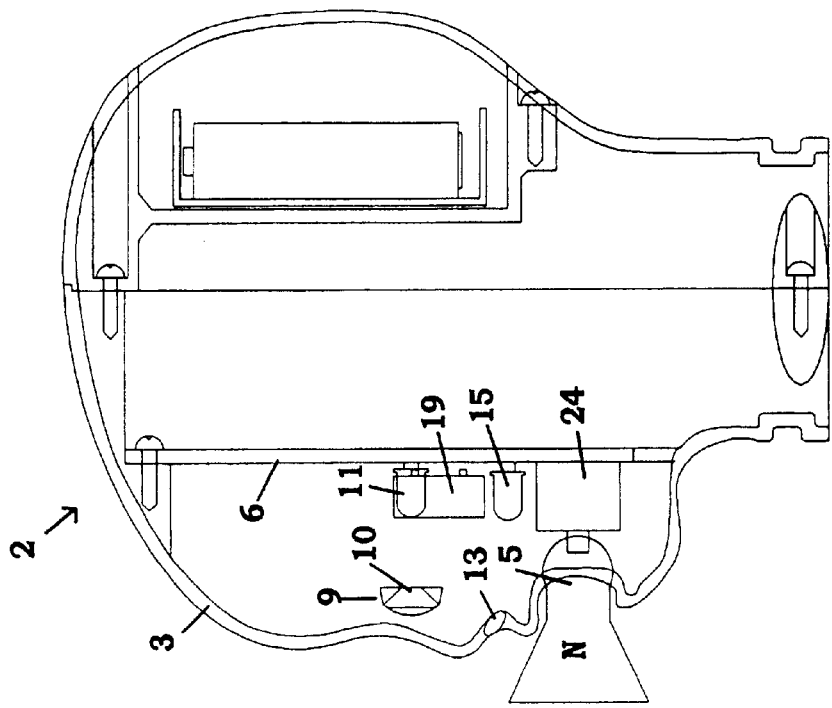
FIG. 2B is a sectional side view of the head of the doll of the present invention.
Figure 2A:
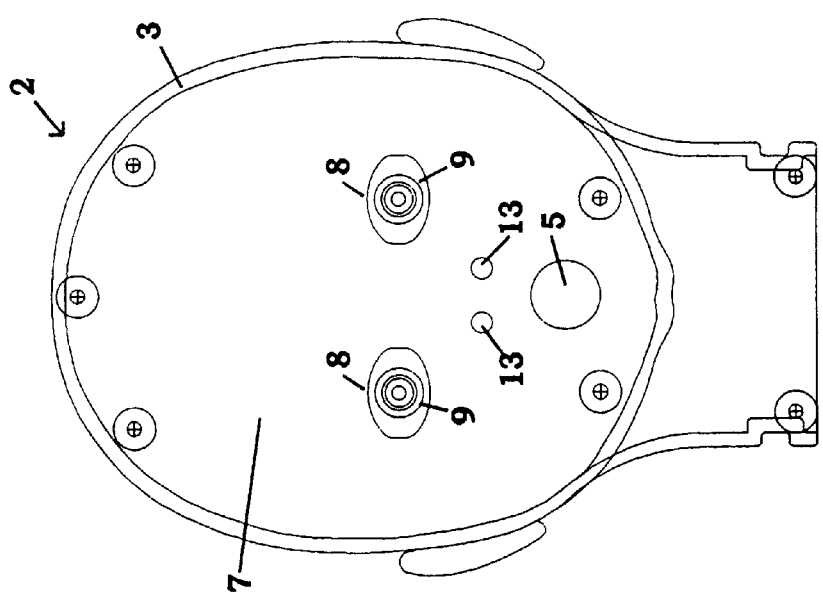
FIG. 2A is a plan view of the head of the doll of the present invention.

Referring to FIG. 2A, shown is a plan view of the head 2 of the doll 1 shown in FIG. 1. The outer housing 3 is preferably made of cast or molded durable material. As with conventional baby dolls, the material used to form the housing 3 can be pliable or hard plastic, ceramic or fabric. As shown in this figure, a mouth 5 is formed in the face portion 7 of the doll's head 2. The mouth 5 is sized to be about equivalent to the diameter of a nipple portion N of a baby bottle to accommodate the passage of the nipple portion N. Two eye sockets 8 are formed above the mouth 5 in the face portion 7. In one embodiment, two plastic eyes 9 sold commercially by Bel-Tree Co. as model number 60090/11, are mounted from the rear of the face portion 7 into the eye sockets 8. A nose that includes two nostril openings 13 is also formed in the face portion 7.

Referring to FIG. 2B, shown is a sectional side view of the head 2 of the doll 1. As shown, each eye 9 preferably has a translucent iris 10 behind which a green LED 11 is mounted. A bi-colored LED "heartbeat-lamp" 15 is disposed on a circuit board 6. The heartbeat-lamp 15 is in alignment with the nostril openings 13 and the mouth 5. The mouth 5 permits light emitted from the bi-colored LED heartbeat-lamp 15 to be visible to the doll's caretaker. The ability to view the light emitted from the bi-colored LED heartbeat-lamp 15 is important in determining the doll's "vital signs." For example, in one embodiment, the frequency, pattern and color of light emitted by the LED 15 can be indicative of the doll's weight and health, in addition to the doll's heartbeat. In one embodiment, as the doll gains weight, the blinking LED 15 changes color from red/red through red/yellow, yellow/yellow, yellow/green, to green/green. Additionally, the frequency of the blink doubles when the doll is sick from starvation or other neglect. In another embodiment, green blinks represent the doll's weight, yellow blinks represent the amount of time during which the doll was left to cry unattended or received inadequate motion stimulation in the prior 2 to 4 hour period, and red blinks represent impacts or harsh movements experienced by the doll. In one such embodiment, the LED 15 transitions through the different colors. In still another embodiment, a doll that has starved to death has a heartbeat-lamp that is continuously yellow and a doll that has suffered fatal trauma to the head has a heartbeat-lamp that is continuously red.

As shown, the nostrils 13 in the face portion 7 permit the passage of sound pressure from a speaker 19, alerting the caretaker to episodes of crying. As further shown in this figure, a feed sensor 24 is preferably mounted on a circuit board 6 in alignment with the mouth 5 for sensing when a doll is being fed, that is, when a nipple portion N of a bottle is inserted into the mouth 5.

Figure 3A:
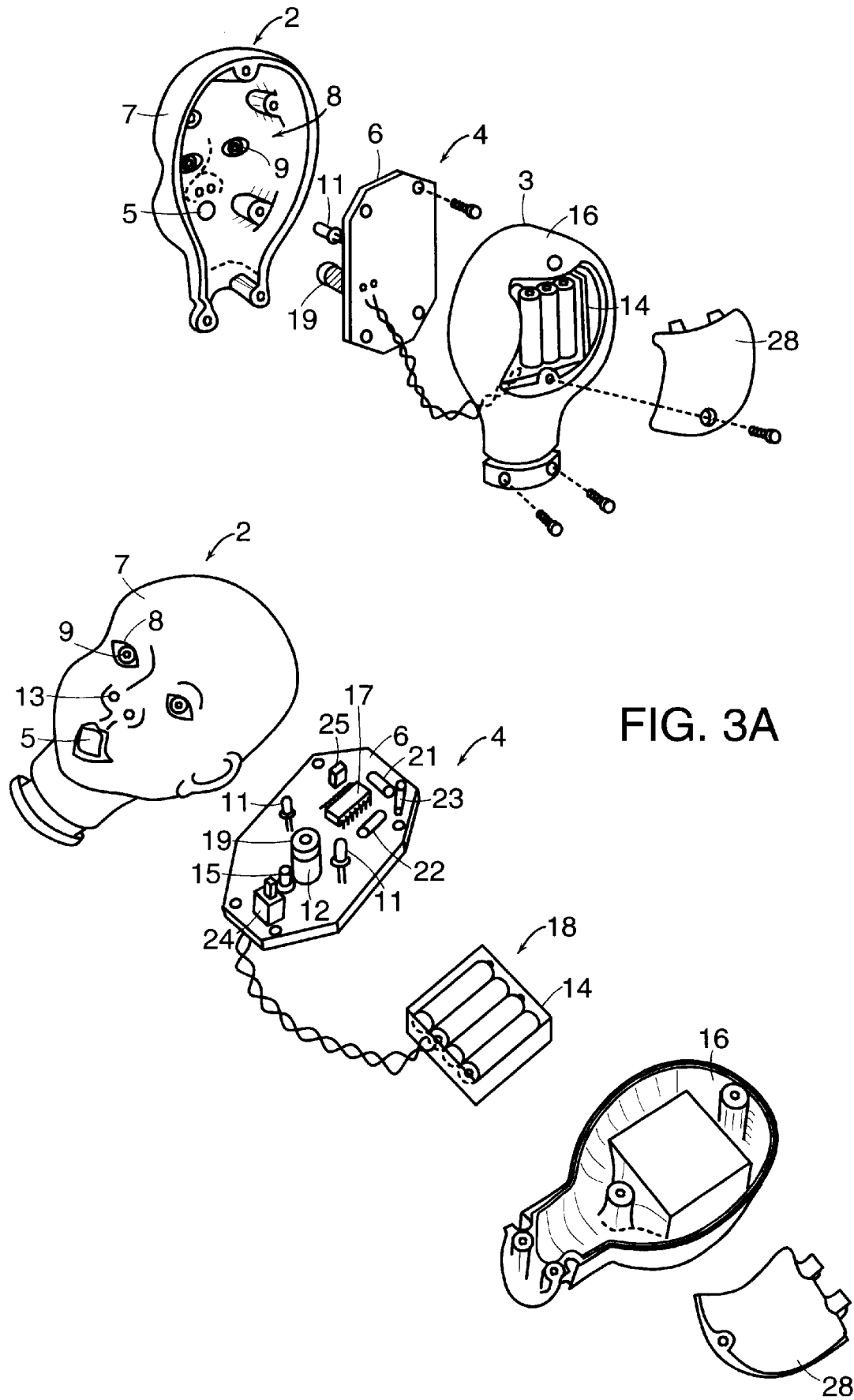
FIG. 3A is an exploded view of an embodiment of the head portion of the doll of the present invention showing the head portion from two directions.

Referring to FIG. 3A, shown is an exploded view of the head 2 of the doll 1 shown in FIG. 1. The housing 3 in the present embodiment is made from three molded pieces, a face portion 7, a back portion 16, and an access door 28. Disposed within the cavity defined by the face portion 7 is a printed circuit board assembly 4. The printed circuit board assembly 4 is mounted by screws or other affixing members, into a cavity defined in the face portion 7, and includes a printed circuit board 6 and associated components soldered or otherwise assembled onto the circuit board 6. The printed circuit board 6 is electrically connected to a power source 18 by an electrical lead. The power source 18 is preferably a rechargeable battery disposed in a battery holder 14 that holds, in this embodiment, four AA alkaline dry-cell batteries. The battery holder 14 is mounted to a cavity in the back portion 16, or preferably molded in one piece as part of the back portion 16.

A low cost piezoelectric speaker 19, a plurality of movement sensors 21, 22, and 23, a feed-switch 24, a resonator 25, and ancillary sensors 26 (shown in FIG. 4) are connected to the circuit board 6. The ancillary sensors 26 can include an impact switch which can be used to determine whether the doll has been shaken enough to have been injured. The impact switch, for example, may be a switch that closes when subjected to a 10-G acceleration or deceleration, where 1-G equals one gravity of acceleration/deceleration. A microcontroller 17 such as model number MC68HC705J1A sold commercially by Motorola Corp., includes a programmable read-only memory (EPROM) that controls the above-noted elements on the circuit board 6. The speaker 19, such as model number PKM17EW-2001 sold commercially by Murata Corp., is preferably mounted on a vibration isolator 12 such as a foam pad. The vibration isolator 12 prevents speaker sound vibration from interfering with the operation of the movement sensors 21, 22, and 23. The microcontroller 17 is electrically connected to the speaker 19 and activates the speaker 19 to produce a sound indicating that the doll is crying. The sound emitted by the speaker 19 need not replicate a human cry provided that its intensity is alerting to those who hear it.

The movement sensors 21, 22, and 23 are preferably low-cost non-mercury movement sensors, such as model number CW1300-1 sold commercially by Comus Corp. Each movement sensor 21, 22, 23 is situated to detect motion in one of the three directional axes (x, y, z). It is to be appreciated that greater or fewer than three sensors can be used, as the number and direction of axes for which motion detection is desired will depend upon the specific doll implementation. As will be further described, the microcontroller 17 is electrically coupled to the sensors 21, 22 and 23 to detect handling, rocking, stroking and so forth. It is to be appreciated that a delay in providing the signals from the sensors 21, 22, 23 can be provided to eliminate interference with the speaker 19 sounding and inadvertently triggering a motion detection by the sensors 21, 22, 23.

The electrical feed-switch 24 preferably comprises a keyboard push-button, such as sold commercially by Cherry Switch as model number MX1A-11NW. The feed-switch 24 is preferably mounted on the circuit board 6 in alignment with the mouth 5 and in electrical communication with the microcontroller 17. When a nipple portion N of a bottle is inserted into the doll's mouth 5, the push-button is depressed, and a signal is transmitted to the microcontroller 17. The resonator 25, preferably comprising a ceramic resonator, provides a two megahertz timing signal to the microcontroller 17. The ancillary sensors 26 (shown in FIG. 4) can further include, for example, an impact switch, a light-sensitive transistor, a temperature-sensitive switch, and a test switch. For example, an impact switch can be used to determine whether the doll has been shaken or injured, and a light sensitive transistor can be used to sense the presence of daylight to tune the doll's behavioral patterns to human circadian rhythms. When an impact switch is used, it can be made sensitive to 10-G acceleration or deceleration. Additionally, a temperature sensitive switch can be used to sense temperatures, and thus sensitize the doll to temperature extremes and modify the doll's behavior and vital signs accordingly. The use of a microcontroller 17 with additional EPROM, ancillary sensors 26 and more sophisticated position/motion sensors such as solid-state accelerometers, can further increase the accuracy and complexity of infant behavior simulation.

Figure 3B:
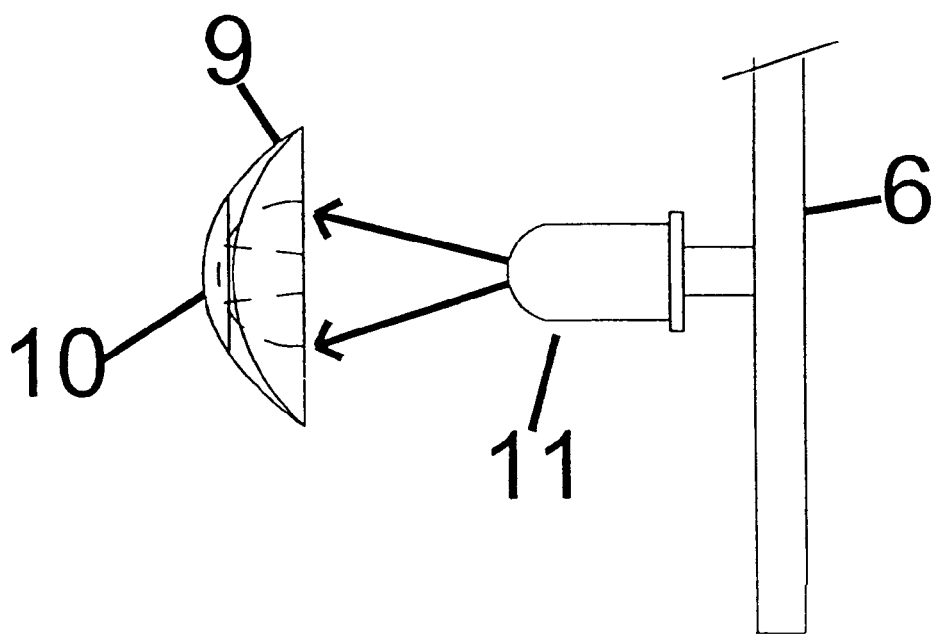
FIG. 3B is an embodiment of the eye assembly of the doll of the present invention.

Referring to FIG. 3B, the leads of the LEDs 11 are disposed on the circuit board 6 in alignment with each eye 9. The LEDs 11 can have a transparent lens with an angle of divergence that, when located at a predetermined distance, causes the diverged light to illuminate the back of the iris 10. In another embodiment, the doll's eyes can take the form of liquid crystal displays (LCDs) that can appear open when the doll is awake and closed when the doll is asleep.

Figure 4:
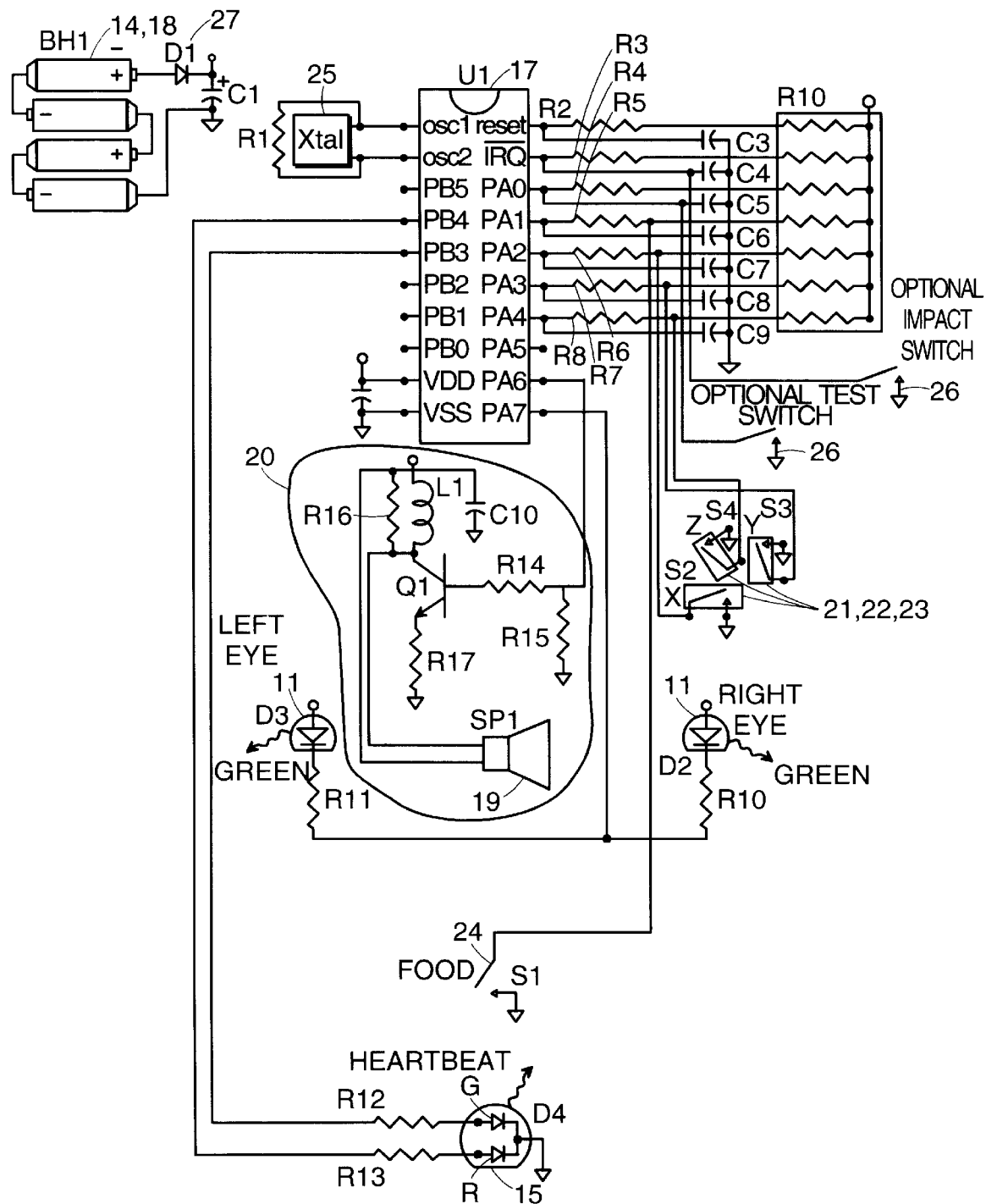
FIG. 4 is a circuit diagram showing the electronic components disposed within the head of the doll of the present invention.

Referring to FIG. 4, shown in further detail are the electronic elements described above. As shown, inputs OSC1 and OSC2 of the microcontroller 17 receive a 2 megahertz timing signal from the ceramic resonator 25. Resistor R1, connected electrically across the ceramic resonator 25, serves to de-power the microcontroller 17 when power is removed. Leads emanate from the microcontroller 17 and extend to the LED 15. The motion sensors 21, 22, and 23, the LEDs 11, the feed-switch 24 and the ancillary sensors 26 are connected to output leads of the microcontroller 17. Capacitors C3 through C9 protect the input transistors of the microcontroller 17 from static electricity damage and can function with series resistors R2 through R8 to reduce the likelihood of spurious switch closures and openings from the motion sensors 21, 22, 23, the feed-switch 24 and the ancillary sensors 26. Individual pull-up resistors in resistor array R10 establish for each input a source of current and establish the voltage level at that pin equal to logic 1, that is, approximately +5 volts. The battery is further connected to a diode 27 that protects the circuitry from accidental reversal of batteries. The speaker 19 is connected to the microcontroller 17 through a booster circuit 20. The booster circuit 20 as further described in FIG. 5, increases the intensity of the sound emitted from the speaker 19.

Figure 5:
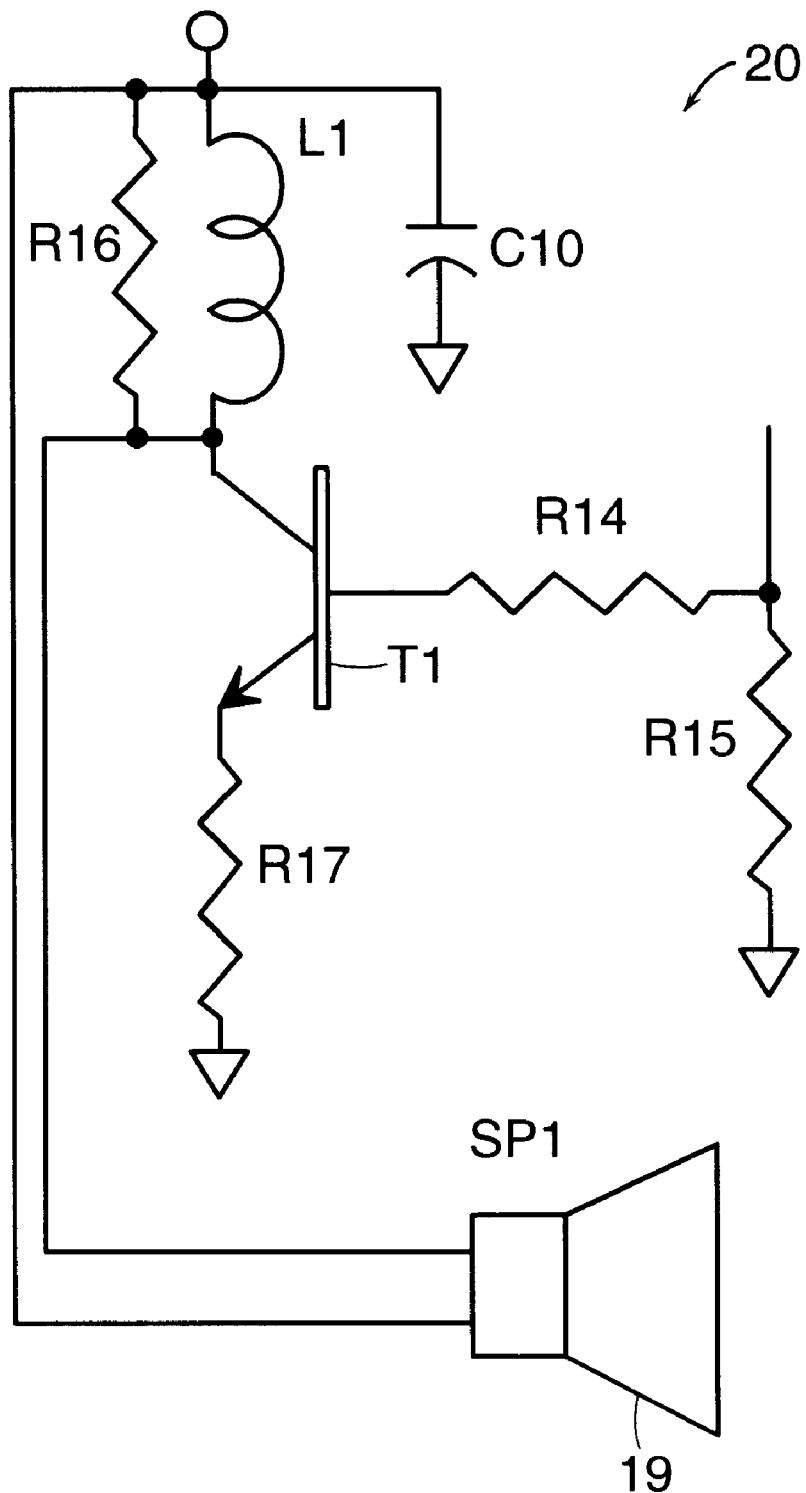
FIG. 5 is a circuit diagram showing in further detail the booster circuit of FIG. 4.

Referring to FIG. 5, in one embodiment, the booster circuit 20 comprises an inductor L1 having a value of about 22 millihenry, which is controlled by the transistor T1. The resistors R14 and R15 prevent damage to the microcontroller 17 in case of breakdown of the transistor T1. The resistors R16 and R17 are connected to the collector and emitter of the transistor T1, respectively. Oscillation-damping is provided by the damping resistor R16 and current limiting is provided by the resistor R17. In an alternative embodiment, a higher output speaker can be driven directly by the microcontroller 17 without the booster circuit 20, in a "push-pull" between two outputs operating out of phase. This configuration can increase the sound pressure to an acceptable level.

Figure 6:
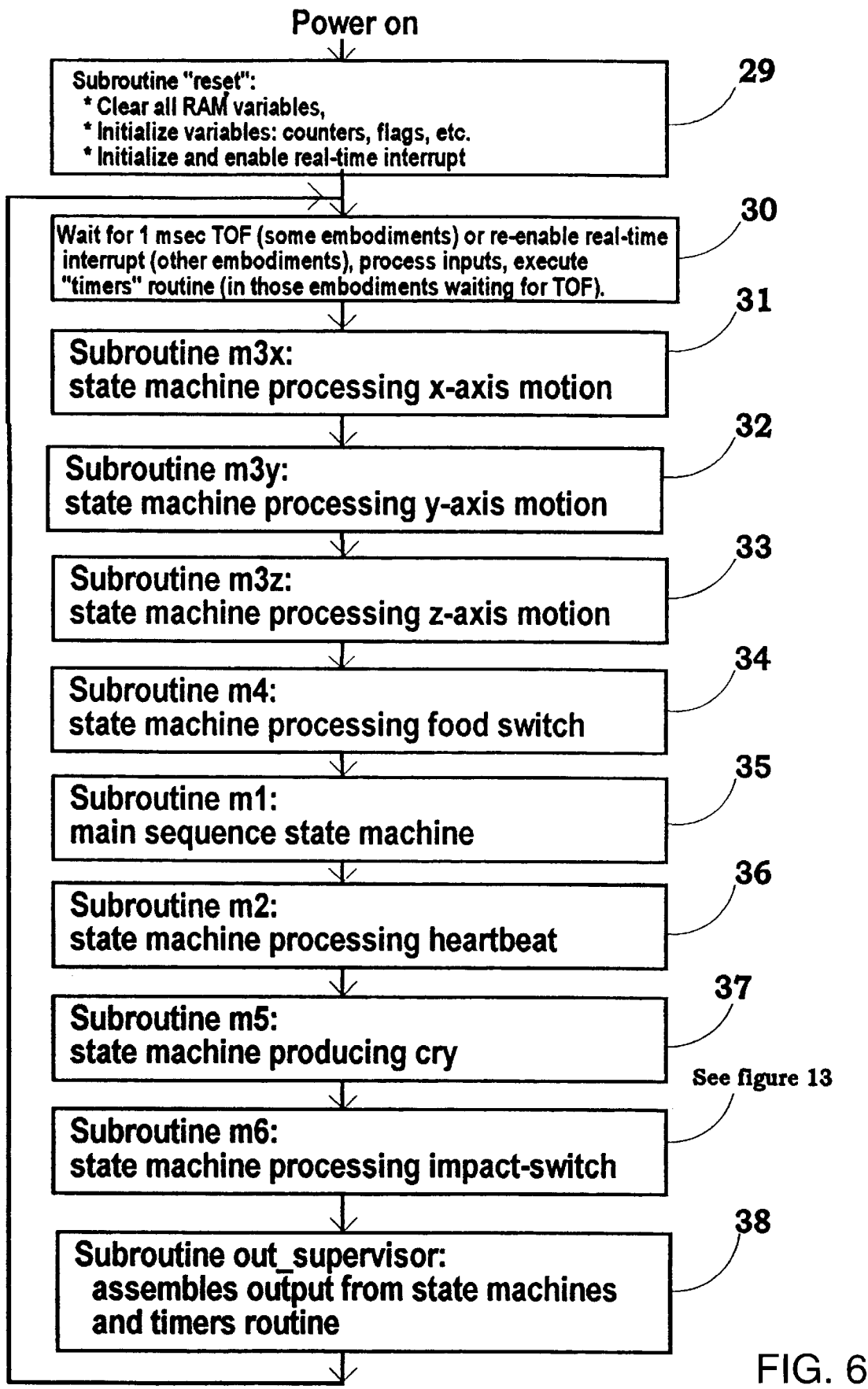
FIG. 6 is a simplified flowchart illustrating the major steps that the microcontroller takes in continuously providing the behavioral cycles of the doll of the present invention.

Referring to FIG. 6, shown is a simplified flowchart of the steps that the microcontroller 17 performs in processing all of the inputs received from the various sensors to continuously provide the behavioral patterns of the doll 1 of the present invention. In step 29, a subroutine initializes all variables and the microcontroller 17 registers upon power up, after which it enables the interrupt service routines, and control is routed to step 30. In some embodiments, the microcontroller 17 waits at step 30 until bit 7, the "Timer Overflow Flag" (hereafter referred to as the "TOF," not shown) of the "Timer Status/Control Register" (hereafter referred to as the "TSCR", not shown) indicates an overflow in the "Timer-Counter Register" (hereafter referred to as the "TCR", not shown). The overflow and subsequent setting of the TOF occurs after 2048 counts of the 2 megahertz resonator 25 have accumulated in the TCR. The overflow represents an elapsed time of 1.024 milliseconds. Step 30 resets the overflow bit 7 in the TSCR, then continues on to process the input signals present at the microcontroller 17 pins for further processing in steps 31 through 37, each of which represent state machines that process inputs received from sensors in response to care given to the doll. Step 38 represents a subroutine that processes outputs from the state machines and interrupt service routines, and places the processed outputs at the output pins of the microcontroller 17. In one embodiment, the flowchart of FIG. 6 operates in a continuous loop unless interrupted by an internally-generated hardware timer signal or, in some embodiments, by an external interrupt received from a switch, such as, for example, an impact switch, as described above.

Before discussing the particulars of the program that operates on the microcontroller 17 to simulate infant behavior according to the present invention, it is important to briefly describe the behavioral cycles of infants. Dr. Benjamin Spock in *Baby and Child Care*(1976, Hawthorn books, Inc.) describes infant behavior as "regular," with cycles occurring at 2-hour to 4-hour intervals. The behavioral cycles lengthen as the baby gains weight:

"Think of the baby's first year this way: She wakes up because she's hungry, cries because she wants to be fed . . . If you stop her in the middle of a nursing, she may cry furiously. When she has had as much as she wants, she is groggy with satisfaction and falls asleep." (p. 79, Section 114).

A newborn is described as waking "surprisingly often—about 10 times a day—in the second half of the first week. But by the age of 2 weeks [a newborn] had settled down to 6 or 7 feedings a day . . . By 10 weeks he had arrived at approximately a 4-hour schedule." (p. 81–82, Section 117).

Additionally, Spock states: "all babies have a tendency to develop regular habits of becoming hungry, and these will come much more rapidly if the parents guide them a bit. Babies tend to lengthen gradually the interval between feedings as they grow bigger and older. A 5- or 6-pounder usually needs to be fed about every 3 hours. Most 8- or 9-pounders are happy to average 4 hours between feedings." (p. 83, Section 119).

Spock describes the need for "getting the bubble up" after a feeding. He states that failure to burp may cause the baby colic: "All babies swallow some air while they are drinking their milk. You should at least try to get the bubble up at the end of the feeding. Most babies will be uncomfortable in a little while if put to bed with a bubble in the stomach. Some babies even get colic from it." (p. 88, Section 128).

Spock further reports that babies cry for reasons other than hunger: "their fatigue at the end of every period of being awake produces a tension that is a sort of hump they must get over before falling asleep. They have to cry. Some of them cry frantically and loudly. Then gradually or suddenly the crying stops and they are asleep . . . I would try walking a baby occasionally during an unusually tense spell (or rocking her in a rocking chair) . . . " (p. 217–218, Section 325).

"Some babies are very regular about their colic or irritable crying. They sleep like angels after every feeding but one, and always scream from 6 P.M. to 10 P.M. or from 2 P.M. to 6 P.M . The crying of colic most often begins after a feeding, sometimes right after, sometimes half an hour or so later. In this way it is different from the crying of the hungry baby, which usually occurs before the feeding . . . "(p. 220–221, Section 328). "If babies are screaming with colic or irritability, and picking them up or rocking them seems to help them, then do it." (p. 222, Section 329).

Regarding an infant's behavior following a head injury, Spock reports that: "if, after a fall on the head, a baby stops crying within 15 minutes, keeps a good color, and doesn't vomit, there is little chance that she has injured her brain. She can be allowed to resume her normal life right away . . . If a child loses consciousness either right after a fall or later, she should certainly be examined by a doctor immediately." (p. 584, Section 784).

The present invention simulates the above-described infant behavior using the speaker 19, the feed-switch 24, the motion sensors 21, 22 and 23, the ancillary switch 26, and the LEDs 11 and 15. The outputs from the above-described sensors are used by the microcontroller 17 to determine the states of the behavioral state machine, further described in FIG. 8.

Still referring to FIG. 6, shown is a flow chart of the top-level program (hereinafter referred to as "MAIN"), illustrating the steps taken by the microcontroller 17 in providing the doll 1 with behavior that simulates the behavior of an infant in response to treatment. As shown in step 29, a reset subroutine executes only once after power is delivered to the microcontroller 17. The reset subroutine 29 initializes the first 64 RAM variables, most of which are the microcontroller variables that are used in simulating an infant's behavioral patterns. In certain embodiments, the reset subroutine 29 sets a timer representing the doll's hunger, the timer m1.timer_hunger, to a count of 20, which will cause the doll to sleep for 20 minutes if undisturbed. The reset subroutine 29 then sets a counter representing the doll's weight, the counter m1.cntr_fat, to a count of 64, which in the present embodiment is not considered to be a satisfactory weight. For the purposes of setting the doll's "circadian clock", the reset subroutine 29 initializes the count-down counters (msec_counter and sec_counter) to 60 and a minutes counter (min_counter) to 180 (3 hours) or 60 (1 hour), depending on the embodiment. It is to be further appreciated that additional states can be used to enable a teacher or other administrator giving the doll to a caregiver to set the hour of birth. For example, the teacher could push an hour push-button to set the hour, with the eye LEDs 11 initially blinking in accordance with the number set. For the purposes of initializing the doll's circadian/maturation counter, the reset subroutine 29 clears a counter, referred to as hour_counter, to 0 hours. Finally the individual input and output pins of microcontroller ports A and B are defined, and in those embodiments using a "timers" interrupt, the TSCR is initialized to provide a periodic 32.8 millisecond interrupt.

Figure 7A:
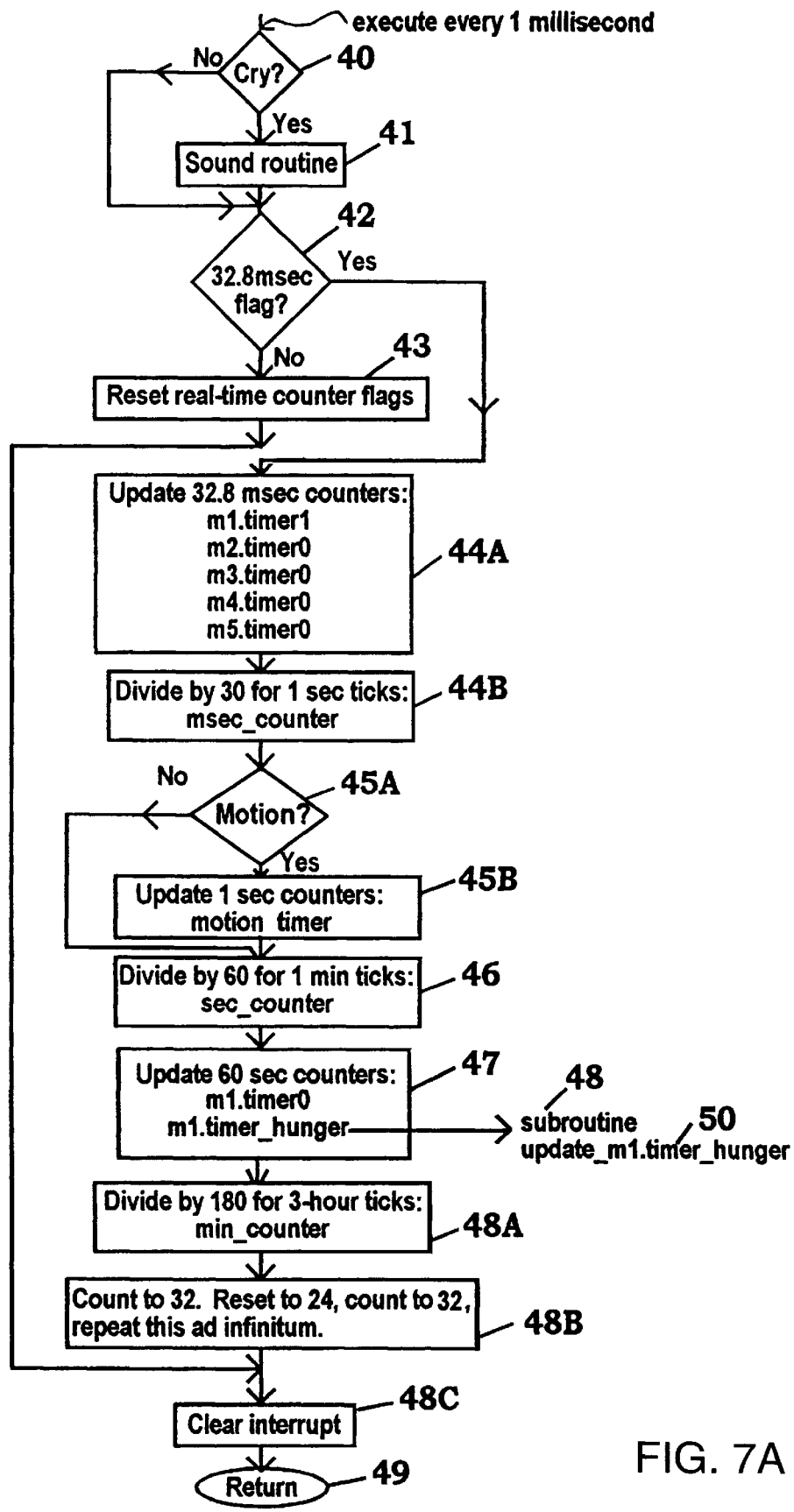
FIG. 7A is a flowchart of the steps performed by the microcontroller in updating timers that control the duration of the doll's behavioral patterns.

Following the reset subroutine 29, the microcontroller 17 executes step 30, during which the microcontroller 17, either waits for the 1 millisecond flag TOF, or in those embodiments using a timer-interrupt, re-sets (for reliability purposes) the TSCR to provide the interrupt every 32.8 milliseconds, as further described in FIG. 7A. Step 30 processes the signals from the switches 21, 22, 23, 24 and 26 present at the input pins of the microcontroller 17, logically inverts the signals to convert them to positive logic (i.e., a switch closure is represented by a logic 1) and stores this number in RAM for processing in steps 31 through 38. Step 30 then initiates the rhythms that relate to the doll's metabolism and crying episodes, via the "timers" subroutine. The microcontroller 17 then executes steps 31 through 38 in succession.

Each of the steps 31 through 37 of FIG. 6, comprises a "state machine", and comprises a collection of microcontroller instructions organized into a plurality of modules, hereafter termed "states". Coupling between state machines is achieved through timers which change with input conditions, and the doll's treatment, as shown in FIG. 8. Stepping through the state machines, the microcontroller 17 processes in state machine m3x, x-axis motion received from the motion sensor 21. In a manner similar to step 31, in step 32, the microcontroller 17 processes, in state machine m3y, y-axis motion received from the motion sensor 22. Likewise, in step 33, the microcontroller 17 processes in state machine m3z, z-axis motion received from the motion sensor 23. In step 34, the microcontroller 17 processes the input received from the feed-switch 24. In step 35, the microcontroller 17 processes the behavioral state machine m1, which, as will be further described, comprises a plurality states, each of which represents the doll's particular behavior and emotions, such as hunger, crying, and colic. In step 36, the microcontroller 17 processes the heartbeat state machine m2, which, as will be further described, comprises a plurality of states representing the color and blink frequency of the LED 15 representing the doll's heartbeat. In step 37, the microcontroller 17 processes the cry state machine m5, which as will be further described, comprises a plurality of states generating various sounds, such as, for example, a continuous wail, a halting cry, or a burp. In step 38, the microcontroller 17 processes in supervisor state machine, "out_supervisor", outputs from the above state machines. In processing such outputs, the out_supervisor state machine 38 produces or modifies the heartbeat LED 15, turns on or off the eye LEDs 11, and turns off the speaker 19. After the microcontroller 17 executes step 38, it loops back to step 30. In some embodiments, the microcontroller 17 repeats steps 30 through 38, and typically executes each state for about every 350 microseconds ad infinitum, unless interrupted by the hardware timer interrupt routine shown in FIGS. 7A and 7B, or an ancillary interrupt service routine, such as, for example, a routine servicing of an ancillary switch 26, such as, for example, the impact switch 26. In another embodiment, the microcontroller 17 waits at step 30 until the TOF indicates that 1 millisecond has accumulated, and then it repeats steps 30 through 38. The time taken by the microcontroller 17 to route to a state depends on which states are executed and the branches taken within those states. Each of these state machines 30 through 37 and out_supervisor 38 are described in greater detail below.

To illustrate the microcontroller's execution of the state machines shown in FIG. 6 reference is made to behavioral state machine m1, 35, in FIG. 8. While executing the MAIN program in step 35 of FIG. 6, the microcontroller 17 loads into an index register the number of the state to be executed, this state having been previously saved by microcontroller 17 in a RAM variable called m1.next_state. In this example, the state can be a wailing state shown in FIG. 8 as state 69. State Wail 69 is represented by the number 6. Thus the number 6 representing state m1.s.wail, is loaded into an index register. It is important to note that each step (30–38) in the MAIN program, has its own "next_state" variable, each of which points the microcontroller's execution into its own "jump-table", that is, an ordered list of all the addresses of the states in that particular state machine. In this example, the index number 6 directs the microcontroller 17 to the seventh entry of m1's jump table entitled "m1.jmp_table" (0 is the first entry). The jump-table then directs the microcontroller 17 to the address of the state to be executed, in this example, state 6, m1.s.wail.

As stated above, a typical state begins by directing the microcontroller 17 to store the state's output in a RAM variable "m1.output". As will be described in detail below, this number will direct the other state machines to execute the functions "eyes 11 on" and "speaker 19 on at 1000 hertz". The microcontroller 17 then logically tests selected inputs, variables and timers, and determines the next_state to which the state machine will "transition" the next time the state machine is executed. Lastly, the state directs the microcontroller 17 to "transition", that is, to store the number of the next_state. In this example, the next state could be 6 (m1.s.wail), or 4 (m1.s.feedawake1), or 1 (m1.s.hungry1) as shown by the arrows exiting the state. If the logical tests on selected variables by the microcontroller 17 determine that the number 4 representing "m1.s.feedawake1", shown in FIG. 8 as 67, is the number of the next_state, then the state machine directs microcontroller 17 to save this number (4) in the state's next-state variable—in this example, "m1.next_state". The state machine then returns the microcontroller 17 to the MAIN program shown in FIG. 6. MAIN then directs the microcontroller's attention to the next state machine, which, in this example is step 36. Each state machine 31 through 37 generally has a similar structure but can differ in the number of states.

As described above, the microcontroller 17 executes all the state machines 30–38, then loops back to step 30, waits in certain embodiments, and repeats the loop. The typical number of machine instructions the microcontroller 17 executes in a single visit to a state is from about 8 to about 15, requiring, in one embodiment, from about 30 to about 50 machine cycles of 1 microsecond per instruction, assuming a ceramic resonator 25 operating at 2 megahertz. To execute a single loop through MAIN, the microcontroller 17 can execute about 100 instructions in about 350 microseconds. Different states and different branches through a state machine will require differing numbers of instructions and times to execute.

Figure 7B:
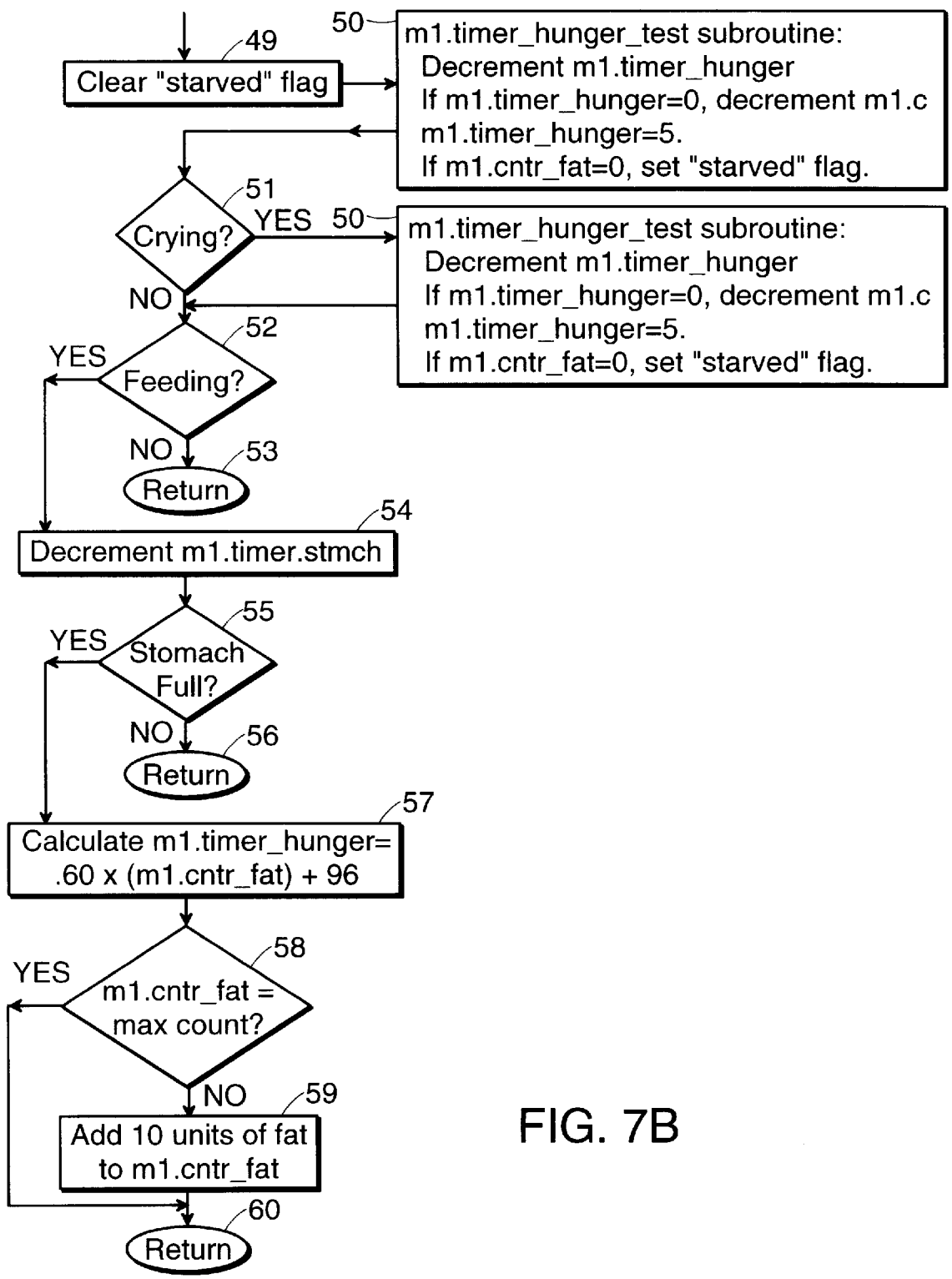
FIG. 7B is a flowchart illustrating one embodiment of the steps performed in adjusting the metabolism of the doll in response to hunger, crying and feeding.
Figure 8:
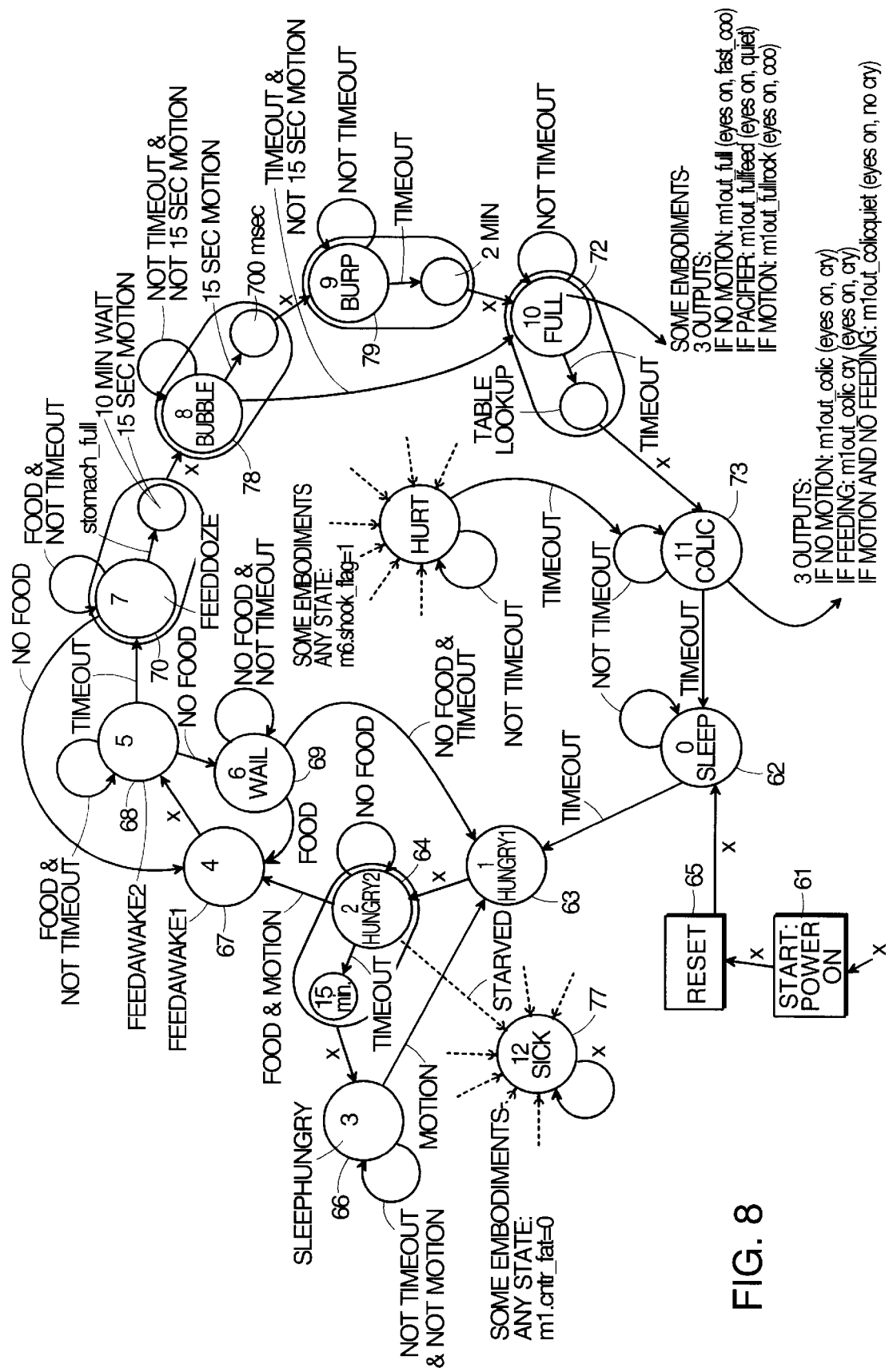
FIG. 8 is a state diagram illustrating one embodiment of a state machine according to the present invention that provides the doll's behavior.

Referring now to FIGS. 7A and 7B, shown is one embodiment of the steps that the microcontroller 17 takes in setting the timers that provide real time interrupts that cause the infant's cycles of crying, feeding, colic, heartbeat, weight gain and overall health. It is to be noted that the terms timer and counter are used interchangeably herein. Three basic tasks are carried out in the flow charts of FIGS. 7A and 7B. These tasks include the execution of a sound routine, updating of second, minute and hour counters, and the execution of routines that control the doll's metabolism. In the present embodiment, these steps are executed once every millisecond. It is to be appreciated, however, that the frequency of execution may be varied as desired.

In one embodiment, following the wait at step 30, the microcontroller 17 is directed to the "Timers" routine step 40, as shown in FIG. 7A. In another embodiment, once every millisecond, an interrupt from a hardware timer internal to the microcontroller 17 directs the microcontroller 17 out of the MAIN program sequence of FIG. 6 to step 40, as shown in the flowchart of FIG. 7A. In step 40, the microcontroller 17 first determines whether an episode of crying is to commence, and if determined affirmatively, control is routed to step 41 where a sound routine is executed. In arriving at the decision to execute the sound routine 41, the crying state machine M5, 37 can test an output variable produced by the behavioral state machine of FIG. 8. In the present embodiment, each state of the behavioral state machine of FIG. 8 places in its output variable "m1.output" a binary number, the bits of which define the status of the eye LEDs 11 and the speaker 19.

For example, referring briefly to FIG. 8, when the state is "Burp" state 79, the microcontroller 17 places the number represented by 11101100 in m1.output. This number, as will be described in detail below, represents "eyes on, cry at 80 hertz". In one embodiment, the microcontroller 17, when executing the crying state machine m5, 37 tests the bits of this number and thereby determines from this number that a continuous sound should be produced. Prior to executing sound routine 41, the microcontroller 17 determines the frequency of the sound to be produced. In so doing, the microcontroller 17 masks off the most significant bits 1110 and sends the four least-significant bits to its output variable "m5.output" as a binary number 00001100. Subsequently, the microcontroller 17 executes the sound routine in step 41, and tests m5.output bit 7, and finds that it is zero. This directs step 41 to save the four bits (binary number 00001100, decimal 12) in "cry_counter", and until further notice, uses this number plus 1, that is, decimal 13, as a divisor of 1000 Hz to produce the required 80 hertz burp (1000/13=77 Hz). Once every millisecond, sound routine 41 decrements the number in cry_counter. In 13 milliseconds, that is, when sound routine step 41 has decremented cry_counter to zero, it will turn on the output bit which controls the speaker 19, and reset cry_counter to 13. By following the above process, the microcontroller 17 uses the four divisor bits to produce a maximum frequency of 1000 hertz (1000/1) and a lowest frequency of 59 hertz (1000/17).

After the crying state machine m5, 37 executes sound routine 41 or determines that no cry is to be actuated, control is then routed to step 42 where a determination is made whether a timing flag has been set. In one embodiment, the timing flag derives from a hardware counter from which other timers are derived, and can be set to count or tick every 32.8 milliseconds. In another embodiment, the 32 millisecond timing flag is derived from a software divide-by-31 counter. As will be further described, certain timers are set to count every second, minute or hour, in accordance with certain infant cycles, and thus the timing flag 42 serves as the timer from which counts assigned to other such timers are determined. As will be further described, to derive other counters, a divide operation can be performed on the output of the timing flag as it is applied to the objectives for a specific counter. If the timing flag has not been set, control is routed to step 43, and the timing flag is reset to count every 32.8 milliseconds. Control is then routed to step 49 where the interrupt is cleared. Control returns back to the place in the program from where the interrupt diverted the execution, that is, it returns back to the normal program sequence, or, in another embodiment, control is returned to MAIN step 30.

Referring again to step 42, if the timing flag is set, control is routed to step 44 where counters that control the timing of different infant behavioral cycles are updated. As will be further described, m1.timer0, a minute counter, and m1.timer1, a 32.8 millisecond counter, are used by the behavioral state machine. M2.timer0 is used by the heartbeat machine, m3.timer0 is used by the x, y, z axis state machines, m4.timer0 is used by the feeding state machine, and m5.timer0 is used by the crying state machine. The timers increment or decrement time stored, in response to sensing proper infant care or a lack thereof. Thus, the doll's cycles of feeding, sleeping, crying, and colic are timed, and the duration of each cycle is dependent in part on the treatment administered to the doll during each of the other cycles. In the present embodiment, the timers that control the different behavioral cycles can be updated in step 44A, every 32.8 milliseconds, every second, every minute, and every 180 minutes. In accordance with one embodiment of the present invention, each of the timers used in the present invention and its associated function and use are summarized in TABLE A.

TABLE A

SUMMARY OF TIMERS UPDATED IN FIGS. 7A AND 7B
(Those timers not shown in TABLE A are described in the text.)

| Timer | Function | used by |
|---|---|---|
| cry_counter | counts down every 1 millisecond | "timers" routine to divide 1000 hz to produce sub-harmonic sounds |
| m6.timer_gswitch | counts down every 1 millisecond | m6 ancillary G-switch state machine and "hurt" interrupt subroutine |
| m3.timer1 | counts down every 1 millisecond | m3 x, y, z motion sensors, delays sensing after cry |
| ms1_counter | counts down every 1 millisecond, divides by 32 | implementations that wait at "wait_loop" rather than are driven by 32.8 msec interrupt flag. |
| m1.timer1 | counts down once every 32.8 millisecond | m1 behavioral state machine |
| m2.timer0 | counts down once every 32.8 millisecond | m2 heartbeat |
| m3.timer0 | counts down once every 32.8 millisecond | m3 x, y z motion sensors |
| m4.timer0 | counts down once every 32.8 millisecond | m4 feeding-switch state machine m1.s.feeddoze |
| m5.timer0 | counts down once every 32.8 millisecond | m5 crying state machine |
| m6.timer0 | counts down once every 32.8 millisecond | m6-ancillary G-switch state machine |
| msec32_counter | divides 32.8 millisecond by 30 to yield a one-second tick | "timers" routine only |
| m1.motion_timer | counts down once every 1 second | m1.s.feedoze, m1.s.bubble |
| cntr_motion | counts down once every 1 second, from | "timer" routine, accumulates |

TABLE A-continued

SUMMARY OF TIMERS UPDATED IN FIGS. 7A AND 7B
(Those timers not shown in TABLE A are described in the text.)

| Timer | Function | used by |
|---|---|---|
| sec_cry_timer | 255 to 0 divides 1 second ticks by 60 to yield minutes | movement for cntr_neglect "timers" routine to time crying for cntr_neglect |
| min_cry_timer | counts down from 10 minuts to 0 minutes | "timers" routine to time crying for cntr_neglect |
| sec_counter | divides 1 second ticks by 60 to yield 1-minute tick | "timers" routine only |
| m1.timer0 | counts down once every 1 minute | m1 behavioral state machine |
| m1.timer01 | counts down once every 1 minute | some embodiments of m6.s.hurt |
| m1.timer_hunger | if doll is not crying counts down once every 1 minute or if doll is crying counts down twice per minute | "timer" update_hunger subroutine, |
| m1.cntr_fat | counts down whenever m1.timer_hunger borrows a "unit" of fat | "timers" update_hunger subroutine, m2 heartbeat and/or out_supervisor |
| m1.timer_stmch | counts down once every 1 minute when feeding | "timer" update_hunger subroutine |
| min_counter | In some embodiments, divides 1 minute ticks by 180 to yield 3-hour tick; in other embodiments divides 1 minute ticks by 60 to yield 1 hour tick. | "timers" routine only |
| hour_counter | In some embodiments divides 3-hour tick by 32 to yield circadian rhythm; in other embodiments divides 1 hour ticks by 24 to yield the hour of day. | m1.s.full's colic_table |

As described in the state machines of FIGS. 8–12 below, the doll's behavioral cycles are adaptive, that is, the treatment of the doll during one cycle affects the duration of other cycles, a feature of the invention achieved through storage of counts in the timers described above.

Referring again to FIG. 7A, after each of the timers have been updated, control is routed to step 44B where a divide by 30 operation is performed on the timing flag to produce one second "ticks". As will be further described, the one second ticks are used to update the motion_timer, if motion has occurred, as shown in steps 45A and 45B, represented by a non-zero m3.timer0. Control is then routed to step 46, where a divide by 60 operation is performed on sec_counter, to produce one minute ticks. Control is then routed to step 47, where additional counters, given by m1.timer0 and m1.timer_hunger, are updated every 60 seconds.

As will be further described, m1.timer0 is used by the behavioral state machine m1 whenever the state machine needs to count longer time durations of minutes or hours. For example, referring to FIG. 8, in one embodiment of the invention, the state m1.s.hungry1, shown as 63, places a 15 minute count in m1.timer0 before it transitions to state m1.s.hungry2, shown as 64. m1.s.hungry2 will test m1.timer0 for 0, and if the doll has not been fed before the 15 minute "time-out" occurs, that is, by the time the count in m1.timer0 arrives at zero, then state m1.s.hungry2 64 will transition to state m1.s.sleephungry 66.

The timer associated with the behavioral state machine, m1.timer0, is used by many of the m1 states. The timer m1.timer_hunger is used in the subroutine further described in FIG. 7B to produce the doll's metabolism, as will be described below. The circadian/maturation counters are next updated, which, in the present embodiment are represented by the timer min counter 48A and the timer hour counter 48B. In one embodiment, the timer min_counter 48A is a 60-minute counter, and the timer hour_counter 48B is a 24-hour counter. In this embodiment, the hour_counter 48B divides the day into 24 1-hour segments, and from day to day the colic time does not vary, as it does in the following embodiment described below. In this embodiment, the timer min_counter 48A is a 180-minute counter and the timer hour-counter 48B is a 3-hour counter. The timer hour_counter 48B divides the day into eight three-hour segments, each of which can represent a duration of colic represented by an entry in a colic table, which can be a look-up table stored as m1.s.full, FIG. 8, 72. As will be described in detail below, m1 state m1.s.full, shown as 72 in FIG. 8, uses the number in the timer hour_counter 48B to determine the length of time that the doll will suffer colic in state m1.s.colic, shown as 73 in FIG. 8.

Referring briefly herein to TABLE D, which is further described below, shown in the highlighted example portion of the Table, in day four, from hours 75–77 since birth, the entry minutes_5 indicates that the doll will suffer five minutes of colic if it is fed within the corresponding three hour time slot. Note that in hours 84–86, the corresponding colic time is zero. This corresponds to an infant who has cried himself to sleep after a 60 minute bout of evening colic. In this embodiment, the colic times are assigned such that if the doll were activated, i.e. born, during the mid-morning hours, it would experience colic between 6 PM and midnight, and during the nighttime the doll will be free of colic. It is to be appreciated that the number of days over which the colic_table extends and the length of time segments (e.g. 1 or 3 hours), may vary depending on the embodiment. Moreover, other types of tables can be the source of parameters which modify the doll's behavior as it ages, for example the length of time it feeds, the sounds it makes and so forth.

Referring again to FIG. 7A, after the timers have been decremented, the interrupt is cleared in step 48C and program control returns to the point in the program it was at prior to the interrupt, as shown in step 49. In another embodiment, program control returns to MAIN step 30.

Referring to FIG. 7B, shown are the steps executed by the microcontroller 17 in updating the timers that control the doll's metabolism, particularly, the two modifiable RAM variables m1.cntr_fat and m1.timer_hunger that store numbers representing the doll's weight (fat) and blood-sugar (hunger). Referring to step 48, m1.timer_hunger in the present embodiment is updated about once every one minute. As shown in TABLE A above, m1.timer_hunger decrements with time, at a rate that increases with crying. Control is then routed to step 49 where a "starved" flag is cleared in preparation for tests to follow. As will be further described, a doll that is "starved" is one that has not been fed, or has been fed but has lost weight due to crying, colic, neglect, and/or abuse. Control is then routed to step 50 which subtracts, through the m1.timer_hungertest subroutine, one unit of available "energy" by decrementing the count stored in m1.timer_hunger.

For describing the rationale behind the use of a starved variable, consideration of infant neglect is applicable. To understand neglect, reference is made to the Merck Manual, Ch. 191 and Ch. 193 (Ch. 191 "Developmental problems, Failure to Thrive (FTT)", Ch. 193 "Child Abuse and Neglect"; Merck Manual, Merck & Co., 1992). A manifestation of abuse is "[e]motional . . . in infants, failure to thrive . . . is a common early observation. Inadequate parental stimulation and interaction with a small child often delays the development of social and language skills." (Merck, Ch. 193). A manifestation of neglect is "[e]motional deprivation: in early infancy, retardation of emotional growth may occur with blunting of affect and lack of interest in the environment. This commonly accompanies failure to thrive . . ." (Merck, Ch. 193). "As many as ½ of infantile failure-to-thrive cases may be due to neglect." (Merck, Ch. 193).

From a physiological standpoint, "failure to thrive" is defined in terms of weight: "Weight is used as the growth parameter of special interest because it is the most sensitive indicator of nutritional status . . . when the term is used to designate a syndrome, it most commonly refers to growth failure in the infant or child who suffers from environmental neglect or stimulus deprivation. It is then designated non-organic FTT . . ." (Merck, Ch. 191). "In FTT of any etiology, the physiologic basis for impaired growth is inadequate nutrition to support weight gain." (Merck, Ch. 191). "The psychological basis for nonorganic FTT appears to be similar to that seen in hospitalism, a syndrome observed in infants kept in sterile environments who suffer from depression secondary to stimulus deprivation; i.e., the unstimulated child becomes depressed, apathetic and ultimately anorexic." (Merck, Ch. 191).

Unfortunately the prognosis for children with nonorganic FTT is ". . . disappointing. Although more than half of infants with nonorganic FTT achieve a stable weight above the 3rd percentile, cognitive function, especially as related to verbal skills, is below the normal range in about half of the afflicted children. Moreover, many of such children have behavioral problems."

That infant abuse and neglect may lead to irreparable, lifelong misery is discussed in an article by Charles B. Nemeroff in Scientific America entitled "The Neurobiology of Depression" (June 1998). Nemeroff argues that such infants may suffer a lifelong vulnerability to depression: "To test the hypothesis, we have conducted a series of experiments in which neonatal rats were neglected. We removed them from their mothers for brief periods on about 10 of their first 21 days of life. As adults these maternally deprived rates showed clear signs of changes all in the direction observed in depressed patients." The article continues by discussing studies of Bonnet macaque monkeys which yielded similar results. "The rat and monkey data raise profound clinical and public health questions. In the U.S. alone in 1995, more than three million children were reportedly abused or neglected, and at least a million of those reports were verified. If the effects in human beings resemble those of the animals, the findings imply that abuse or neglect may produce permanent changes in the developing brain and therefore increase the victims' lifelong vulnerability to depression."

In the present embodiment, the doll becomes depressed if abused or neglected, similar to a human infant afflicted with FTT. Moreover, the doll suffers lasting and irreparable changes to its behavior. The depression expresses itself with the doll sleeping longer, that is, it sleeps beyond the time when it is hungry and when it does so it has to "metabolize fat", so that a severely depressed doll will actually loose weight on a chronic basis. For an abused/neglected doll there are two competing adaptive behaviors: whereas the well-treated doll adapts to its hunger by crying more often to be fed, a depressed doll will "adapt" to its neglect and/or abuse by sleeping longer to conserve energy.

Thus, in the system of the present invention, the behavior is simulated using the timers m1.timer_hunger and m1.cntr_fat. In one embodiment, if m1.timer_hunger is at zero, the doll's weight, given by m1.cntr_fat, is decremented, and the m1.timer_hunger is set to equal five, as shown in step 50. By decrementing the m1.cntr_fat, the doll's loss of weight due to lack of food or other neglect is recorded. This is similar to a human's metabolism, as whenever m1.timer_hunger is decremented to zero, the metabolism subroutine borrows a unit of fat by decrementing m1.cntr_fat. If m1.cntr_fat is zero, then the microcontroller 17 sets the "starved" flag causing the doll to take on a "sick" state, as further described in the behavioral state machine shown in FIG. 8.

Figure 7C:
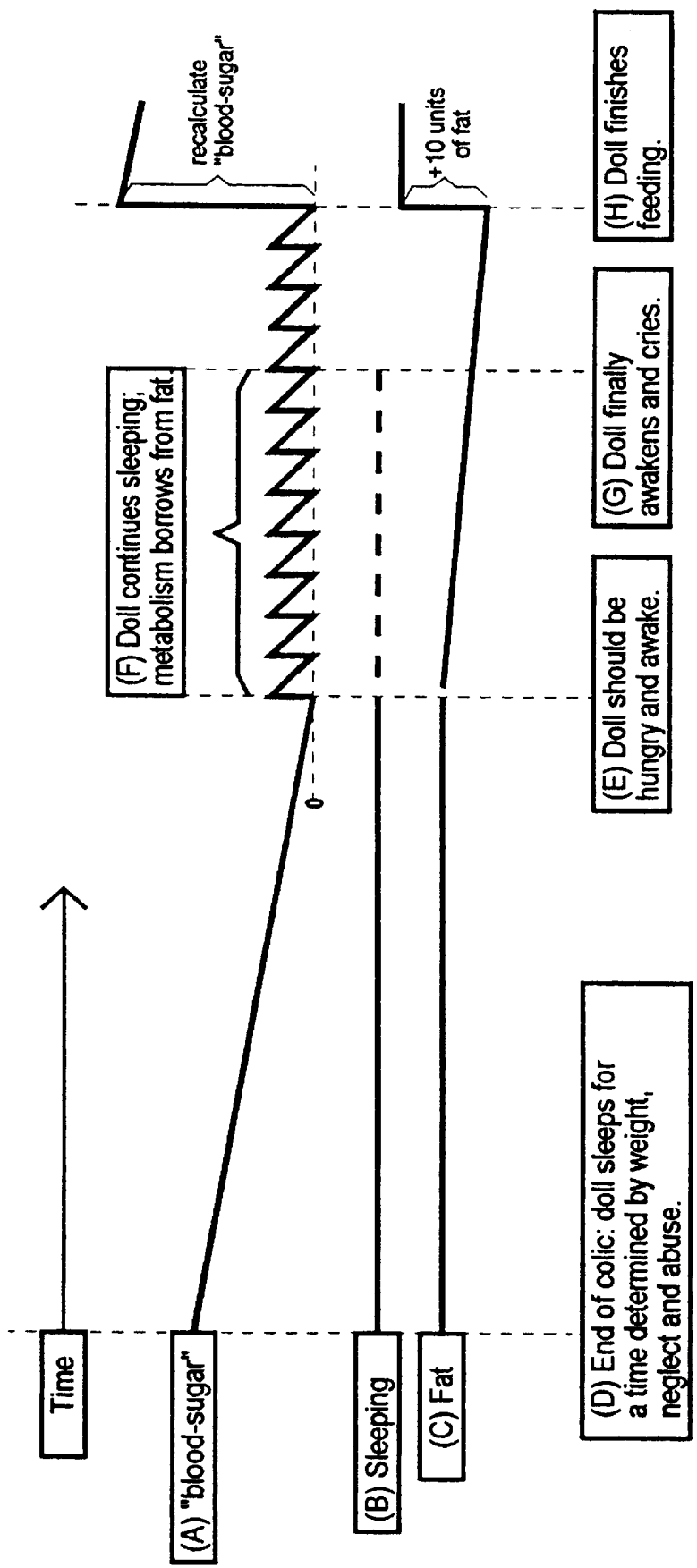
FIG. 7C is a graphical illustration of the effects of neglect and abuse on the doll.

Referring now to FIG. 7C, shown is a graphical illustration of the effects of neglect and abuse. In this figure, the declining line A shows the doll's normal declining blood sugar (counts in "m1.timer_hunger") over the time between feedings, at a rate of one count per minute. As shown at time D when colic ends, the sleep-time (counts in m1.timer0) is calculated to be the number of remaining counts in m1.timer_hunger plus 5 minutes per neglect incident (counts in "cntr_neglect" or yellow blinks) plus 5 minutes per abuse count in m6.cntr_gswitch (red blinks). The doll begins sleeping, as shown in solid line B, and continues sleeping through time E, when it should awaken because its blood-sugar is 0, to the end of the dashed line at time G, when it actually does awaken. The doll sleeps through time E because of the extra time added by neglect and abuse, and during the time between times F and G (represented by the dashed line) the metabolism must borrow fat from m1.cntr_fat to sustain the doll. As shown at time F by the ratchet-like line, every 5 minutes the metabolism has to add five units to m1.timer_hunger by borrowing a unit from m1.cntr_fat. Now, as shown by the downward trend of the line C, m1.cntr_fat begins a steady decline of 1 unit per five minutes. Eventually, at time G, the doll awakens (m1.timer0=0). Until the doll has finished eating at time H, the metabolism must continue to borrow units from m1.cntr_fat. The net result of this is that a mistreated, depressed doll will sleep longer, and it will gain weight (green blinks in some embodiments) at a significantly slower rate than a well-treated doll. In one embodiment, the number of green blinks can be increased to a maximum of 15 to convey to the caregiver that the doll is being treated with exceptional care, in contrast with a minimum of 0 which indicates a "sick" doll.

Referring again to FIG. 7B, after step 50 has been executed, control is routed to step 51, where a determination is made whether the doll is crying, that is, whether bit 6 in "m1.output" is "set" (logic 1). The bit assignments of m1.output in one embodiment are shown in TABLE B and will be discussed in detail below. If the doll is crying, control is routed again to step 50, where another unit of energy is subtracted from the count stored in m1.timer_hunger. As described above, tests are performed on m1.timer_hunger and m1.cntr_fat. If m1.cntr_fat is zero, the microcontroller 17 sets the "starved" flag.

in FIG. 7A. When control is routed to step 55 and a determination is made that m1.timer_stmch has decremented to zero, control is routed to step 57 where the number in m1.timer_hunger is recalculated. A new value for m1.timer_hunger is calculated to determine how long the doll's "energy", that is, the equivalent of a human infant's blood sugar, will last before its depletion requires the doll to again be fed. In this embodiment, the new value can be calculated by the equation: m1.timer_hunger=96 +0.6*

TABLE B

DEFINITION OF BITS IN M1.OUTPUT bit 7: 1 = eyes_on                                              0 = eyes off
bit 6: 1 = cry (sound)_on                                       0 = no sound
bit 5: 1 = extended sound, frequency given in bits 3, 2, 1, 0   0 = halting cry
bit 4: 1 = feeding [used by "timers"                            0 = not feeding
bit 3,2,1,0: sound frequency as follows:
    if bit 5 = 1, then bits 3,2,1,0 are the sound-frequency divisor
    if bit 5 = 0, then bit 3 is unassigned and bits 2,1,0 specify a broken-sound type as follows:
        bit 2, 1, 0 = 000 = cry
        bit 2, 1, 0 = 001 = coo
        bit 2, 1, 0 = 010 = fast cry
        bit 2, 1, 0 = 011 = fast_coo (giggle)

The following output values are sent to m1.output by the behavioral states, one output per state with the exceptions of m1out_full and m1.s.colic which use three values in each state.

| name of output | equals | binary number | State | Output description | | |
|---|---|---|---|---|---|---|
| m1put_eyesoff | equ | $00000000Q | ; | clock_set | not_eyes, | not_cry |
| m1out_eyeson | equ | $10000000Q | ; | clock_set; | eyes, | not_cry |
| m1out_clkset | equ | $10000000Q | ; | clck_set; | eyes, | not_cry |
| m1out_sleep | equ | $00000000Q | ;00 | sleep; | not eyes, | not_cry |
| m1out_hungry1 | equ | $11000000Q | ;01 | hungry1: | eyes, | cry, broken |
| m1out_hungry2 | equ | $11000000Q | ;02 | hungry2: | eyes, | cry, broken |
| m1out_sleephngry | equ | $00000000Q | ;03 | slphngry: | not_eyes, | not_cry |
| m1out_feedawake1 | equ | $10000000Q | ;04 | feedawake1: | eyes, | not_cry |
| m1out_feedawake2 | equ | $10000000Q | ;05 | feedawake2: | eyes, | not_cry |
| m1out_wail | equ | $11100000Q | ;06 | wail: | eyes, | cry, 1000 Hz |
| m1out_feeddoze | equ | $00010000Q | ;07 | feeddoze: | not_eyes, | not_cry |
| m1out_bubble | equ | $10000000Q | ;08 | bubble: | eyes, | not_cry |
| m1out_burp | equ | $11101100Q | ;09 | burp: | eyes, | burp, 80 Hz |
| m1out_full | equ | $10000011Q | ;0A1 | full: | eyes, | fast_coo |
| m1out_fullfeed | equ | $11000000q | ;0A2 | fullfeed: | eyes, | no_sound [pacifier] |
| m1out_fullrock | equ | $11000001Q | ;0A | fullrock: | eyes, | coo |
| m1out_colic | equ | $11000000Q | ;0B1 | colic: | eyes, | cry, broken |
| m1out_colicquiet | equ | $10000000Q | ;0B2 | colicquiet: | eyes, | not_cry |
| m1out_colicfeed | equ | $11100000Q | ;0B3 | colicfeed: | eyes, | cry, 1000 Hz |
| m1out_sick | equ | $01000000Q | ;0C | sick: | not_eyes, | cry, broken |
| m1out_hurt | equ | $11100000Q | ;0D | hurt: | eyes, | cry, 1000 Hz |

Referring again to FIG. 7B, if in step 51 the microcontroller 17 determines that the doll is not crying, control is routed to step 52, and the microcontroller 17 determines whether the doll is being fed. If the doll is not being fed, control is routed to step 53 and the microcontroller 17 returns to step 48A, where the microcontroller 17 resumes the updating of min_counter 48A and hour_counter 48B, the counters, which as described above, control circadian and maturation rhythms. If the doll is being fed, control is routed to step 54 and the microcontroller 17 decrements timer m1.timer_stmch, previously set to a count of 15 decimal. As further described in FIG. 8, the count is set by state m1.s.sleep 62 as it transitions to m1.s.hungry1 63, with 15 representing 15 minutes.

Control is then routed to step 55, where the microcontroller 17 determines whether the doll has finished feeding and its stomach is "full", that is, when m1.timer_stmch 51 has decremented to zero. In one embodiment, m1.timer_stomach is decremented at one minute intervals as the feed-switch 24 is depressed. If the timer has not decremented to zero, control is routed back to steps 48A shown (m1.cntr_fat). This number represents the amount of energy the doll has available before it is hungry again. In the present embodiment, the doll depletes energy at one unit per minute if it is not crying, and at two units per minute if crying. If the doll is well cared-for, the new value stored in m1.timer_hunger represents a significant number of minutes that must expire before the doll requires feeding again.

After m1.timer_hunger has been reset, control is routed to step 58, where a determination is made as to whether the value of the counter m1.cntr_fat has been exceeded. This step is done to prevent m1.cntr_fat from counting so high, that the count returns to zero, thereby erroneously indicating a starved doll. In the present embodiment, a maximum count is from about 240 to about 255 decimal, representing a healthy infant weight. A threshold count of 64, set by reset subroutine 29, represents the initial weight given to the doll after powering on. If the counter m1.cntr_fat has not been exceeded, control is routed to step 59 and ten units of fat are added to m1.cntr_fat.

In one embodiment, if the doll does not cry for a long time between feedings, ten units is sufficient to satisfy the doll's energy needs, and therefore, the doll will accumulate fat from feeding to feeding. As will be further described, the doll's sleep time is dependent upon its body fat, that is, as shown above, timer m1.timer_hunger is calculated from the count in m1.cntr_fat. For example, as further described in FIG. 8, when the microcontroller 17 in the sleep state m1.s.sleep 62 determines that m1.timer_hunger has been decremented to zero, it transitions to the hungry state m1.s.hungry1 63. Therefore, if the doll is considered a "newborn" or it has not been well fed, that is, if m1.cntr_fat in these embodiments) to be added to m1.cntr_fat; column (F) is the new m1.cntr_fat=(C)+10; column (G) is the cycle time in minutes=(B)+(D); and column (H) is the total time=$(G)_{prior\_cycle}+(G)_{this\_cycle}$. In the example spreadsheet below, the $0^{th}$ row represents the initial values for m1.cntr_fat and m1.timer_hunger. The next row (TABLE G), row 1, is the same as the example given in the text above. Rows 2 and 3 are given for reference.

TABLE G

EXAMPLE SPREADSHEET

| (A) cycle | (B) feeding time = 15 | (C) m1.cntr_fat at end of feeding = $(F)_{prior}$ − (B)/5 | (D) m1.timer_ hunger = 96 + 0.6* (C) | (E) units of fat = 10 | (F) replenished m1.cntr_fat = (C) + 10 | (G) cycle time, minutes = (B) + (C) | (H) total time, minutes (hour) |
|---|---|---|---|---|---|---|---|
| 0 | — | 64 | 20 | — | 64 | 20 | 20 (0.3 hr) |
| 1 | 15 | 64 − 3 = 61 | 132 | 10 | 71 | 147 | 167 (2.8 hr) |
| 2 | 15 | 71 − 3 = 68 | 136 | 10 | 78 | 151 | 318 (5.3 hr) |
| 3 | 15 | 78 − 3 = 75 | 141 | 10 | 85 | 156 | 474 (7.9 hr) | is a low number, the doll's sleep time will be shorter than if the doll is "older" and it has been well fed, that is, when m1.cntr_fat is a high number.

A doll that is well cared for, that is, the doll is fed quickly when it cries and rocked when it has colic; will gain full weight and reach a four hour sleep cycle in about 84 hours (3½ days). This time can be derived, for one embodiment of the system of the present invention, in the following manner. The doll, as a newborn (after power-on), starts "life" with 64 units of fat in m1.cntr_fat and a count of 20 in m1.timer_hunger. If it is not disturbed, it will sleep for 20 minutes, that is, until m1.timer_hunger is decremented to zero. The doll now requires 15 minutes of feeding. During that time, if the doll does not cry, m1.timer_hunger will have to borrow 3 units of fat from m1.cntr_fat (15 minutes/5 minutes per unit of fat=3 units of fat ). When the doll is fed and full, that is, when m1.timer_stmch is zero, m1.cntr_fat will have 64−3= 61 units of fat in it. The calculation m1.timer_hunger=96+ 0.6*(m1.cntr_fat) will equal 131. If the doll does not cry, this number 131, represents the total number of minutes (2 hours, 11 minutes) that the doll can last before it is hungry again. Now, because the doll has been fed, m1.cntr_fat receives 10 more units of fat, so it will now have 61+10 or 71 units of fat in it. The formula to compute how long the caretaker must feed the doll to bring the doll to full weight is the summation from i=1 to i=n of (96+0.6*(64+i(7)) subject to the constraint that in the $n^{th}$ interval, the number (96+0.6*(64+n(7)) must not be greater than or equal to 240. A spread sheet can be used to do this calculation. Complex spread sheets can be created to include time spent in each state, and various illustrations run to observe the effects of neglect and impacts on the doll's sleep time and time to gain full weight. The simplest spread sheet assumes a perfectly-cared for doll. This spread sheet has approximately 28 rows, each representing a 2- to 4-hour "cycle" of feeding-colic-sleep, and 8 columns assigned as follows: column (A) is the cycle number; column (B) is the feeding time (a constant of 15 minutes in these embodiments); column (C) is m1.cntr_fat at the end of the feeding which equals row $(F)_{prior\_cycle}$−(B)/5=m1.cntr_$\text{fat}_{prior\_cycle}$−(B)/5; column (D) is the calculation of m1.timer_hunger=96+0.6*(C), which also represents the number of minutes the doll will last before the next feeding; column (E) is the units of fat (a constant of 10 Given the starting conditions and the increments of 10 units of "fat", the doll will reach a 4-hour cycle in approximately 84 hours. It should be appreciated that, in other embodiments, this time can be decreased by increasing the fat units added, or increased by decreasing the fat units added. Additionally, it should be appreciated that "failure to thrive" such as might occur if the doll is repeatedly impacted or neglected (inadequate rocking or long periods of crying), can be simulated by making the increments of fat dependent on the doll's treatment. Other parameters such as crying time before sleep, colic time, sound of the cry and so forth, can be made dependent on the doll's metabolic state represented by m1.cntr_fat, and the time of day and/or its "age", via timers slowly but continuously incremented by min counter step 48A and hour counter step 48B shown in the flow chart of FIG. 7A.

Referring now to FIG. 8, shown is a behavioral state machine that describes the behavior of a newborn infant. The microcontroller 17 enters into the various states shown, after the doll is initially powered on in state 61. Once power is provided to the microcontroller 17, the reset subroutine, discussed above in step 29 of FIG. 6, is entered in state 65, where all necessary variables are initialized. In the present embodiment, the reset subroutine begins by clearing to zero the first 64 RAM locations. This causes all flags and timers to be zero and all state machines to start in their initial states with the number 0. Referring again to TABLE B, the behavioral state machine's m1 initial state is the sleep state 62, shown, for example, as m1.out_sleep, the crying state machine (FIG. 9), is inhale, state 70.

In one embodiment, the reset subroutine 65 in FIG. 8 contains three states which enable an instructor to synchronize the hour of the doll's birth to the time of day, so that the episodes of colic will occur in the evening hours. Immediately after the doll is powered on, and for 3 minutes thereafter, the doll's eyes blink the hour set in the hour_counter (shown as step 48A). The instructor can change the setting of the doll's "clock" by pressing the doll's feed-switch 24. The manner in which this is done in one embodiment is as follows. After power on, the reset subroutine 65 initializes both the hour_counter and an "eye_blink_cntr" (not shown) with the number 8, representing 8 AM, the default hour of the doll's birth. The reset subroutine 65 also initializes the timer m1.timer0 to a 3 minute time-out, thereby giving the instructor 3 minutes to set the hour. Three states, m1.eyesoff, m1.eyeson, and m1.clkset (not shown, but performed during the reset subroutine 65), blink the doll's eye LEDs 11 eight times at a rate of approximately 2 blinks per second, that is, the eyes are on for 60 milliseconds and off for 430 milliseconds, this pattern repeating 8 times. The two states m1.eyesoff and m1.eyeson do this in a manner analogous to the two heartbeat-blink states m2.s.on and m2.s.off described below and shown in FIG. 14. Following the eighth blink, a substate of m1.s.eyeson adds an additional off-time of 500 milliseconds, thereby providing a half-second visual separator between the sequence of 8 blinks. At any time the instructor can press the feed-switch 24. When the feed-switch 24 is pressed, the states m1.eyeson or m1.eyesoff transition to m1.s.clkset. State m1.s.clkset waits until the instructor releases the feed-switch 24. When the feed-switch 24 is released, state m1.s.clkset increments hour counter, compares the number therein to a maximum of 24 (24 representing 2400 hours, or midnight) and resets hour counter to 0 if the number 24 is exceeded. State m1.s.ck1set then sets an off-time of 930 milliseconds as a visual pause, and restarts the blink sequence by transitioning to state m1.s.eyesoff. In this manner, the instructor, by repeatedly pressing the feed-switch 24, advances the hour of the doll's birth from the initial setting of 8 A.M. For example, if the time of day is approximately 2 P.M. the instructor will press the feed-switch 6 times, that is, the first press increments hour_counter from 8 AM to 9 AM, the second press increments hour_counter from 9 AM to 10 AM, and so forth until the sixth press increments the time to 1400 hours, or 2 PM. The doll's eyes will thereafter blink 14 times followed by a pause, then repeat the pattern for the remainder of the 3 minute period. If the instructor is dissatisfied with the setting the instructor can reset the time by either successively pressing and releasing the feed-switch 24 until the count 'rolls over' from 2400 hours (midnight) to 0100 hours (1 AM), or by removing the battery and reinstalling it. The 3 minute time out is tested by the state m1.s.eyesoff. When the state m1.eyesoff detects that m1.time0 is 0, it initializes m1.time0 to 20 minutes of sleep, m1.timer_hunger to 20 minutes of hunger, m1.cntr_fat to 64 units, and transitions to m1.s.sleep.

The first truly behavioral state entered is sleep, given by state 62. As previously described, once each minute, notwithstanding which behavioral state the microcontroller 17 executes, the timers routine 29 of FIG. 6 updates two variables which represent blood sugar, m1.timer_hunger and m1.cntr_fat, and decreases blood-sugar by 1 or 2 units. When the blood sugar is depleted, that is, when m1.timer_hunger has a count of zero, the doll is hungry. The doll remains in sleeping state 62 either until it is hungry (m1.timer_hunger=0), or until the movement sensors 21, 22, and 23 sense movement while m1.timer_hunger is counting down and the doll is in the last 20 minutes of sleep. As the microcontroller 17 is in the process of transitioning from state 62 to state 63, the microcontroller 17 sets the empty-stomach timer (m1.timer_stmch) to 15 minutes and transitions to state 63, designated Hungry1.

While in state 63, Hungry1, a minutes timer (m1.timer0) is set to 15 minutes, and a transition is made directly to state 64, Hungry2. In state 64, the doll is hungry and cries, waiting for food and rocking. The doll remains in this state until the feed-switch 24 senses insertion of a nipple portion of a bottle and the motion sensors 21, 22, and 23 sense rocking. If the doll is not fed and rocked before the 15 minute time is up, that is, by the time m1.timer0 counts down from 15 minutes to zero, the microcontroller 17 transitions directly to a sub-state of 64, where m1.timer0 is set for 15 minutes. The microcontroller 17 then transitions to state 66, Sleephungry, in which the doll falls asleep for 15 minutes. If moved at any time while in state 66, the doll will awaken and cry, and the state Sleephungry 66, transitions to state 63, Hungry1. In state 63, the microcontroller 17 sets the timer m1.timer0 to 15 minutes, then transitions again directly to state 64.

If the doll remains unattended and is not fed, the microcontroller 17 will cause the doll to transition through 15 minute cycles of crying and sleeping, by passing through states 63, 64, and 66, as described above. During this time the microcontroller 17 causes the doll to slowly deplete its store of fat. As described above in step 50 of FIG. 7B, the count in m1.cntr_fat is decremented when the timer m1.timer_hunger goes to zero, and m1.timer_hunger borrows a unit of "fat" from m1.cntr_fat by reducing this counter by one. In one embodiment, m1.timer_hunger is decremented at the rate of one unit per minute if the doll is not crying, and at two units per minute if crying. If the doll uses up its store of fat, that is, if m1.cntr_fat goes to zero, the microcontroller 17 enters the "starved" state, and the "starved" flag, described in step 50 of FIG. 7B is set. This causes state 64 to transition to state 77 given by Sick.

When the doll enters the state 77, Sick, the doll is considered to be terminally ill, a condition in one embodiment represented to the caretaker by the speaker 19 sounding and by the heartbeat LED 15 assuming a red/red blinking state, in which the frequency of the blink is double its normal rate. At this point, only a power-off will reset the microcontroller 17 so it can resume simulation of infant behavior. As it is anticipated that the doll will be used to provide students with the experience of caring for an infant, the connection between the power supply to the microcontroller 17 can be configured such that deactivation is difficult to do. In the present embodiment, deactivation can only be done by removing the battery access door 28, removing the battery and reinserting it.

As shown in TABLE C, the behavioral state machine m1, while in each state, tests the timers of timer m3.timer0 of motion state machines (31, 32, 33) that processes the x, y and z movement sensors 21, 22 and 23, and timer m4.timer0 of feed-switch state machine (34) that processes the feed-switch 24.

TABLE C

| | INPUTS TO BEHAVIORAL STATE MACHINE M1, | | |
| --- | --- | --- | --- |
| behavioral state | input from m3 motion-timer | input from m4 feed-switch timer | other input to m1 |
| m1.s.sleep | m3.timer0 | — | m1.timer0 |
| m1.s.hungry1 | — | — | — |

TABLE C-continued

INPUTS TO BEHAVIORAL STATE MACHINE M1,

| behavioral state | input from m3 motion-timer | input from m4 feed-switch timer | other input to m1 |
|---|---|---|---|
| m1.s.hungry2 | m3.timer0 | m4.timer0 | m1.timer0 |
| m1.s.sleephngry | m3.timer0 | — | m1.timer0 |
| m1.s.feedawake1 | — | — | — |
| m1.s.feedawake2 | — | m4.timer0 | m1.timer1 |
| m1.s.wail | — | m4.timer0 | m1.timer1 |
| m1.s.feeddoze | — | m4.timer0 | m1.timer_stmch |
| m1.s.bubble | m1.motion_timer | — | m1.timer0 |
| m1.s.burp | — | — | m1.timer1 |
| m1.s.full | m1.motion_timer | m4.timer0 | m1.timer0, m3.timer0, m1.cntr_fat, hour_cntr, colic_table |
| m1.s.colic | m3.timer0 | m4.timer0 | m1.timer0, m6.cntr_gswitch, cntr_neglect, m1.timer_hunger |
| m1.s.sick | — | — | — |
| m1.s.hurt | — | — | m1.timer01 (in some embodiments), m1.timer0, m6.cntr_gswitch |

Note: In the present embodiment, if m.1cntr_fat= 0, i.e. doll is "starved", then m1 forces state m1.s.sick, or, if m6.shook_flag=1 then m 1 forces state m1.s.hurt; "sick" takes precedence over "hurt."

In another embodiment, the behavioral state machine m1 also tests the timer of a G-switch state machine m6 (not shown), which can process inputs from the acceleration/deceleration G-switch ancillary sensor 26. In the present embodiment, movement in motion sensors 21, 22, and 23 causes the microcontroller 17 to place a count of 1.5 seconds in the timer m3.timer0. If no movement is sensed by the sensors 21, 22, 23, then m3.timer0 counts down to zero. Likewise, depression of the feed-switch 24, through the action of feed-switch state machine 34, can cause the microcontroller 17 to place a count of 1.5 seconds into the timer m4.timer0. If the feed switch 24 is not depressed, m4.timer0 counts down to zero. The function of both m3.timer0 and m4.timer0 delay is to desensitize the response of the microcontroller 17 to the absence of motion, or release of the feed-switch 24.

Referring again to state 64, Hungry2, to terminate the doll's crying, the caretaker must move and feed the doll by contacting the nipple portion of a bottle against the feed switch 24. When these tasks are carried out, state Hungry2will transition to state Feedawake1 67. In state Feedawake1, 67, the microcontroller 17 sets a seconds timer m1.timer1 to 3 seconds and transitions directly to state 68, given by Feedawake2. If the doll is not moved, the microcontroller 17 will not transition to Feedawake1 state 67. This requirement for movement prevents a student from inserting a baby bottle into the doll's mouth while the doll is in sleeping state 66 and then neglecting the doll by not rocking it.

While in state 68, the doll's eyes are open, that is, the LEDs 11 are lit. If feeding continues for three seconds, state 68 transitions to state 70, Feeddoze. While in state 70, the doll's eyes are closed, that is, LEDs 11 turn off. However, if feeding is interrupted, state 68 sets the timer m1.timer1 for three seconds and transitions to state 69 given by Wail. In this state, the doll's speaker 19 will emit a continuous 1000 hertz cry for three seconds if not fed, and after three seconds, the microcontroller 17 transitions back to state 63, given by Hungry1. If the doll is fed in state 69, the microcontroller 17 transitions from state 69, Wail, back to state 67, given by Feedawake1, which results in transitions to states Feedawake2, 68 and Feeddoze, 70.

After the doll has been fed and the microcontroller 17 transitions to state 70, given by Feeddoze, the microcontroller 17 determines whether m1.timer_stmch equals zero. If this counter has decremented to zero, the microcontroller 17 determines that the doll is an adequately fed doll having a full stomach. Once the doll's appetite is satisfied, that is, once the timer m1.timer_stmch=0, as shown in FIG. 7B, step 55, the microcontroller 17 calculates, from the number in m1.cntr_fat, the new count to be stored in m1.timer_hunger, as shown in FIG. 7B, step 57. Simultaneously, the state Feeddoze 70, which has also waited for m1.timer_stmch to equal zero, sets the timer m1.timer0 for 5 minutes and sets the timer m1.motion_timer for 15 seconds and then transition to state 78, given by Bubble. The timer m1.motion timer (shown in FIG. 7A, steps 45B and 45C) accumulates motion until 15 seconds total is reached. While in state 78 the doll will exhibit a period of tranquillity, as the doll is awake, that is the LEDs 11 are lit, but the doll is not crying. State 78 either transitions to state 79, given by Burp when the motion counter accumulates 15 seconds, or if the 5 minute time-out occurs first, step 78 transitions to 72, given by Full.

If a transition to state 79, Burp, is made, a 700 millisecond time-out is set for m1.timer1, and state 79 saves in m1.output a request for continuous sound at 80 Hz. As previously described, a continuous sound, in this case a 'burp', is represented by a number saved in m1.output, which in this instance is the number 11101100 binary, as described in TABLE B. In one implementation, the counts in m1.timer0 remaining after state 78, Bubble transitions through state 79 Burp, are carried into state 72 Full. The remaining time delays the transition of state 72, Full, to state 73, Colic. For example, if the student is desultory about burping the doll and takes 2 minutes to complete the task, approximately 3 minutes of the 5 minutes initially set by Feeddoze 70 will be left in m1.timer0. During the remaining 3 minutes, if the doll has achieved a level of maturity and health represented by a count in m1.cntr_fat greater than 192, state 72 Full will save in m1.output the number for "eyes_on, slow_coo." State 72 Full tests m3.timer0 and if motion is detected, that is, m3.timer0 is not zero, state 72 Full saves in m1.output the number for "eyes_on, excited_coo." State 72 Full tests the feed switch 24, and if it detects that the feed-switch 24 is pressed, for example by a pacifier or a nipple N, then state 72 Full saves the number for "eyes_on, no_sound." When state 72 Full tests m1.timer0 and finds it equal to 0, that is, timed out, the microcontroller 17 uses the count in the circadian/maturation timer hour_counter together with the base address of a look-up table in colic_table, shown below in TABLE D, to do an indexed retrieve of the colic time from the table.

10 A.M.) If a feeding occurs in that interval, the doll will suffer 5 minutes of colic, as designated by the entry "minutes_5." If the doll has not been burped, state 72 Full adds to this number an extra 15 minutes of colic time. This number is then saved in m1.timer0 in preparation for tran-

TABLE D

COLIC_TABLE db is an assembler-directive abbreviation for "data byte"
minutes_0   is defined as   0 base 10   = 00000000 base 2
minutes_2   is defined as   2 base 10   = 00000010 base 2
minutes_5   is defined as   5 base 10   = 00000101 base 2
minutes_10  is defined as  10 base 10   = 00001010 base 2
minutes_15  is defined as  15 base 10   = 00001111 base 2
minutes_30  is defined as  30 base 10   = 00011110 base 2
minutes_60  is defined as  60 base 10   = 00111100 base 2
minutes_90  is defined as  90 base 10   = 01011010 base 2

|  | data byte | minutes of colic | table entry | 3-hour interval since birth | | Time of day |
|---|---|---|---|---|---|---|
| DAY 1: | | | | | | |
| colic_table | db | minutes_2 | ; entry 0 | hours 0–2 | assumes a 10 AM birth— | 10–12 PM |
| | db | minutes_5 | ; entry 1 | hours 3–5 | | 1–3 PM |
| | db | minutes_10 | ; entry 2 | hours 6–8 | | 4–6 PM |
| | db | minutes_15 | ; entry 3 | hours 9–11 | | 7–9 PM |
| | db | minutes_0 | ; entry 4 | hours 12–14 | | 10–12 AM |
| | db | minutes_0 | ; entry 5 | hours 15–17 | | 1–3 AM |
| | db | minutes_0 | ; entry 6 | hours 18–20 | | 4–6 AM |
| | db | minutes_5 | ; entry 7 | hours 21–23 | | 7–9 AM |
| DAY 2: | | | | | | |
| | db | minutes_5 | ; entry 8 | hours 24–26 | | 10–12 PM |
| | db | minutes_5 | ; entry 9 | hours 27–29 | | 1–3 PM |
| | db | minutes_15 | ; entry 10 | hours 30–32 | | 4–6 PM |
| | db | minutes_30 | ; entry 11 | hours 33–35 | | 7–9 PM |
| | db | minutes_0 | ; entry 12 | hours 36–38 | | 10–12 AM |
| | db | minutes_0 | ; entry 13 | hours 39–41 | | 1–3 AM |
| | db | minutes_0 | ; entry 14 | hours 42–44 | | 4–6 AM |
| | db | minutes_5 | ; entry 15 | hours 45–47 | | 7–9 AM |
| DAY 3: | | | | | | |
| | db | minutes_5 | ; entry 16 | hours 48–50 | | 10–12 PM |
| | db | minutes_5 | ; entry 17 | hours 51–53 | | 1–3 PM |
| | db | minutes_15 | ; entry 18 | hours 54–56 | | 4–6 PM |
| | db | minutes_90 | ; entry 19 | hours 57–59 | | 7–9 PM |
| | db | minutes_0 | ; entry 20 | hours 60–62 | | 10–12 AM |
| | db | minutes_0 | ; entry 21 | hours 63–65 | | 1–3 AM |
| | db | minutes_0 | ; entry 22 | hours 66–68 | | 4–6 AM |
| | db | minutes_5 | ; entry 23 | hours 69–71 | | 7–9 AM |
| DAY 4 and ad infinitum: | | | | | | |
| | db | minutes_5 | ;entry 24 | hours 72–74 | hours 96–98 etc | 10–12 PM |
| | db | minutes_5 | ;entry 25 | hours 75–77 | hours 99–101 . | 1–3 PM |
| example in | db | minutes_15 | ;entry 26 | hours 78–80 | hours 102–104 . | 4–6 PM |
| text | db | minutes_60 | ;entry 27 | hours 81–83 | hours 105–107 . | 7–9 PM |
| | db | minutes_0 | ;entry 28 | hours 84–86 | hours 108–110 . | 10–12 AM |
| | db | minutes_0 | ;entry 29 | hours 87–89 | hours 111–113 . | 1–3 AM |
| | db | minutes_0 | ;entry 30 | hours 90–92 | hours 114–116 . | 4–6 AM |
| | db | minutes_5 | ;entry 31 | hours 93–95 | hours 117–118 . | 7–9 AM |

In this embodiment, a number retrieved from the table ranges from 0 to 90 minutes depending on the time of day and the doll's maturity. The table is designed as follows: it divides each of four days into 8 intervals of 3 hours for a total of 32 entries, where each entry is colic time in minutes that will occur when a feeding occurs in that interval. The number stored in the hour_counter represents the number of 3-hour intervals that have occurred since the doll was "born". This number points to the entry in the table. For example, the high-lighted entry in TABLE D shows that, if the number 25 decimal were in hour counter, this would point to the twenty-fifth 3-hour interval since the doll's "birth", that is, the hours 75–77, or between 1 and 3 PM of day 4 (assuming that the doll was "born" (i.e. turned on) at sition to state 73, Colic. Thus, if the doll has been burped, and the doll was born in the morning, it will not suffer colic during nighttime hours. After 4 days, the table repeats the last 8 entries, that is, day 4 is repeated ad infinitum. It is to be appreciated, however, that the specific entries in the Table, and the number of days, may be varied as desired, such as, for example, a crying spell in the night hours can be used to simulate an ill infant.

Referring again to state 72 Full, the microcontroller 17 transitions to state 73, given by Colic, which simulates the effects of an infant's immature digestive system that causes him or her to suffer from fretfulness or colic. While in state 73, the doll cannot be comforted by feeding. State 73 tests the feeding timer m4.timer0. If it finds that m4.timer0 is not zero, that is, the doll is being fed, the microcontroller 17 saves in m1 output the number m1out_colicfeed=11100000 binary, as shown in TABLE B. This number commands the supervisor 38 to turn the doll's eye LEDs 11 on, and the crying state machine 37, and as further shown in FIG. 9, to cause the doll to cry a sustained wail at 1000 Hz. Again referring to state 73 Colic, the state tests the motion timer m3.timer0. If the timer is not zero, that is, the doll has been rocked or otherwise moved, the microcontroller 17 saves in m1.output the number m1out-colicquiet=10000000 binary as shown in TABLE B. The supervisor 38 will turn on the doll's eye LEDs 11, but the doll will not cry. If the test indicates no motion, that is, timer m3.timer0 will be zero, indicating that the doll has not experienced movement in the previous 1.5 seconds, the microcontroller 17 saves in m1.output the number m1out_colic=11000000 binary, as shown in TABLE B. The doll's eye LEDs 11 will turn on, and it will cry a broken cry. While in state 73, the microcontroller 17 tests m1.timer and when it finds that it has been decremented to zero, it causes a transition to state 62 given by Sleep, and the LEDs 11 turn off.

While in state 62 Sleep, the length of time during which the doll sleeps is determined by the counts remaining in m1.timer_hunger, which as previously described, is determined by how much fat is stored, that is, from the count in m1.cntr_fat. Thus, the count is determined by how "old" the doll is, how well the doll has been treated, and how long the doll's last fretfulness/colic episode lasted. In one embodiment, the duration of sleep can be computed as follows. For purposes of illustration, suppose the doll has the following history: after feeding, m1.cntr_fat contained the number 138, the doll is 34 hours old, and the doll was burped after 2 minutes but cried for 7 minutes during a 30 minute bout of colic. Then the number of minutes the doll began with after its feeding can be determined by: 96+0.6*(138)= 178 minutes, using the equation for calculating m1.timer_hunger, as described above. This value is then saved as the number 178 decimal in m1.timer_hunger. Ten units of fat are added to m1.cntr_fat, increasing it to 148 units. Two minutes are spent in state 78, given by Bubble, which reduces the number to 178−2=176. Three more minutes were spent in state 72 Full, reducing 176 by 3 to 173. State 72, given by Full, gets from the eleventh entry of colic_table (see TABLE D), the number 30, that is, 30 minutes of colic. This further reduces the time to 173−30=143. After crying for example, for 7 minutes in Colic, the number will be reduced an additional 7 minutes to 143−7=136. Thus, it can be seen that in this example the doll will sleep for 136 minutes. If, for example, the doll has accumulated over its life one neglect incident but no abuse incidents, it will sleep for 136+5*(1+0)=141 minutes. It is to be further appreciated that additional or fewer states can be used to represent other behavioral characteristics of an infant.

Figure 9:
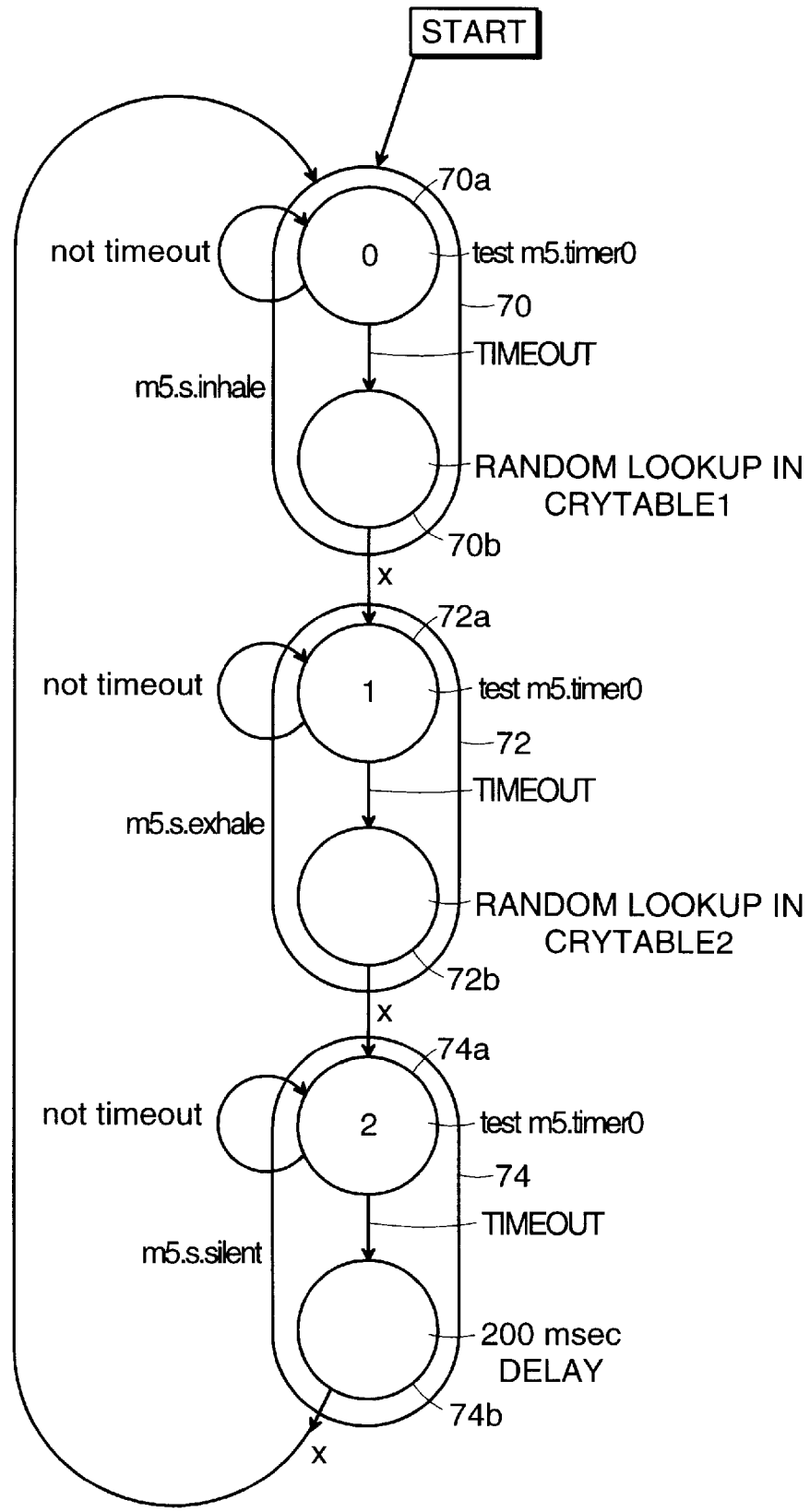
FIG. 9 is a state diagram illustrating one embodiment of a state machine according to the present invention that controls the doll's crying episodes.

Referring to FIG. 9, shown is one embodiment of a plurality of crying states associated with the cry state machine m5, referred to by step 37 in FIG. 6. The states are executed in response to certain parameters in the output of behavioral state machine described above in FIG. 8 and TABLE B. In one embodiment, certain bits of m1.output determine whether or not there will be a sound, whether or not the sound is a continuous pitch or whether the cry is to be a broken halting cry defined by the three states shown in the figure, those being "inhale 70", "exhale 72," and "silent 74." The microcontroller 17, in response to the states shown in FIG. 9, commands the sound routine step 41 shown in FIG. 7A to turn on the speaker 19, which is later turned off by supervisor sub-routine 38, as described below.

As the process indicated by flowchart of FIG. 7A can be executed every 1 millisecond (1/1000 second) in the present embodiment, the maximum sound frequency can be 1000 hertz (the inverse of 1/1000). However, sub-harmonics of 1000 hertz—e.g. 500 hertz, 333 hertz, 250 hertz, 200 hertz, and so forth, can be generated. In one embodiment, by turning on the speaker 19 at 1/n intervals of 1000 hertz, where n is an integer from 2 to 16 represented by the 4 least significant binary digits of m1.output, subharmonics can be generated. In one embodiment, the microcontroller 17, when entering the state inhale 70, signals the speaker 19 to produce a low frequency of 111 hertz (1000/9) for a fixed time of 150 milliseconds. When entering the state exhale 72, the microcontroller 17 signals the speaker 19 to produce 1000 hertz of variable time. When executing the state silent 74, the microcontroller 17 for a period of time refrains from signaling the speaker 19. Thus, when entering the states inhale and exhale, the microcontroller 17 causes the speaker 19 to sound and uses the frequency through variable m5.output, in executing step 41, the sound routine, described above in the flowchart of FIG. 7A. The resulting sound is rich in harmonics because of the sharp turn-on and the sharp high-amplitude turn-off of the pulses created by the booster circuit 20, described above in FIG. 5. The sound produced can also have odd wailing components due to a variable width signal pulse created by the time differential between the turn-on by sound routine 44 and the turn-off caused by the supervisor 38.

The cry state machine m5, step 37 of FIG. 6, begins by testing bits 6 and 5 of m1.output as defined in TABLE B. In one embodiment, if bit 6 is not set, i.e. not at logic 1, there will be no sound, and the cry state machine m5, 37 immediately bypasses the states of FIG. 9 and returns the program sequence to step 38 of FIG. 6. In one embodiment of the invention, if bit 6 is set, then a cry will be produced, with the type of cry is specified in bit 5. Bit 5, when clear (logic 0) specifies a halting cry produced by the three states of the state machine of FIG. 9. Bit 5 when set (logic 1) specifies a continuous tone with a frequency specified by bits 3, 2, 1, 0. This binary number plus 1, specifies the divisor 1/n of the 1000 hertz frequency.

To illustrate this feature of the present invention, for example, the microcontroller 17, while executing behavioral state Burp 79 of FIG. 8 stores in m1.output, the binary number 11101100. In this example bit 7=1, that is, the left-most or most-significant bit indicates that the eye LEDs 11 should be on. Bit 6=1 indicates that the speaker 19 will sound. Bit 5=1 indicates that a pure sound be emitted, the frequency of which is 1000 hertz divided by the 4 least significant bits 1100 (12 decimal), plus 1, that is, 1000 hertz/13 or about 80 hertz. The crying state machine 37 stores the four-bit divisor together with a control bit (bit 7 equal to 0) in variable m5.output. When the next "timers" routine of FIGS. 7A and 7B, occurs, the sound routine 41 will test bit 7, determine that it is not set, meaning that sound is specified, read the value in m5.output and save it in variable cry_counter. The sound routine 41 will subtract 1 from cry_counter, turn on the microcontroller port bit corresponding to the speaker 19, test to see if cry_counter is zero and if so load it with the value again, and continue to step 42. If, on the other hand, bit 5=0, meaning a broken cry is specified, then the crying state machine shown in FIG. 9 will be executed. The sound duration for states m1.s.exhale 72 and m1.s.silent 74 is determined by the microcontroller 17 via a lookup table, such as that shown in TABLE E. It is to be appreciated that other states can be added for example, the doll can produce an excited coo and a relaxed coo sound when satisfied and full during m1.s.full.

TABLE E

STATE M1.FULL CRYTABLE2 (exhale time)

| program address | data byte | assembler directive | assembler operand | comment |
|---|---|---|---|---|
| | | cry table base address | | |
| 06C0 | 09 | crytable2   db | msec__300 | ;exhale (cry) |
| 06C1 | 06 | db | msec__200 | time |
| 06C2 | 0F | db | msec__500 | |
| 06C3 | 06 | db | msec__200 | |
| 06C4 | 09 | db | msec__300 | |
| 06C5 | 1F | db | msec__1000 | |
| 06C6 | 06 | db | msec__200 | |
| 06C7 | 09 | db | msec__300 | |
| | | assembler label | | |
| | | msec__30    equ | $01t | ;"t" is base ten |
| | | msec__60    equ | $02t | |
| | | msec__100   equ | $03t | |
| | | msec__130   equ | $04t | |
| | | msec__150   equ | $05t | |
| | | msec__200   equ | $06t | |
| | | msec__300   equ | $09t | |
| | | msec__330   equ | $10t | |
| | | msec__400   equ | $12t | |
| | | msec__500   equ | $15t | |
| | | msec__600   equ | $18t | |
| | | msec__700   equ | $21t | |
| | | msec__800   equ | $24t | |
| | | msec__900   equ | $27t | |
| | | msec__930   equ | $28t | |
| | | msec__1000  equ | $31t | |
| | | etcetera | | |

Referring to FIG. 9, the microcontroller 17, in executing states m5.s.inhale 70 and m5.s.exhale 72 can provide a cry length of random duration. In an embodiment that utilizes a timer-interrupt to update the "timers" routine, the microcontroller 17, using a hardware counter, a timer-counter register TCR, continuously counts the signal from the 2 megahertz ceramic resonator 25, and computes a pointer using the last three bits of the register. As the actions of the states are not synchronized to the TCR, whenever the microcontroller 17 samples its contents the bits in the TCR are random. To keep the look-up table small, the microcontroller 17 masks off all bits retrieved from the TCR except the three least significant bits. These three bits are transferred to an index register where they are used as a pointer to perform an indexed lookup in a cry table such as TABLE E, to determine the length of a crying episode. As the pointer is effectively a random number, the duration of the crying or silence is also random, thus adding to the irritability of the doll's cry. Note that in TABLE E "db" is an assembler directive that represents "data byte," and "equ" is an "equate" directive that represents "equals". As described in FIG. 7A, the bytes are sent to m5.timer0 that counts 32.8 millisecond "ticks", each unit in the data byte db of TABLE E represents approximately 32.8 msec. That is, in TABLE E "msec__300" (highlighted), represents the number 300/32.8=decimal 9, which is represented by 00001001. It is to be further appreciated that a random number generator can be used to improve the randomness of the broken sounds made when the doll is irritable.

In the embodiment that "waits" at step 30 while it tests the timer overflow flag (TOF), waiting for the TCR to "roll over" and set the TOF, the use of the TCR as described above may not yield an adequately random number. In one such embodiment, the microcontroller 17 computes a simple pseudo-random number, a 2- or 3-digit number, which it then uses as a pointer into various cry tables. An example of a random-number algorithm which may be used is described in detail by Knuth in his book *Seminumerical Algorithms* (Addison-Wesley 1969). This algorithm works as follows: the microcontroller 17 repeatedly calculates with 8-bit arithmetic a new number $N_{new}=(A*N_{old}+C)$ using the previous N (that is, $N_{old}$) which it saves in variable "random_number". The calculation is done "modulo 256", that is, the algorithm retains only the lower-8 bits of the 8-by-8 multiply, and it discards any carry from the 8-bit addition. If "multiplier" A and "increment" C are correctly chosen, the resulting sequence of 8-bit numbers (the "residue" of the calculation) will not repeat until all 256 numbers have been produced, that is, the 256 numbers represented by all combinations of 8 bits ($2^8=256$). Given modulo 256 arithmetic, to achieve adequate randomness the multiplier A and increment C must satisfy these criteria: the number A, minus 1, must be a multiple of 4. For example, A can be 5, 9, 13, 17, etc. Also, increment C must not be a factor of 256. For example increment C can be 1, 3, 5, 7, 9, etc. In one embodiment, the multiplier 5 was chosen and the increment 17 was chosen, and the sequence, when started at 0, progressed as follows: 0, 17, 102, 15, 92, 221, 98, 251, 248, 233, 158, 39, etc. Small tables require only a few bits for lookups. For example, an 8-entry table requires only three bits. But an examination of the bit pattern of the binary equivalents of the numbers in the sequence described above reveal that the lower four bits are not random. The random number routine discards these bits and saves only the most significant bits. The resulting three bits, or two or four depending on the embodiment, produce a sequence of small numbers sufficiently random for the purpose. For example, the 3 most significant bits of the numbers described above will produce the sequence: 0, 0, 3, 0, 2, 6, 3, 7, 7, 7, 4, 1, etc. The 2 most significant bits of the numbers described above produce the sequence: 0, 0, 1, 0, 1, 3, 1, 3, 3, 3, 2, 0, etc. These bits are transferred to the index register, where they are used as a pointer to perform an indexed lookup in a cry table such as TABLE E, to determine the length of a crying episode, or the length of silence between cries.

Referring again to FIG. 9, in state 70, given by m5.s.inhale, the microcontroller 17 checks the timer m5.timer0 in sub-state 70a to determine if the timer has counted down to zero. When the microcontroller 17 determines that the timer m5.timer0 is zero, it follows the time-out arrow, and transitions to state 70b. In this case, the microcontroller 17 generates a pointer to access cry TABLE E, as described above. Once the duration of crying is determined from the cry table, the time of the duration is stored in m5.timer0. The microcontroller 17 then causes the doll to enter the exhale state, given by 72. In the exhale state, the microcontroller 17 again checks the timer m5.timer0 in state 72a to determine if the timer has decremented to zero and continous to sound the speaker 19 to signify crying if time still remains. If the timer has reached zero, state 72b is entered, and the microcontroller 17 generates a pointer and determines a "silent" interval from another lookup table. The microcontroller 17 then causes the doll to enter the silent state, given by 74. The microcontroller 17 again checks the timer m5.timer0 in state 74a to determine if it has counted down, and continues its silence if time still remains. When the counter reaches zero, the microcontroller 17 follows the time-out and enters state 74b where a 200 millisecond delay is imposed. After the delay, the microcontroller 17 again returns to state 70. It is to be appreciated that other states and lookup tables of various lengths and construction can be configured to represent other sounds and durations of crying, burping, cooing, gurgling, etc.

Figure 10:
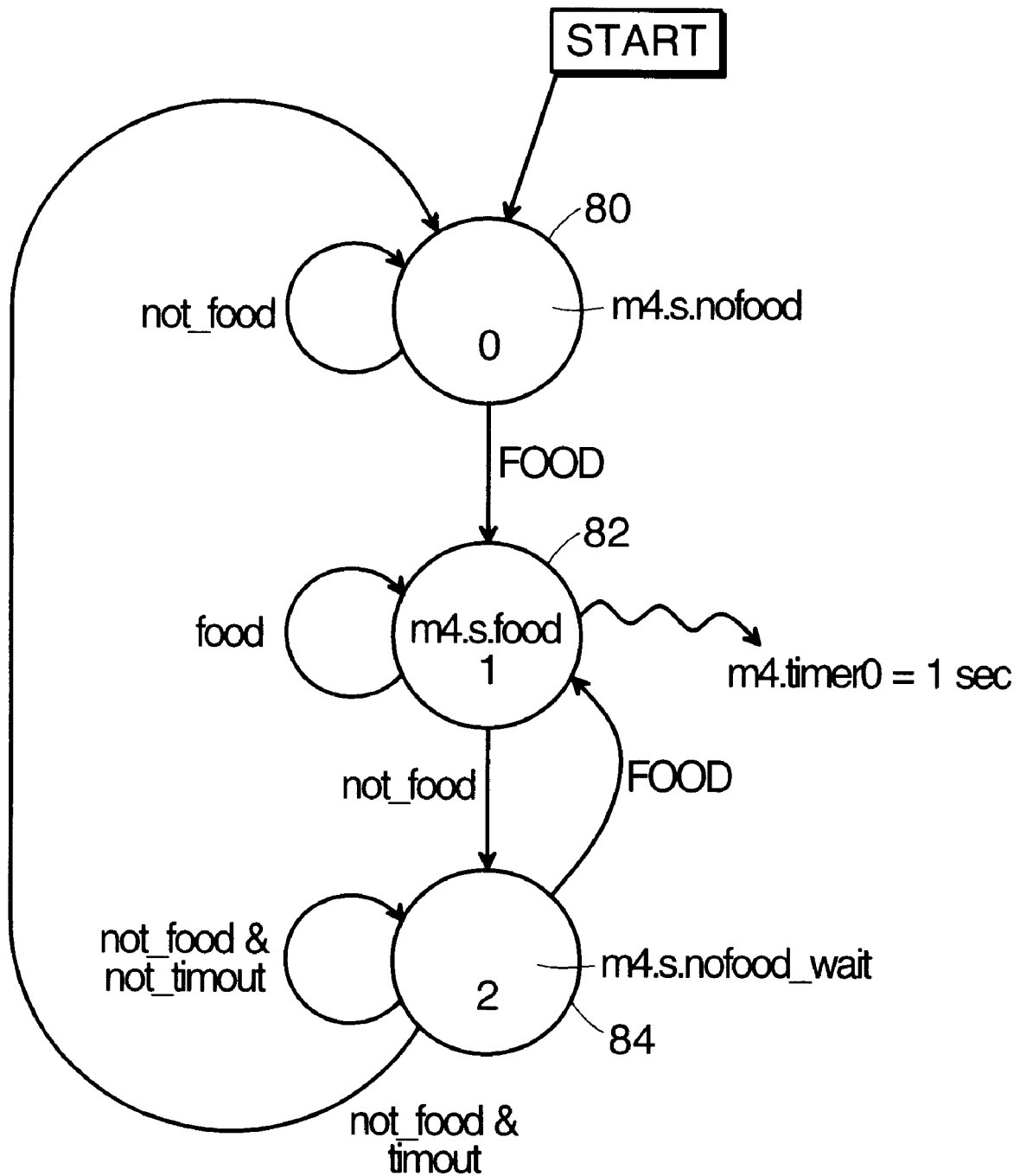
FIG. 10 is a state diagram illustrating one embodiment of a state machine according to the present invention that processes feeding of the doll by a caretaker.
Figure 11:
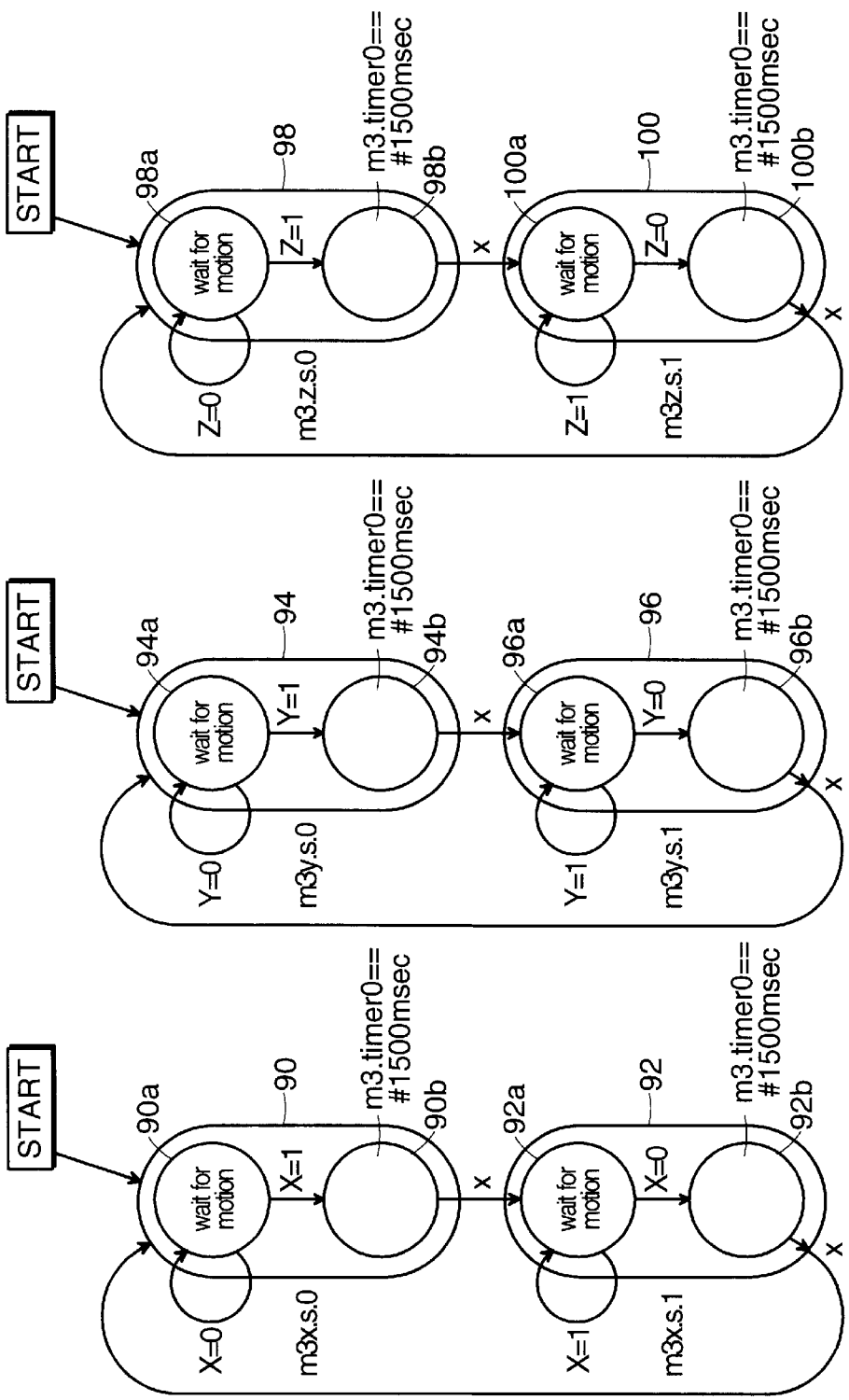
FIGS. 11A, 11B, and 11C are state diagrams illustrating one embodiment of a state machine according to the present invention that processes movement of the doll in different directions by a caretaker.

Referring to FIG. 10, shown is one embodiment of a plurality of states associated with the feed-switch state machine m4, given by 34 in FIG. 6. This state machine desensitizes the doll to erratic movements of the nipple portion N of a bottle in the doll's mouth 5 by providing one-second delays (1000 ms) in sensing whether the feed-switch 24 is depressed. In this manner, the system accommodates the reality of infant care, in which, often during feeding, the nipple portion N becomes momentarily displaced from the infant's mouth due to movement by the infant and/or the caregiver.

As shown, this state machine begins in state 80, given by m4.s.nofood. While in this state, the microcontroller 17 tests the feed-switch 24 to determine whether it is closed, that is, whether the caretaker has inserted a nipple portion N of a bottle into the doll's mouth 5. If the feed-switch 24 is open, the microcontroller 17 remains in this state. If the feed-switch 24 is closed, the microcontroller 17 transitions to state 82, given by m4.s.food. The microcontroller 17 sets m4.timer0 to one second, and counts down 1000 milliseconds. While in this state, if the feed-switch 24 is continuously closed, the microcontroller 17 will remain in this state in which it continuously counts and again stores, a time of 1 second (1000 milliseconds) in m4.timer0.

Referring again to TABLE A above, this timer m4.timer0, represents a closed feed-switch 24. This timer is tested by the microcontroller 17 in behavioral states of FIG. 8, particularly states 64, 68, 69, 70, 72 and 73, given by m1.s.hungry2, m1.s.feedawake2, m1.s.wail, m1.s.feedoze, m1.s.full, and m1.s.colic. If the feed-switch 24 is opened, the microcontroller 17 transitions to step 84, given by m4.s.nofood_wait. The state machine remains in this state while it tests m4.timer0 until the timer is decremented from 1000 milliseconds to zero. As this counter m4.timer0 allows for momentary disengagement of the nipple portion N from the feed-switch 24, if during this time the feed-switch 24 returns to a closed position, the microcontroller 17 transitions back to state 82. If the feed-switch 24 remains open and timer m4.timer0 counts down to zero, the microcontroller 17 transitions back to state 80.

Referring to FIGS. 11A, 11B and 11C, shown are the state machines of the present invention that process movement or rocking of the doll by the caretaker. In these figures, like reference numerals 90, 94 and 98 represent like states, and like reference numerals 92, 96 and 100 represent like states. As described above, the motion sensors 21, 22, and 23 sense movement of the doll along the x, y and z axes. In one embodiment, these states also sustain the doll's awareness of movement for 1.5 seconds (1500 ms) after the movement has ended, thereby desensitizing the doll to erratic movement.

As shown in this embodiment, the state machines of FIGS. 11A, 11B and 11C convert signals from the sensors to a common output m3.timer0. It is to be appreciated that separate timers m3.timer0a, b and c would allow discrimination and debouncing of the separate axes. But in this embodiment, separation of axes is not required, so common timer m3.timer0 is tested by the behavioral state machine m1 shown in FIG. 8, and TABLE A. Also, as shown in FIG. 7A, motion timer is updated by the "timers" routine in step 45A. In step 45A, the microcontroller 17 tests m3.timer0 and, if the stored value is not zero, thereby indicating motion has occurred in the previous 1.5 seconds, the m3.timer0 accumulates the duration of motion in seconds. Referring again to FIG. 8, the behavioral states that test either m3.timer0 or m1.motion_timer, are: state 62, m1.s.sleep; state 64, m1.s.hungry2; state 66, m1.s.sleephngry; state 78, m1.s.bubble; state 75, m1.s.full; and state 73, m1.s.colic, in determining the next state to enter.

The speaker 24, when it produces a sound, vibrates the x, y, z position sensors 21, 22 and 23, which may misinterpret the sound-vibrations as motion. The vibration damper 21 reduces this effect. In one embodiment, the role of the vibration damper 21 is augmented by two tests, that is, a first test to see if sound is being produced, and a second test to wait for 30 milliseconds after the sound has ended. In either case m3, represented by FIGS. 11A, 11B and 11C, skips over the motion-sensing state machines and returns control back to MAIN.

M3 starts with a test of bit 7 of m5.output, that is, the bit that directs m5 to produce sound. If the bit is 0, indicating m5 is to produce sound, m3 first sets a delay of 30 milliseconds in a millisecond timer "m3.timer1" (not shown), then skips over m3x, m3y, and m3z and returns to MAIN. Secondly, if bit 7 of m5.output is equal to 1, indicating no sound, m3 tests m3.timer1 for zero, indicating end of the 30 millisecond delay. If the 30 millisecond time-out is still in progress, m3 skips over m3x, m3y and m3z and returns directly to MAIN. If the time-out is not in progress, that is, 30 milliseconds has elapsed since the end of a cry or other sound, routine m3 executes state machines m3x, m3y, and m3z. In this way, m3 ignores for 30 milliseconds any extraneous vibrations which persist after the sound has ended.

Referring to FIG. 11A, the m3x state machine begins in state 90, given by m3x.s.0. In sub-state 90a, the microcontroller 17 waits for motion to be sensed by the opening of the x-axis sensor 21. If a switch opening is not sensed, the state machine remains in this state. If an opening is sensed, the microcontroller 17 transitions to sub-state 90b and timer m3.timer0 is set for 1500 milliseconds. The microcontroller 17 then transitions to state 92, given by m3.x.s.1 and enters sub-state 92a. The microcontroller 17 remains in sub-state 92a provided continued opening is sensed. When a switch closure is sensed, the microcontroller 17 transitions to state 92b and sets timer m3.timer0 to 1500 milliseconds and transitions back to state 90, where it remains while it waits for another switch opening. The operation of the state machines of FIGS. 11B and 11C are identical to the operation of the state machine described above in FIG. 11A, and to eliminate redundancy, are not described herein. It is to be appreciated that additional or fewer states can be used to process rocking of the doll by a caregiver. Further, it is to be appreciated that if no distinction between axes or position-sensors is required an embodiment can "compress" state machines m3x, m3y and m3z etc. into a single state machine m3xyz that works in the following manner. The microcontroller 17 can process all motion inputs at once using the logical exclusive-or (XOR) between the present status of the x, y, z (etc.) sensors and the sensors' previous status. Typically, logic 1 for each sensor equals "closed" or "active" and logic 0 equals "open" or "inactive". Following the XOR operation, a change in each sensor's status will be revealed as a logic 1 in that sensor's bit position. For illustration purposes, suppose that there are three position sensors corresponding to bit positions 4, 3, and 2; bits 7, 6 and 5 (left-most) and 1 and 0 (right-most) are dedicated to other sensors. Suppose that the previous status of the position sensors, saved by microcontroller 17 in variable m3.xyz_saved, is $00011000_{old}$. In step 30, the microcontroller 17 inputs the status of all the sensors as one byte, e.g.

$11101110_{new}$. The composite state machine m3xyz first masks off bits 7, 6, 5 and 1, 0 using the logical AND (e.g. $11101110_{new}$, AND $00011100_{mask}$=>$00001100_{new}$) and then to this result logically XORs (the logical XOR is done on a bit-by-bit basis) the previous byte saved in m3.xyz_saved (e.g. "new" XOR "old"=>"changes", that is, $00001100_{new}$ XOR $00011000_{old}$=>$0001010_{xor}$). The microcontroller 17 saves the new status (e.g. $00001100_{new}$) in variable m3.xyz_saved and then tests for a "change" in the XOR result, that is, a non-zero result (e.g. $00010100_{xor}$). In this example, bits 4 and 2 produced logic 1's, so motion sensors corresponding to those bits experienced changes and therefore motion has occurred. It will be further appreciated that individual solid state motion sensors will produce numbers that change rather than individual bits; these numbers can be processed with arithmetic "compares" against previously stored results, such that changes indicate motion.

Figure 12:
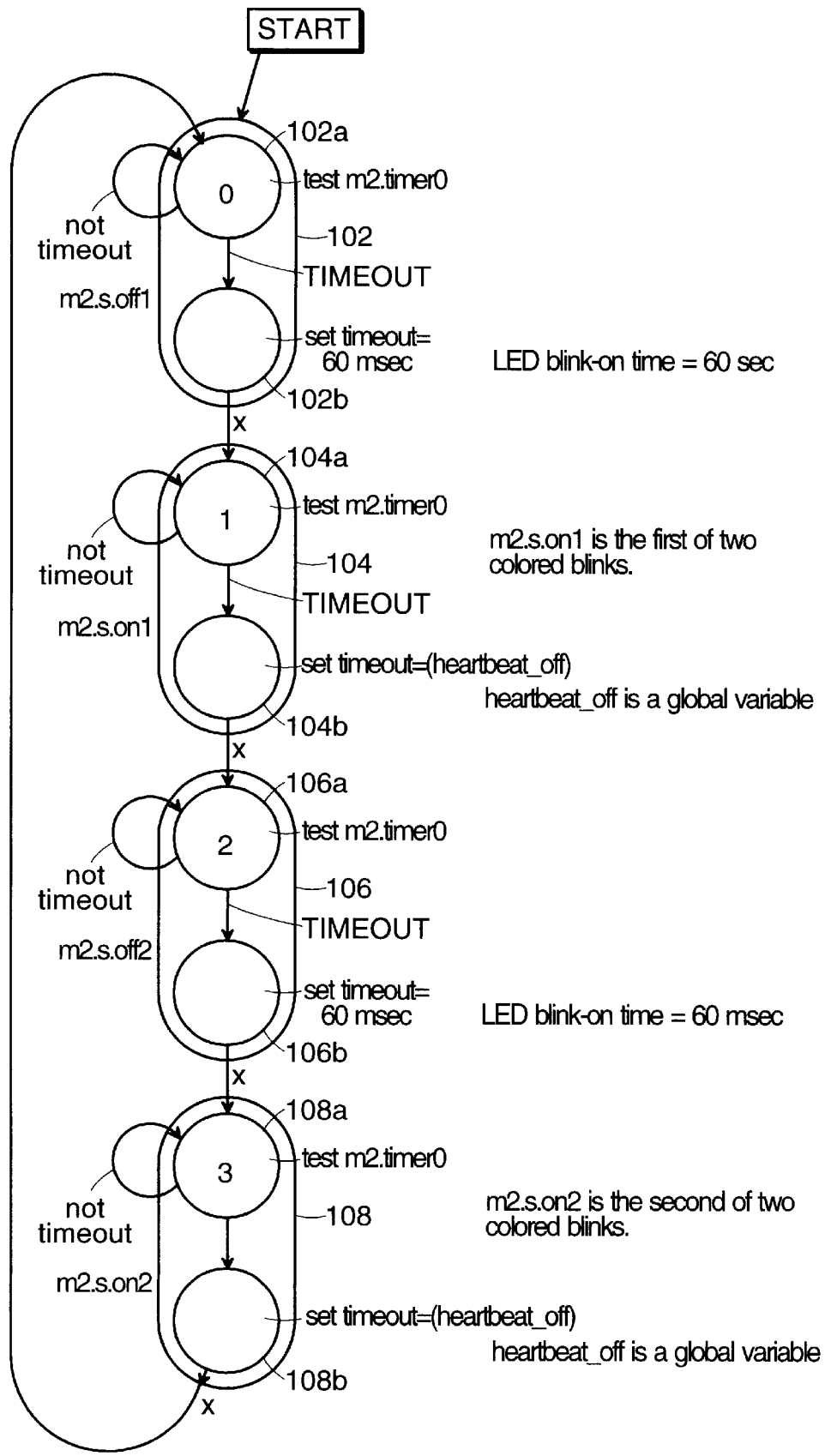
FIG. 12 is a state diagram illustrating one embodiment of a state machine according to the present invention that processes the doll's heartbeat.

Referring to FIG. 12, shown is one embodiment of the heartbeat state machine m2. The heartbeat state machine, as previously described in FIG. 6, step 36, transitions through four composite states to represent the doll's heartbeat. These states, as will be further described, control the timing of the blinks the of bi-colored LED 15. In one embodiment, the states create a blink sequence, which in this embodiment, is a sequence of two blinks, hereinafter referred to as "blink 1" and "blink 2". The blink sequence is accompanied by a variation in the color of the light emitted by the LED 15, as described above. In this embodiment, the subroutine out_supervisor 38, shown above in FIG. 6, can control the color of each or both of the blinks and is responsible for turning on or off the bi-colored LED 15 after it has assigned the colors to blink 1 and blink 2. The colors assigned to the blinks can be determined from the contents of m1.cntr_fat, that is, the simulated weight of the doll. In one embodiment, the LED 15 can change color from red/red through red/yellow, yellow, yellow, yellow/green, to green/green as the doll gains weight. Additionally, the frequency of the blinks can represent the health of the doll. In one embodiment, the frequency of the blinks can double when the doll is sick from starvation or other neglect. The outputs of the heartbeat state machine m2, 36 are a state number which can be stored in a variable m2.next_state, and a binary flag representing the heartbeat state which can be stored in m2.output. These outputs are tested by the subroutine out_supervisor 38 shown in FIG. 6.

As described above, the heartbeat state machine m2, 36 can comprise four composite states. The first two states shown, 102 and 104 in FIG. 12, given by m2.s.off1, and m2.s.on1, create the first blink. The second two states, 106 and 108, given by m2.s.off2 and m2.s.on2 create the second blink. In one embodiment, each blink can be ON for 66 milliseconds and OFF for whatever time is set in the variable "heartbeat_off". The time assigned to "heartbeat_off" can be set by any state machine; and in this embodiment is set by out_supervisor 38. Usually it is set for 930 milliseconds to give a blink rate of 1 blink per second. If, however, the behavior state machine m1 35 is in state Sick 77, described above in FIG. 8, the out_supervisor 38, as described below, can set the time to 330 milliseconds, thus increasing the blink rate to 2.5 blinks per second.

Referring again to FIG. 12, the state machine begins in state 102a, given by m2.s.off1, where it sets m2.output to 0, thereby turning off the LED 15. It then tests m2.timer0, previously set by m2.s.on2 in state 108 of a previous cycle through the four states. The state machine remains in this state until m2.timer0 is zero. The state machine then transitions to sub-state 102b, where it sets m2.timer0 to 60 milliseconds. It transitions directly to m2.s.on1 given by 104a and enables the LED 15 via m2.output by setting m2.output to logic 1. It then tests m2.timer0 and waits for it to decrement to zero. When m2.timer0 is zero, the state machine transitions to sub-state 104b, in which it loads the off-time from variable heartbeat_off and saves this time in m2.timer0. The state machine then transitions directly to m2.s.off2, given by 106a. State m2.s.off2 106 operates in an identical manner to state 102, and state m2.s.on2 given by 108 operates in an identical manner to state 104. The only distinction between the pairs of states are the state numbers associated with each and saved in variable m2.next_state. This number is used by subroutine out_supervisor 38 to determine which is the first blink or the second blink. To eliminate redundancy, these two states will not be described herein. It should be noted that in another embodiment of the invention, the heartbeat state machine m5 signals the LED 15 to provide a pattern of increasing numbers of green blinks to represent increasing weight, yellow blinks to represent the number of times the doll has been left crying for 10 minutes when hungry or other neglect defined by the particular embodiment, and red blinks to represent the number of impacts. In this embodiment, only the heartbeat machine 36 m5 determines the color and frequency of the blinks; out_supervisor is not involved.

Referring to FIG. 6, subroutine out_supervisor 38 is the final subroutine of the MAIN program illustrated. As will be further described, in this embodiment, out_supervisor 38 can determine the color of the LED 15, activate or deactivate the LED 15, determine the blink frequency of the LED 15, and activate or deactivate the eye LEDs 11 and the speaker 19. In one embodiment, the microcontroller 17 executes subroutine 38, and begins by testing m2.output from "heartbeat" subroutine 36. If m2.output is found to contain 0, subroutine 38 turns the LED 15 off. If on the other hand m2.output is found to contain 1, subroutine 38 proceeds to determine the color and blink-frequency of the LED 15, in the following manner. The microcontroller 17 begins by loading into its accumulator register the value of m1.cntr_fat, that is, the doll's "weight", and dividing the number by 16. The number that remains will be between 00000000 binary, representing a starved doll, and 00001111 binary, representing a well-fed doll. The microcontroller 17 masks off the least significant bit, thereby creating only even numbers between 0 and 14. It then tests the number representing the heartbeat state, that is, the number in m2.next_state. If the state number is 2 (2 represents state m2.s.on2, i.e. the second blink), then the microcontroller 17 executes a logical OR of 00000001 binary with the state number. The number in the accumulator now represents a composite of both the doll's weight and the number of the blink, that is, the first blink is represented by the even numbers, and the second blink is represented by the odd numbers.

In this embodiment, the microcontroller 17 can transfer these bits to an index register where they are used as a pointer into heartbeat_table, as shown in TABLE F.

TABLE F

HEARTBEAT_TABLE heartbeat_table:
output bit 4 only on =     red
output bit 3 only on =     green
output bit 4 and 3 both on = yellow

| program address | data byte | heartbeat table base address | assembler directive | operand | entry | blink | fat | color |
|---|---|---|---|---|---|---|---|---|
| 072A | 10 | heartbeat_table | db | $00010000Q | ;0 | 1 | <32 | red |
| 072B | 10 | | db | $00010000Q | ;1 | 2 | <32 | red |
| 072C | 10 | | db | $00010000Q | ;2 | 1 | >32 <96 | red |
| 072D | 18 | | db | $00011000Q | ;3 | 2 | >32 <96 | yellow |
| 072E | 10 | | db | $00010000Q | ;4 | 1 | >32 <96 | red |
| 072F | 18 | | db | $00011000Q | ;5 | 2 | >32 <96 | yellow |
| 0730 | 18 | | db | $00011000Q | ;6 | 1 | >96 <160 | yellow |
| 0731 | 18 | | db | $00011000Q | ;7 | 2 | >96 <160 | yellow |
| 0732 | 18 | | db | $00011000Q | ;8 | 1 | >96 <160 | yellow |
| 0733 | 18 | | db | $00011000Q | ;9 | 2 | >96 <160 | yellow |
| 0734 | 18 | | db | $00011000Q | ;10 | 1 | >160 <224 | yellow |
| 0735 | 08 | | db | $00001000Q | ;11 | 2 | >160 <224 | green |
| 0736 | 18 | | db | $00011000Q | ;12 | 1 | >160 <224 | yellow |
| 0737 | 08 | | db | $00001000Q | ;13 | 2 | >160 <224 | green |
| 0738 | 08 | | db | $00001000Q | ;14 | 1 | >224 | green |
| 0739 | 08 | | db | $00001000Q | ;15 | 2 | >224 | green |

The microcontroller 17 then stores this table entry in "output", the microcontroller port that turns on the two outputs to the red and green LED diodes in bi-colored LED 15. For example, if the number in m1.cntr_fat is 91 decimal (01011011 binary), the microcontroller 17 begins by loading this number in the accumulator and shifting it right 4 times to divide it by 16, yielding 00000101 binary (91/16=5 decimal and a remainder, which is discarded). The microcontroller 17 masks off the least significant bit, yielding the even number 00000100 binary (4 decimal). Next, it tests the number in m2.next_state, the heartbeat state machine's next_state variable. If this number is 2, signifying the second blink, the microcontroller logically ORs 00000001 binary to the number, yielding 00000101 binary (5 decimal). The microcontroller 17 transfers this number to the index register and does an indexed load to accumulator from the heartbeat table, shown in TABLE F. The load moves to the accumulator the fifth entry, that is, the operand 00011000 binary. The microcontroller sends this number to "output" (microcontroller port B) and turns on both output pins, which in turn power on both the red and green LEDs of the heartbeat lamp 15.

The microcontroller 17 in subroutine out_supervisor 38 now proceeds to test the number in m1.cntr_fat. If the doll is in imminent danger of starvation, that is, if the number is less than 16, the microcontroller 17 doubles the blink rate by saving a time of 330 milliseconds in the variable heartbeat_off. As previously described, the heartbeat state machine m2 shown in FIG. 12 uses this variable to determine the blink off-time.

In one embodiment, the final actions taken by the out_supervisor 38 are to turn on or off the eyes 11, as represented by bit 7 of microcontroller output port A and turn off the speaker 19 as represented by bit 6 of output port A, which may have been turned on previously by subroutine step 42 of FIG. 7A. The microcontroller 17 loads into the accumulator the variable m1.output, that is, the output from the behavioral subroutine 35, inverts the number (bit 7 is inverted logic, that is, logic 0 turns on eye LEDs 11) and masks off all but bit 7. It then saves this number (10000000= eyes off, speaker off; or 00000000=eyes on, speaker off) to the output port A and thereby turns either on or off eye LEDs 11 and then turns off speaker 19.

Out_supervisor 38 returns control to the MAIN program shown in FIG. 6. MAIN instructs the microcontroller 17 to jump back to step 30. The microprocessor repeats the subroutines 31 through 38 ad infinitum.

Figures 2, 16A:
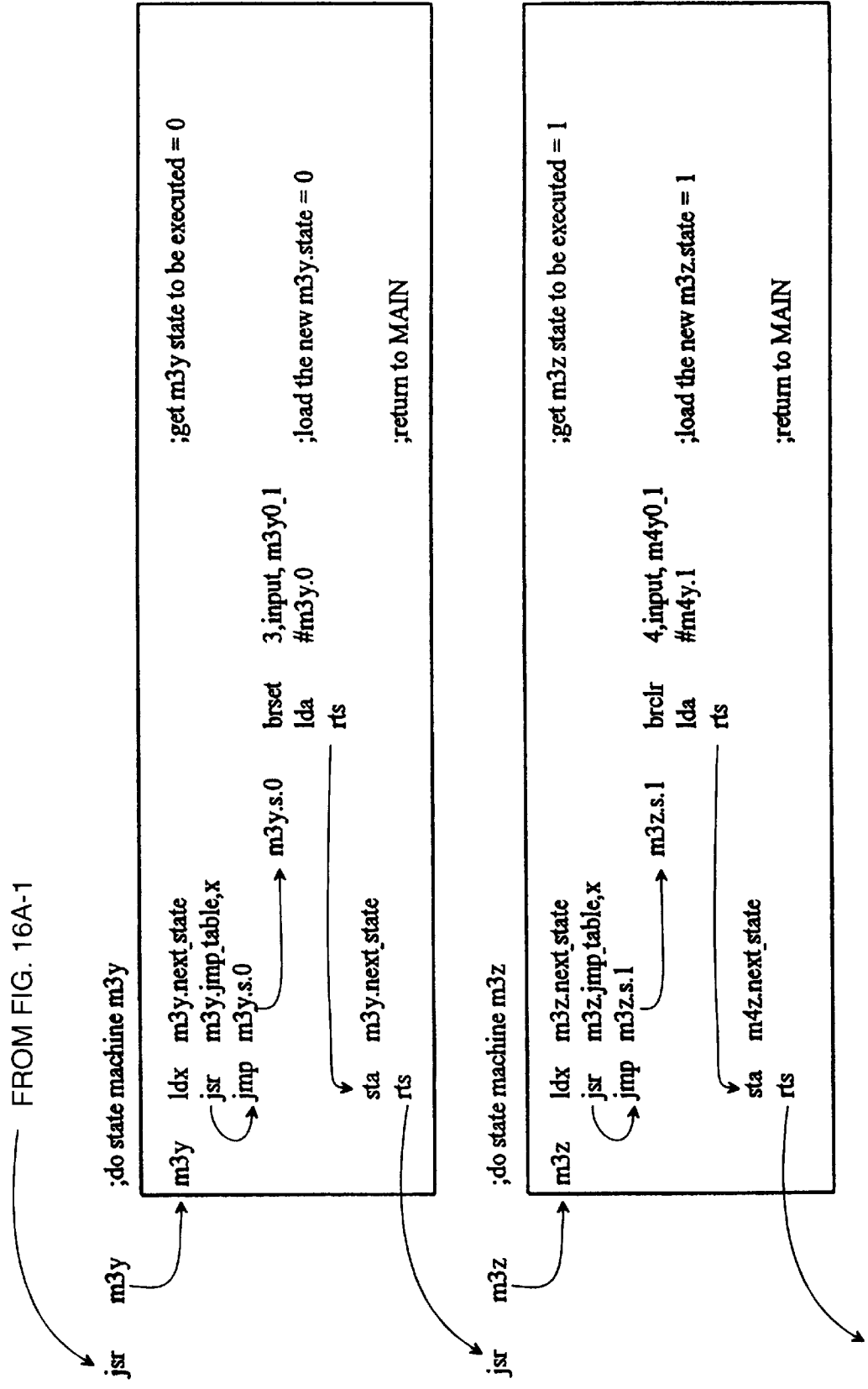
FIGS. 16A and 16B are diagrams illustrating a code walk through of one loop of the MAIN program of one embodiment of the present invention.
Figures 3, 16A:
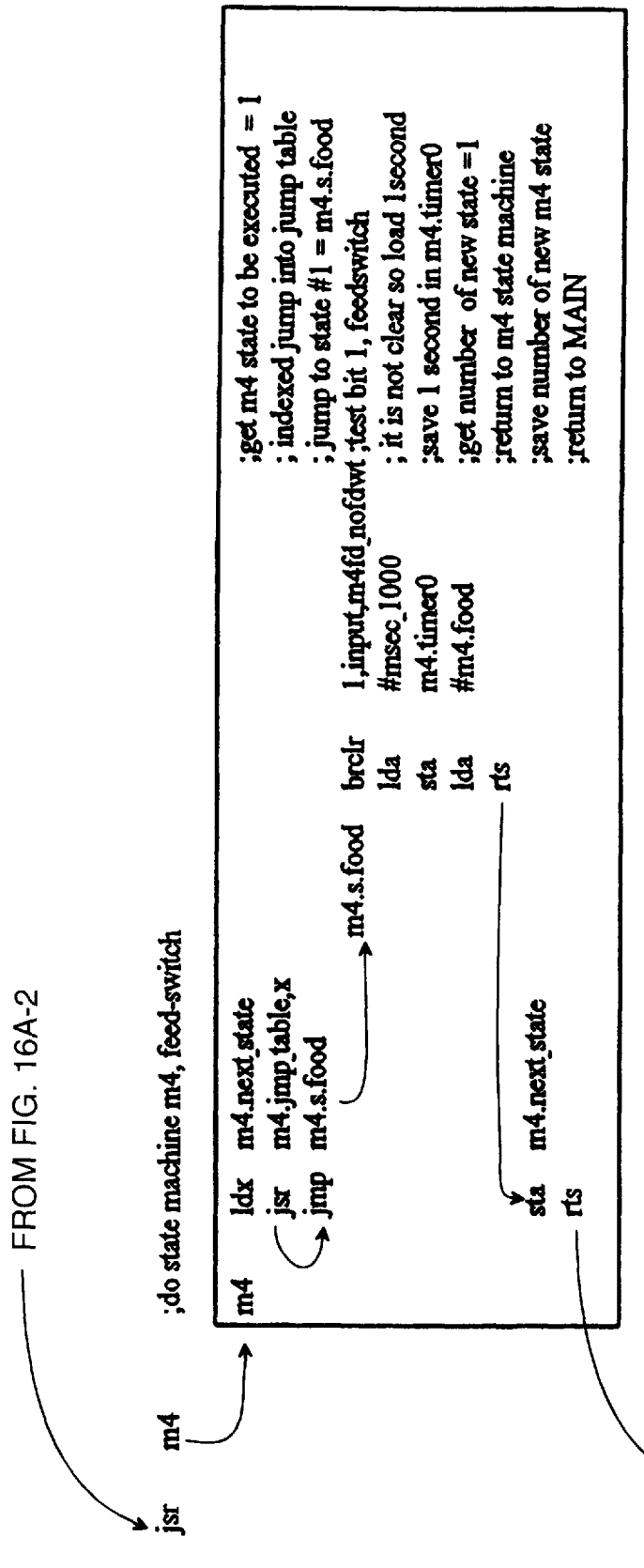
Figures 2, 16B:
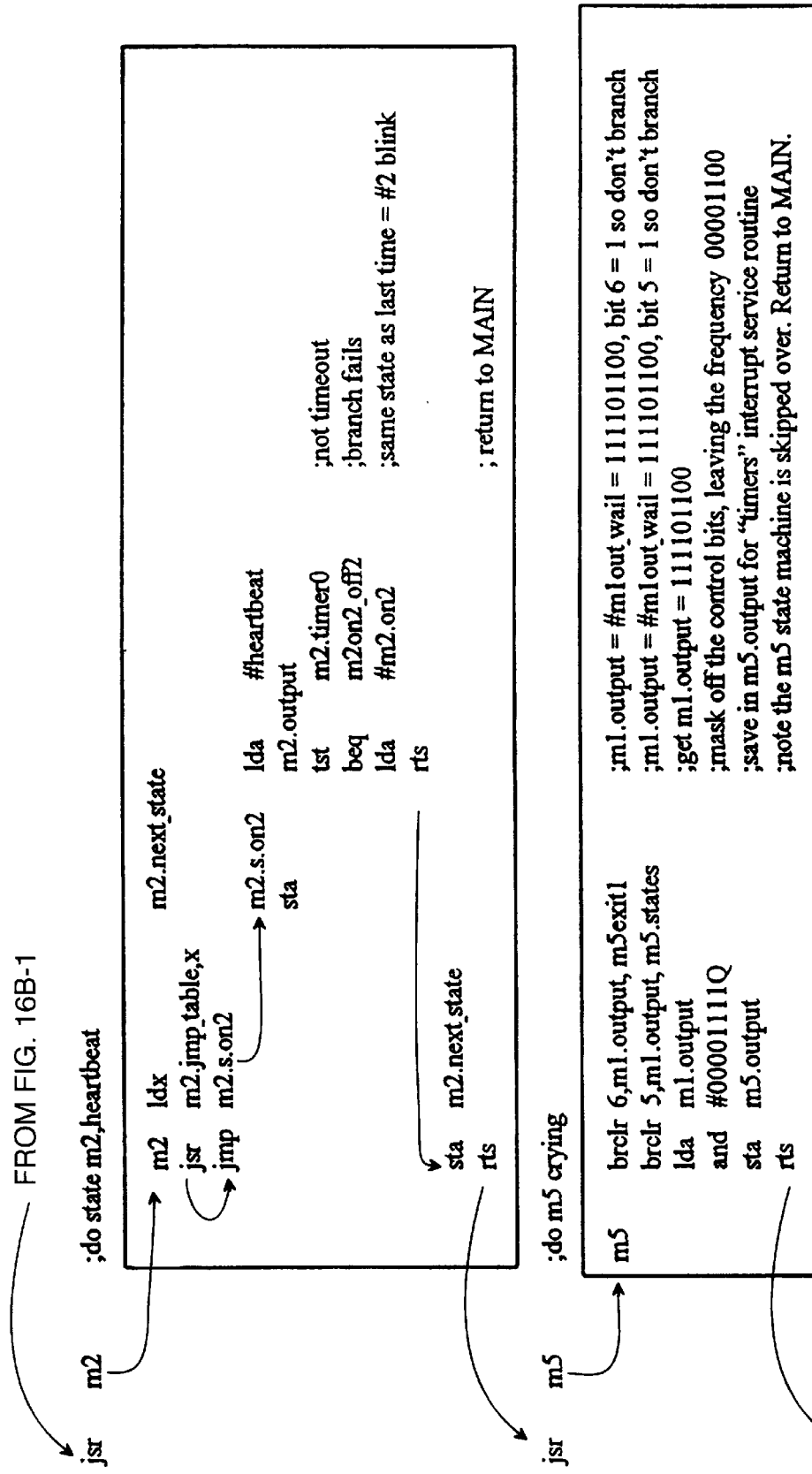

FIGS. 16A and 16B show a typical code walk through one loop of the MAIN program.

Figure 13:
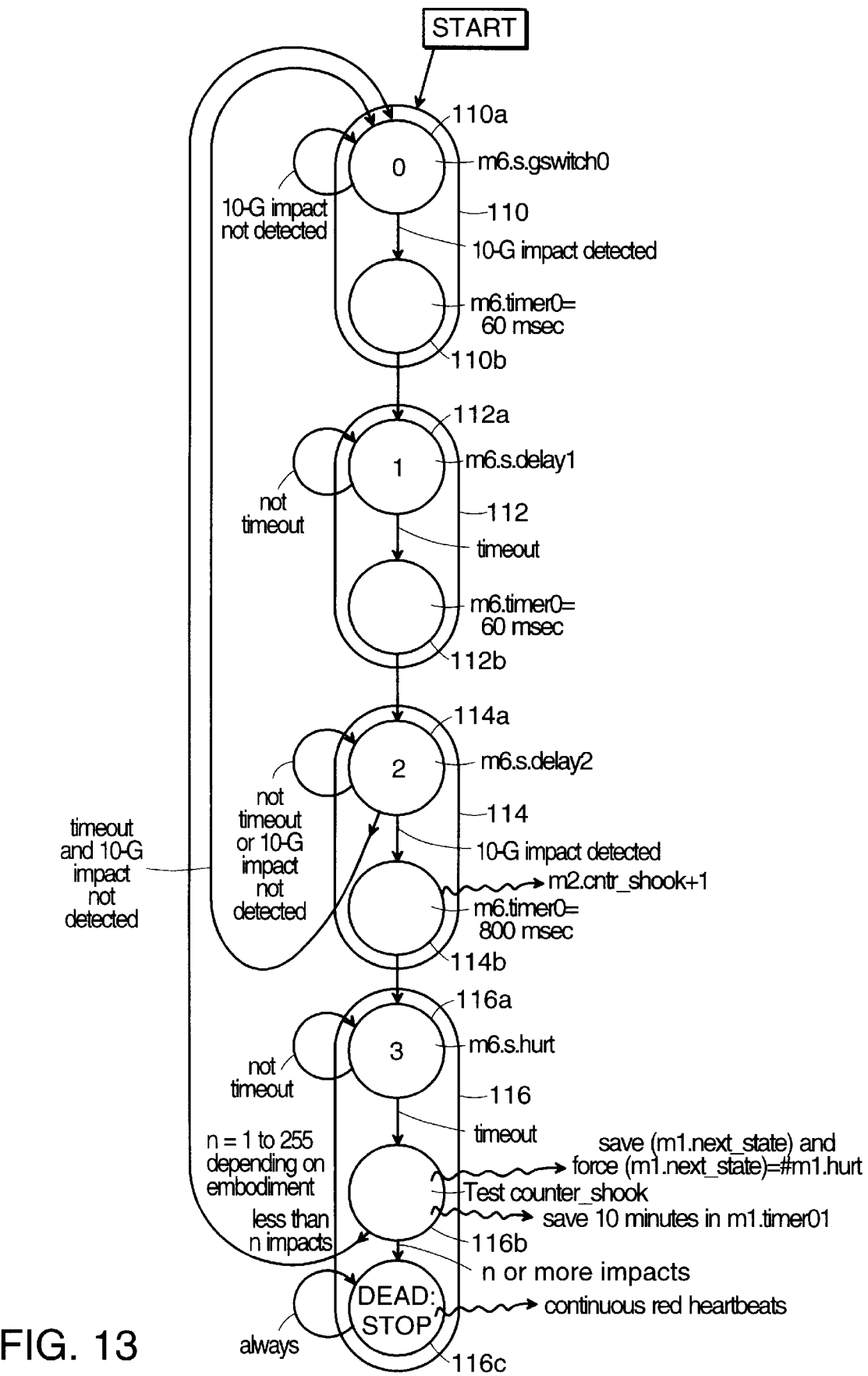
FIG. 13 is a state diagram illustrating one embodiment of a state machine according to the present invention that processes the output of an impact switch.

Referring to FIG. 13, shown is the state m6 that processes the output of the ancillary impact switch (G-switch) 26. A biomechanical study on infant-sized dolls has determined that a force greater than 10-G is a force that an infant subjected to "shaken baby" syndrome experiences. In one embodiment, the doll will tolerate only one impact or rough-treatment that produces a G-acceleration/deceleration greater than 10-G. In one embodiment, the impact switch, shown as item 136 in FIGS. 15A and 15B, is a custom switch made by Relay Services Company of Chicago, Ill., but any appropriate switch may be used in accordance with the present invention. Referring to FIGS. 15A and 15B, the impact switch 136 can, in one embodiment, include two blades of nickel-silver alloy 137, 138. The longer of the two, shown as 137, is 0.188 inches wide and 0.006 inches thick, and the shorter of the two, shown as 138, is 0.188 inches wide and 0.010 inches thick. Both blades 137, 138 are clamped between the plastic insulators 139 and are held together with insulating bushings 140, screws and threaded plates 141. The thinner blade 137 extends 0.70 inches beyond the clamping insulators 139. Attached at the non-clamped end of the thinner blade 137, at a distance of 0.60 inches beyond the clamping insulators 139, is a copper weight 141 of approximately 0.5 grams (0.002 pounds). Spot-welded midway between the weight 141 and the clamping insulators 139, that is, 0.30 inches from the insulators 139, is a cross-bar contact 142. The thicker blade 138 extends slightly more than 0.30 inches beyond the clamping insulators 139. Spot-welded near the non-clamped end of the thicker blade 138, at 0.30 inches, is a cross-bar contact 143 oriented at 90 degrees to the crossbar 142. The cross-bar contacts 142, 143 are 0.020 inches thick, and the blades 137, 138 are separated by 0.047 inches, so the gap between the cross-bar contacts 142, 143 is approximately 0.007 inches. Calculations from the mechanics of the construction indicate that an acceleration of approximately 10-G along an axis through the weight will force the lighter, longer blade 137 to bend such that its cross-bar contact 142 will touch the cross-bar contact 143 of the heavier, shorter blade 138. A mechanical shock, that is, a high-G deceleration caused by an impact, will cause the blade 137 to vibrate at approximately 50 hertz for a duration of up to 400 milliseconds. Each contact closure lasts approximately 1.5 milliseconds, and the total duration of the closures depends on the severity of the impact. Tests with the switch 26 mounted to a circuit board 6 inside a doll head 2 made of rigid plastic indicate that there is a possibility of spurious closures not indicative of rough treatment. For this reason, the state machine m6 of FIG. 14 "debounces" the contact signal.

When the contact impact switch 26 closes due to an impact "event," the closure causes an "interrupt" to temporarily divert the processor to the "hurt" routine (not shown), which attends to the impact switch 26. This "interrupt service routine" sets timer m6.timer_gswitch to 50 milliseconds, and then it returns program control back to where it was before the interrupt occurred. When state machine m6 is executed, the signal processing strategy is to wait 60 milliseconds, or approximately 3 bounces, then increment a counter m6.cntr_gswitch which is used to record the severity of the impact. If m6.timer_gswitch continues to record "events," then every 60 milliseconds another count is added to m6.cntr_gswitch. It is to be appreciated that in different embodiments, shorter time delays may be chosen to sensitize the doll to impact, or longer time delays to desensitize the doll. When "events" are no longer detected, cntr_shook is incremented by 1 (which in some embodiments will increase the number of red blinks by one) a flag "m6.shook_flag" is set to 1, and m6 transitions back to a waiting condition, that is, state m6.gswitch0, step 110.

As previously described, in some embodiments the number in cntr_shook is displayed as red blinks, and the number in m6.cntr_gswitch, which indicates the severity of the impact, is used to increase the sleep time, and thereby depress the doll's rate of feeding. In some embodiments, behavioral state machine m1 begins with a "health supervisor" routine which, if the doll has been shaken, causes the doll to cry for a time determined by the severity of the impact, that is, the number of minutes of uninterrupted crying equals the number of counts in m6.cntr_gswitch, and diverts state machine m1 directly to state m1.hurt (not shown). State m1.hurt, after the crying has ended, diverts the program to state m1.colic for a time also determined by m6.cntr_gswitch. As state m1.colic transitions to m1.sleep, it determines the length of sleep time by the formula m1.timer0=m1.timer_hunger+5×(cntr_neglect+m6.cntr_gswitch). Thus the doll's sleep time is extended by neglect and impact-severity. With accumulating neglect and hurt, the doll becomes increasingly depressed, sleeping past the time it should awake due to hunger. If the depression is severe enough, the doll will eventually loose weight and "fail to thrive."

Referring again to FIG. 13, on power-up state machine m6 is initialized by reset routine 29 to reach state m6.s.gswitch0 110. During this period, the state machine waits in state 110a for contact closure of the ancillary G-switch 26. If microcontroller 17 senses closure of the switch 26, state 110a transitions through sub-state 110b, setting m6.timer0 to 60 milliseconds, directly to state 112. In state 112a, the microcontroller 17 tests m6.timer0. If m6.timer0 has not timed out, the state machine stays in state 112. At the end of 60 milliseconds—approximately 3 bounces of the switch 26—state 112a transitions through sub-state 112b, setting m6.timer0 to 60 milliseconds, to state 114. The microcontroller 17 waits in state 114a for either a switch closure or a 60 milliseconds time-out. During this time it tests the impact input 26. If the switch 26 closes, state 114a immediately transitions to state 114b, sets a 800 millisecond delay, and then transitions to state 116, given as m6.s.hurt 116. If timer m6.timer0 times out before a switch closure is detected, the impact is considered to be spurious and state 114a transitions to state 110, where the state machine waits for another switch closure.

Returning to m6.s.hurt state 116, the microcontroller 17 waits for a 800 millisecond time-out. This time-out is chosen to be much longer than the longest sequence of switch closures (approximately 400 milliseconds), in order to prevent double-counting of impact events. When the timer m6.timer0 times out, the microcontroller 17 transitions to state 116b where it compares the number of "shaken-infant" events, stored in cntr_shook, against a maximum, which typically comprises a single or a few events. If the number exceeds the maximum, the baby is considered to be "dead," and as shown, state 116b preempts all other microcontroller functions. In this manner, the microcontroller 17 sets the heartbeat LED 15 to red continuously and forces the eye LEDs 11 off and the speaker 19 off. State 116b then issues a STOP command, at which time all microcontroller 17 functions cease. The doll can be restarted only by removing a battery and reinserting it, at which time it will begin life as a "new-born."

If the number of "shaken-infant" events is less than the maximum, state 116b saves in m1.save_state the m1.next_state variable—that is, the number of the state that behavioral machine m1, shown in FIG. 8, would have executed when m6 was executed. State 116b forces the behavioral state machine to execute a "hurt" state m1.s.hurt (not shown in FIG. 8), by saving in m1.next_state the number of state m1.s.hurt. To produce a sustained, 10-minute cry, state 116b saves in timer m1.timer01, a timer reserved for this use only, a time of ten minutes. State 116b then transitions directly to state 110, and state 110 waits for another switch closure.

As described above, state machine m6 can preempt the doll's behavior by forcing the behavioral state machine m1 to execute state m1.s.hurt, not shown in FIG. 8. State m1.s.hurt produces continuous crying, with the LED eyes 11 "on". State m1.s.hurt will test m1.timer01 until the timer times out—in one embodiment, a time of 10 minutes. m1.s.hurt will then recover from m1.next_state the behavioral state m1 that was previously executing before the doll was hurt, and transition to that state.

Figure 14:
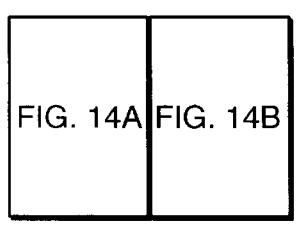
FIGS. 14A and 14B is a flow chart illustrating another embodiment of the state machine that provides the doll's heartbeat.
Figure 14A:
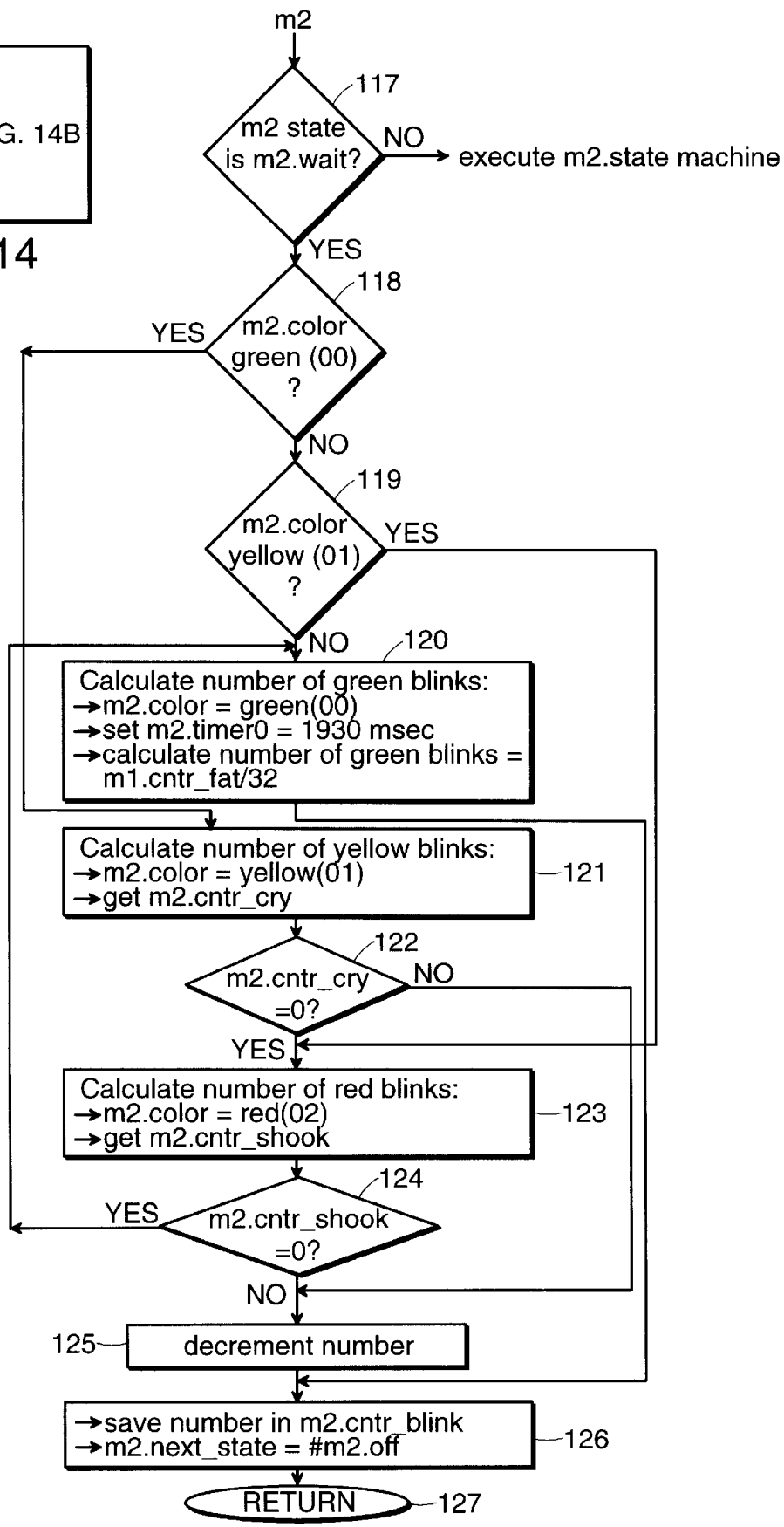
Figure 14B:
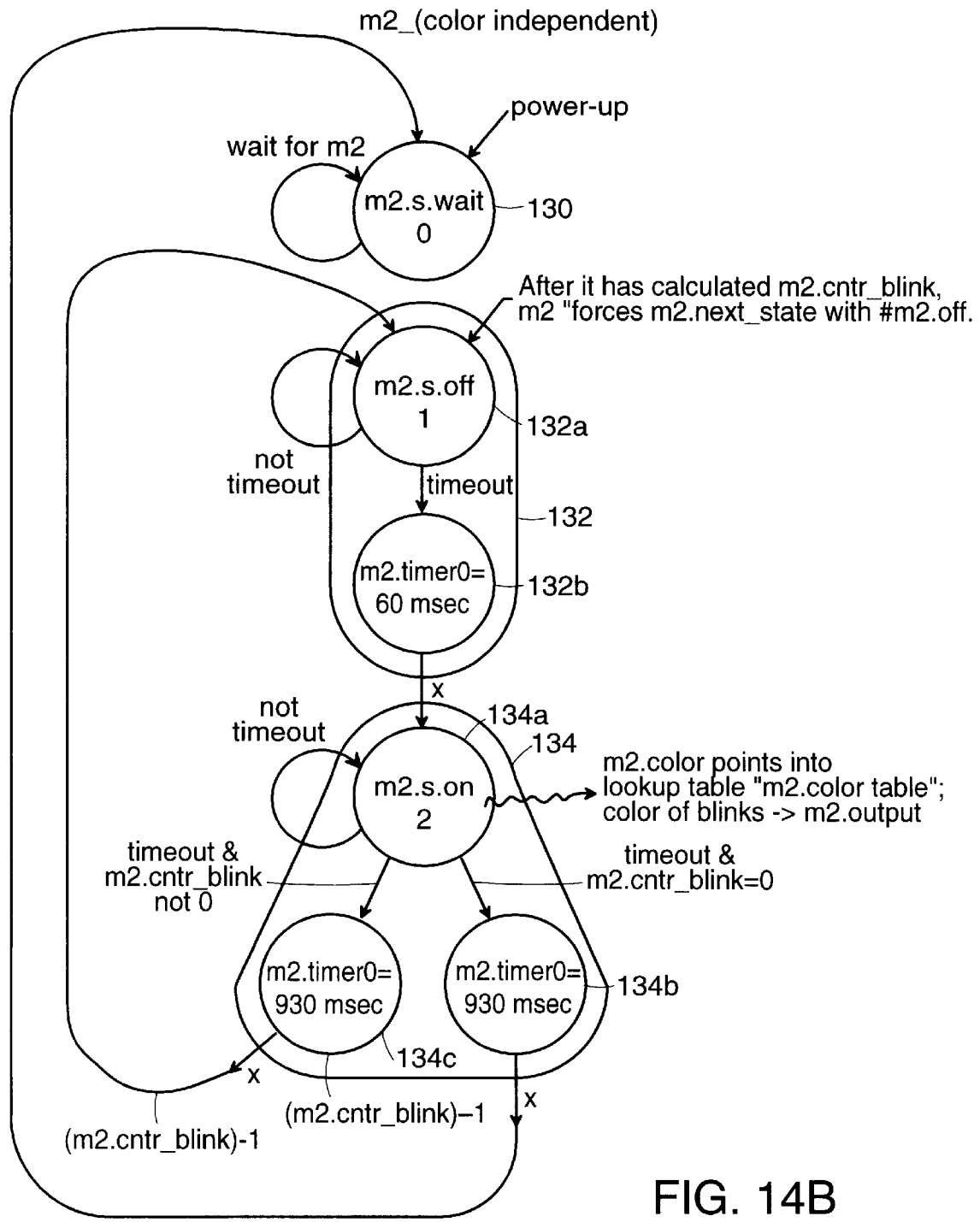
Figure 15A:
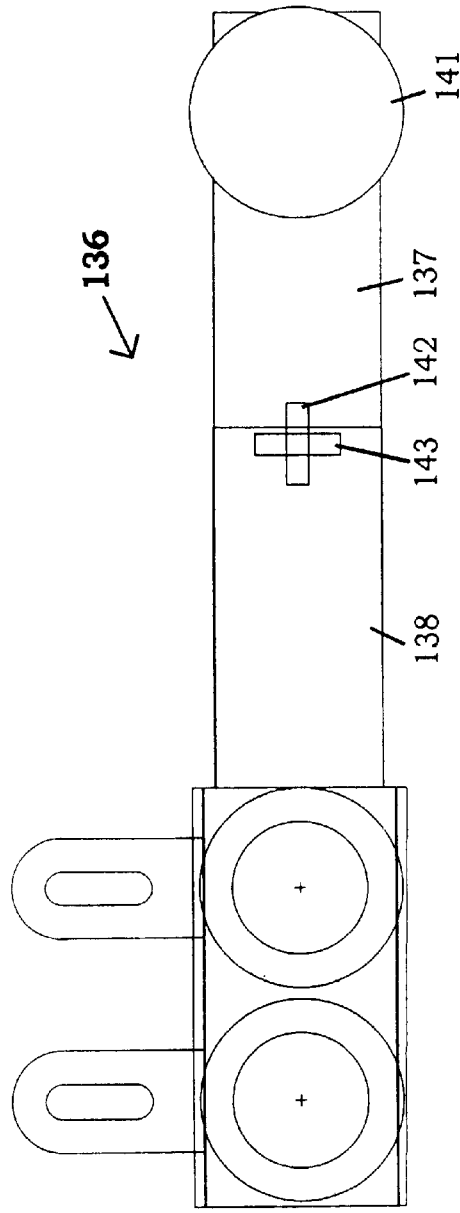
FIG. 15A is a plan view of the impact sensor of the present invention.
Figure 15B:
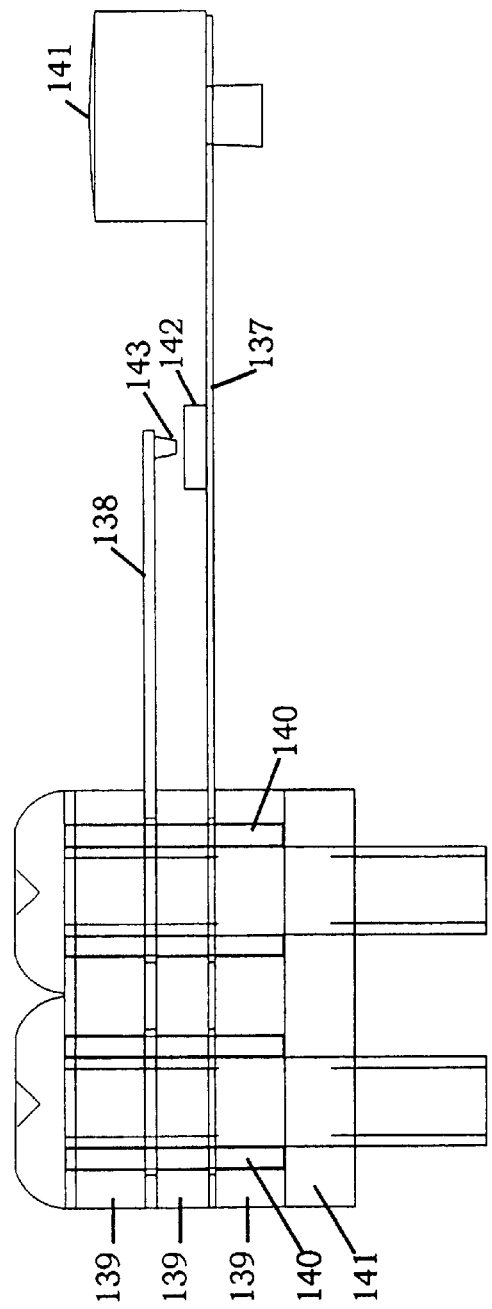
FIG. 15B is a sectional view of the impact sensor of the present invention.

Referring now to FIG. 14, shown is an alternate embodiment of the state machine m2 that produces the doll's heartbeat. As described above, the doll's heartbeat and overall health is represented by the number of blinks and their colors from the LED 15. In this embodiment the microcontroller 17 determines both the timing and color of a cycle of blinks of the LED. The number of green blinks, typically ranging from 0 to 15, indicates the doll's simulated weight. Yellow blinks, ranging from 0 to 256, indicate the number of incidents of neglect, which in some embodiments includes the number of 10-minute intervals that the doll has been left to cry when it is hungry and the number of times the doll has not received adequate motion stimulation (e.g. moved, rocked, burped) for 255 seconds total in each feeding-colic-sleep cycle. Red blinks, ranging from 0 to 256 indicate the number of impacts that exceed the 10-G limit sensed by the ancillary switch 26. The blinks can be 60 milliseconds on and 930 milliseconds off, starting with green, followed by yellow, followed by red, followed by a long off-time of 1930 milliseconds to separate the cycles of color. If the doll has suffered no protracted intervals of crying and/or no significant impacts, that is, the doll has not been shaken or dropped, causing the 10-G limit of ancillary switch 26 to be exceeded, no yellow and/or red blinks are displayed. It is to be appreciated that other colors, for example from a tri-colored LED lamp, and blink frequencies can be used to represent different health conditions.

Referring again to FIG. 6, upon processing the reset routine 29, the microcontroller 17 sets the value "m2.color" equal to the number 03. When instructed by the MAIN program at state machine 36 of FIG. 6, the microcontroller 17 determines in step 117 of FIG. 14, the status of m2, that is, whether m2.wait should be executed. The 5 microcontroller 17 thus determines, if m2.wait should not be executed, that steps 130–134 be executed until the microcontroller 17 transfers to state 130, m2.wait. When in m2.wait, the microcontroller 17 begins execution of the heartbeat state machine m2 at step 118 by evaluating the variable m2.color, and in doing so, the microcontroller 17 passes through steps 118, 119 and 120. As shown, in these steps, the microcontroller 17 determines the color of the LED 15 and then determines the number of blinks associated therewith. The current blink color resides in a variable m2.color, and the number of blinks resides in variable m2.cntr_blink. For example, if the microcontroller 17 determines in step 118 that m2.color is green, control is routed to step 121 where the number of green blinks is calculated. As described above, the number of green blinks is determined by processing the number in m2.cntr_fat, that is, the doll's weight, which is proportional to feeding, crying and rocking. The number in this counter is typically between 1 and 240. In determining the number of blinks, the number from m2.cntr_fat is divided by 16, and shifted, yielding a number between 0 and 15. This number is then saved in step 126 in m2.cntr_blink. This step also sets m2.color to green, by providing the number 00 in this variable, and when finished routes the state machine to m2.s.off.

Thereafter, the current blink color resides in a variable m2.color. The number of green blinks resides in variable m1.cntr_fat (divided by 16); the number of yellow blinks resides in variable "cntr_neglect"; and the number of red blinks resides in variable "cntr_shook." Whenever the microcontroller 17 determines that the state machine is in the state m2.s.wait given by 130, the microcontroller 17 proceeds to step 118, and executes the sequence of instructions that will determine what the next color will be, that is, the number representing the blink color to be stored in m2.color, and how many blinks of that color will occur, that is, the number to be stored in m2.cntr_blink.

Returning to step 118, if the microcontroller 17 tests the color of the previous blink, as given by variable m2.color and determines that it is not green, then it directs control to step 119, where the color test is repeated. If the previous color was green (00), step 118 directs control to step 121 where the color yellow (01) is placed in the accumulator, and the number of yellow blinks is taken from counter cntr_neglect. As previously described, if the doll was left unattended to cry for more than 10 minutes, that is, if 10-minute timer "min_cry_tmr" (minutes-counting-_cry-timer) decrements to zero, cntr_neglect will be incremented by 1 count. Alternatively, if the doll had not accumulated at least 255 seconds of motion in one 2-to-4 hour feeding cycle, then cntr_neglect will also be incremented by 1 count. Step 121 directs control to step 126, which saves the number corresponding to the color yellow in m2.color, saves the number of blinks in m2.cntr_blink, then forces the next_state of state machine m2 to be m2.s.off 132. If however, m2.color is not green, then step 118 directs control to step 119, where m2.color is tested for yellow. If the previous color was yellow (01), step 119 directs control to step 123 where the color "red" (02) is placed in the accumulator, and the number of blinks is read from m2.cntr_shook. As previously described, if the doll was subjected to a 10-G impact, this counter would have been incremented by state m6.s.hurt, shown in FIG. 13 as 116. If counts are present, then red blinks will occur. Step 123 directs control to step 126, where the number corresponding to the color red is put in the accumulator, the number of counts is obtained from m2.cntr_blink, and step 126 forces the state machine m2 into state m2.s.off 132.

Returning to step 119, if the microcontroller 17 tests the color of the previous blink, as given by variable m2.color and determines that the previous color was not yellow, it directs control to step 124 where the previous color is tested for "red." If it is red, then step 125 forces a delay of 1000 milliseconds and the color is forced to be "none"(03). The next time state m2.wait 130 is executed, the number of green blinks will be computed as previously described.

Returning to step 117, if the microcontroller 17 determines that the state machine is not in the "wait" state 130, it executes the state machine. If m2.next_state points to m2.s.off 132, then in substate 132*a* the state machine tests m2.timer0, which was previously set to either 930 milliseconds by m2.s.on 134*c*, or to 1930 milliseconds by steps 134*b* and 125. When m2.timer0 times out, m2.s.off 132*a* transitions through substate 132*b*, sets m2.timer0 to 60 milliseconds and transitions directly to state m2.s.on, 134. This state produces the on-blink. It begins by using the number in m2.color as a pointer into a "m2.color-table" to determine the bit pattern that produces the required color. For example the bit pattern 00000011 turns on both the red LED (bit 1=1) and the green LED (bit 0=1) to produce a color that the human eye sees as yellow. This number is saved in m2.output, to be later used by outlsupervisor 38, described above. State 134*a* tests m2.timer0, and if m2.timer0 is zero it does a second test on the number of blinks in m2.cntr_blink. If the number is not zero, that is, more blinks are required, then substate 134*c* sets m2.timer0 to 930—the off-time between blinks, decrements the number of blinks in m2.cntr_blink, and transitions directly back to m2.s.off. If, on the other hand the number of blinks is zero, then no more blinks are required, and the state sets m2.timer0 to 930 milliseconds—the off time between blinks, and it transitions to m2.s.wait 130. As previously described, while in state 130 the microcontroller 17 will determine the next blink color and the number of blinks. The blink color and number of blinks, as described above, will provide the caregiver with an indication of the health and weight of the doll, both of which are proportional to the care administered by the caregiver.

As illustrated above, the present invention can use a plurality of sensors to determine the treatment administered to a doll, by using inputs from the sensors in a plurality of state machines, which simulate infant behavioral patterns that are consistent or expected of a human infant who has been given similar care. While the invention has been particularly shown and described with reference to the preferred embodiments, it should be understood by those skilled in the art that various changes in form and detail may be made therein without departing from the spirit and scope of the invention as defined by the appended claims.

What is claimed is:

1. A doll simulating infant behavior comprising:

a doll housing comprising a head portion defining a mouth opening and a pair of eye openings;

a microcontroller disposed in the housing, the microcontroller in communication with at least one memory, the memory storing data representative of prior treatment provided to the doll;

a plurality of motion sensors in electrical communication with the microcontroller and disposed in a plurality of different axes within the head portion;

a switch in electrical communication with the microcontroller and disposed in alignment with the mouth opening;

a speaker in electrical communication with the microcontroller and disposed in alignment with the mouth opening; and an indicator which displays a vital sign of the doll, the indicator in electrical communication with the microcontroller and disposed in the head portion;

wherein the microcontroller is programmed to receive inputs from the plurality of sensors and the switch and access the data stored in the memory, and the microcontroller causes the doll to simulate a plurality of infant behaviors with the speaker and the indicator, wherein a timing and a duration of each behavior relates to the data stored in the memory.

2. The doll of claim 1, wherein the motion sensors sense rocking of the doll and the switch senses the insertion of a bottle into the mouth opening.

3. The doll of claim 1, wherein the indicator comprises a bi-colored LED, the LED having a blink color, pattern, and frequency that varies in response to inputs received by the microcontroller.

4. The doll of claim 1, further comprising a pair of LEDs, each of which is disposed in an eye opening.

5. The doll of claim 1, further comprising an impact switch in electrical communication with the microcontroller and disposed in the head portion.

6. The doll of claim 1 wherein the microcontroller causes the doll to undergo a plurality of behavioral cycles, each cycle comprising a plurality of states and a plurality of timers for controlling a duration of each state.

7. The doll of claim 1 further comprising a circadian clock, wherein the microcontroller and the circadian clock simulate human circadian rhythms.

8. A method of simulating infant behavior comprising:

providing a doll having a programmable microcontroller and a plurality of sensors sensing treatment of the doll by a caretaker;

entering a first behavioral cycle and setting a first timer representing the length of time of the behavioral cycle;

decrementing the first timer;

determining whether an input has been received from a sensor;

transitioning to a second behavioral cycle in response to an input or the first timer;

setting a second timer representing the length of time of the second behavioral cycle; and setting a third timer representing the metabolism of the doll in response to the first and second behavioral cycles.

9. The method of claim 8, wherein the first behavioral cycle represents sleep and the second behavioral cycle represents hunger.

10. The method of claim 8, wherein the first behavioral cycle represents hunger and the second behavioral cycle represents crying.

11. The method of claim 8, further comprising:

decrementing the third timer by a first preselected unit in response to the first behavioral cycle; and decrementing the third timer by a second preselected unit in response to the second behavioral cycle, wherein the first behavioral cycle represents hunger and the second behavioral cycle represents crying.

12. The method of claim 8, wherein the first behavioral cycle represents colic and the second behavioral cycle represents sleep.

13. The method of claim 8, wherein the plurality of sensors further comprises at least one motion sensor, and at least one feeding sensor.

14. The method of claim 8, wherein the plurality of sensors further comprises at least one impact switch.

15. The method of claim 8 further comprising simulating human circadian rhythms.

16. A system for simulating the behavior of an infant comprising:

a doll having a programmable microcontroller receiving a plurality of inputs;

a plurality of sensors in communication with the microcontroller, for sensing treatment of the doll by a caregiver and providing the inputs to the microcontroller in response to such treatment; and a timing module in communication with the microcontroller, comprising:

a first timer representing the length of time that the doll experiences hunger;

a second timer representing motion applied to the doll; and a third timer representing the general health of the doll;

wherein the microcontroller adjusts at least one of the first, second, or third timer in response to the inputs.

17. The system of claim 16, the timing module further comprising a fourth timer representing the length of time that the doll should cry.

18. The system of claim 17, wherein the microcontroller adjusts the fourth timer when a sensor input indicates that the doll is not being fed or rocked.

19. The system of claim 16, wherein the microcontroller decrements the first timer when a sensor input indicates that the doll is being fed.

20. The system of claim 19, wherein the microcontroller decrements the first timer and the second timer when a sensor input indicates that the doll is being rocked.

21. The system of claim 16, wherein the microcontroller resets the third timer in response to at the least one of the first and second timers.

22. The system of claim 16 wherein the timing module further comprises a circadian clock representing the time of day.

23. A system for simulating the behavior of an infant comprising:

a first sensor for sensing an input representative of feeding;

a second sensor for sensing an input representative of movement; and a microcontroller programmed to cycle through at least three of states, each of said states representing infant behavior, said microcontroller being in communication with said first and second sensors for receiving signals from said first and second sensors and changing the time spent in each state in response thereto, wherein said states comprise at least three of the following behaviors:

sleep, hunger, crying, colic, burping, cooing, illness and death.

24. The system for simulating infant behavior of claim, the microcontroller further comprising:

a plurality of timers for timing the length of each state, said timers changing the length of each state in response to inputs from said first and second sensors.

25. The system of claim 23 further comprising a circadian clock, wherein the microcontroller and the circadian clock simulate human circadian rhythms.

* * * * *